United States Patent [19]

Sakamoto et al.

[11] Patent Number: 5,606,842
[45] Date of Patent: Mar. 4, 1997

[54] MANUFACTURING METHOD FOR PHOTOSENSITIVE FILM MAGAZINES AND MANUFACTURING METHOD FOR PHOTOSENSITIVE FILM MAGAZINES PACKED IN CONTAINERS

[75] Inventors: Norio Sakamoto; Toshiyuki Ohkawa; Takashi Misawa, all of Tokyo, Japan

[73] Assignee: Konica Corporation, Tokyo, Japan

[21] Appl. No.: 625,676

[22] Filed: Apr. 3, 1996

Related U.S. Application Data

[63] Continuation of Ser. No. 117,786, Sep. 7, 1993, abandoned.

[30] Foreign Application Priority Data

Sep. 10, 1992 [JP] Japan ..................... 4-269602

[51] Int. Cl.⁶ ........................................ B65B 57/10
[52] U.S. Cl. ................... 53/54; 53/118; 53/430; 53/435; 53/513; 83/363; 83/371; 29/705; 29/710; 29/806
[58] Field of Search ............... 29/407.01, 407.04, 29/407.1, 705, 710, 806; 53/54, 284.2, 284.4, 430, 447, 118, 119, 435, 513; 73/157; 83/75.5, 363, 364, 365, 371

[56] References Cited

U.S. PATENT DOCUMENTS

| | | | |
|---|---|---|---|
| 2,776,094 | 1/1957 | Edwards et al. | 53/119 X |
| 2,940,232 | 6/1960 | Wallace et al. | 53/54 |
| 3,457,627 | 7/1969 | Napor et al. | 53/118 |
| 3,581,371 | 6/1971 | Bushey | 29/806 X |
| 3,693,430 | 9/1972 | Menary | 73/157 |
| 3,744,308 | 7/1973 | Vogt | 73/157 |
| 3,748,715 | 7/1973 | Hoover et al. | 29/806 X |
| 3,759,095 | 9/1973 | Short et al. | 73/157 |
| 3,778,802 | 12/1973 | Wallace | 73/157 X |
| 3,789,571 | 2/1974 | Tall et al. | 53/54 |
| 3,793,915 | 2/1974 | Hujer | 83/371 X |
| 3,802,051 | 4/1974 | Andler et al. | 29/806 X |
| 3,802,052 | 4/1974 | Andler et al. | 29/806 X |
| 3,856,414 | 12/1974 | Menary | 73/157 X |
| 3,930,296 | 1/1976 | Hoover | 29/806 X |
| 3,933,069 | 1/1976 | Tall et al. | 83/371 X |
| 3,935,468 | 1/1976 | Bowen et al. | 73/157 X |
| 4,114,349 | 9/1978 | Jensen et al. | 53/54 |
| 4,154,046 | 5/1979 | Weber et al. | 53/54 X |
| 4,205,436 | 6/1980 | Klotz et al. | |
| 4,217,743 | 8/1980 | Escales et al. | 53/54 |
| 4,436,008 | 3/1984 | Strunc | 83/371 X |
| 4,506,824 | 3/1985 | Bartz | 83/371 X |
| 4,561,235 | 12/1985 | Yanagisawa et al. | 53/118 X |
| 4,574,563 | 5/1986 | Shimizu | 53/430 |
| 4,603,539 | 8/1986 | Mussig et al. | 53/54 X |
| 4,924,419 | 5/1990 | McIntyre et al. | 29/806 X |
| 4,949,607 | 8/1990 | Yuito | 83/371 X |
| 5,072,639 | 12/1991 | Dolf | 83/371 X |

OTHER PUBLICATIONS

Patent Abstracts of Japan, vol. 11, No. 219 (P–596) Jul. 16, 1987 & JP–A–62 036 664 (Konishiroku Photo), Feb. 1987.
Patent Abstracts of Japan, vol. 11, No. 223 (P–597) Jul. 21, 1987 & JP–A–62 039 710 (Konishiroku Photo), Feb. 1987.

*Primary Examiner*—Daniel Moon
*Attorney, Agent, or Firm*—Frishauf, Holtz, Goodman, Langer & Chick

[57] ABSTRACT

A manufacturing method for a photo-sensitive film magazine packed in a container is disclosed. The method comprises the steps of (a) assembling a photosensitive film magazine in a photosensitive film magazine assembly section (b) feeding successively the photosensitive film magazine to a container accommodation section from said photosensitive film magazine assembly section through a predetermined passage and (c) setting the photosensitive film magazine into a photosensitive film magazine container in the container accommodation section.

11 Claims, 78 Drawing Sheets

FIG. 22a
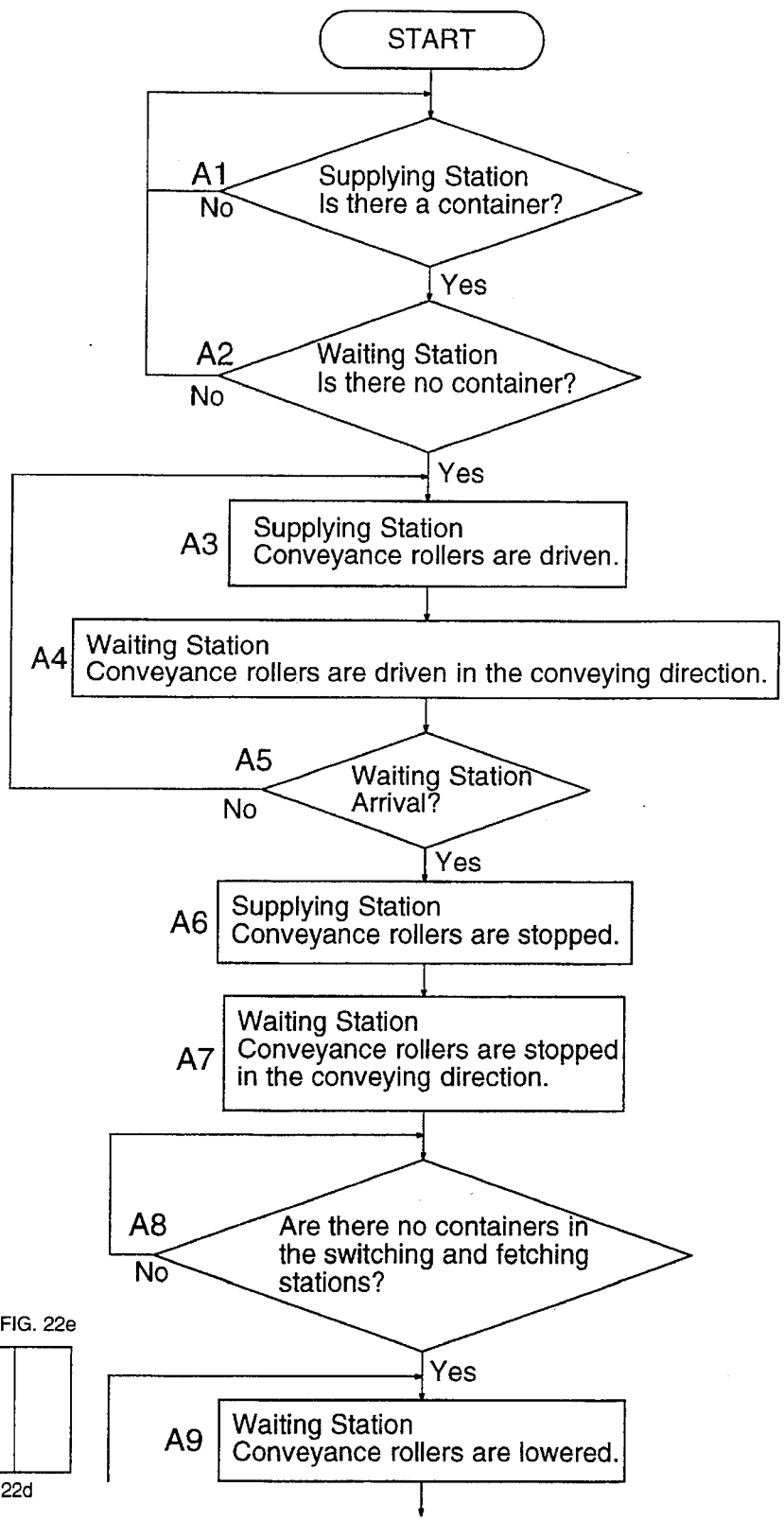
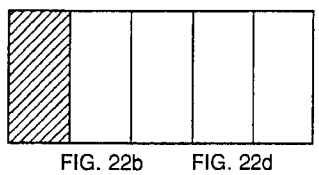

FIG. 22e
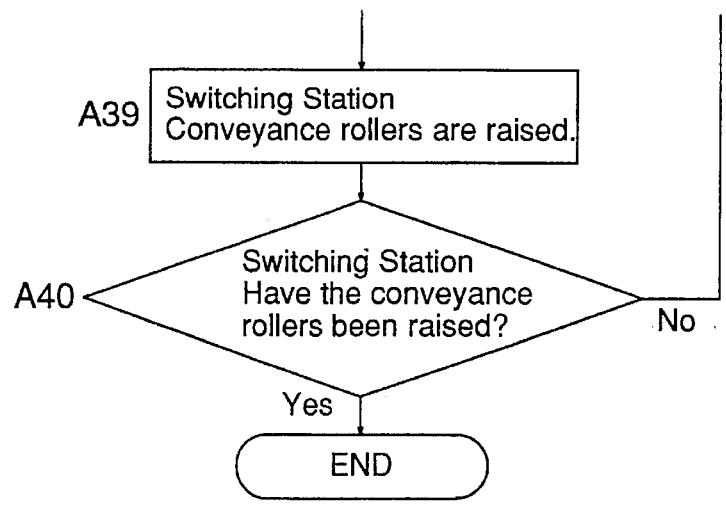
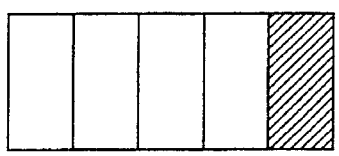

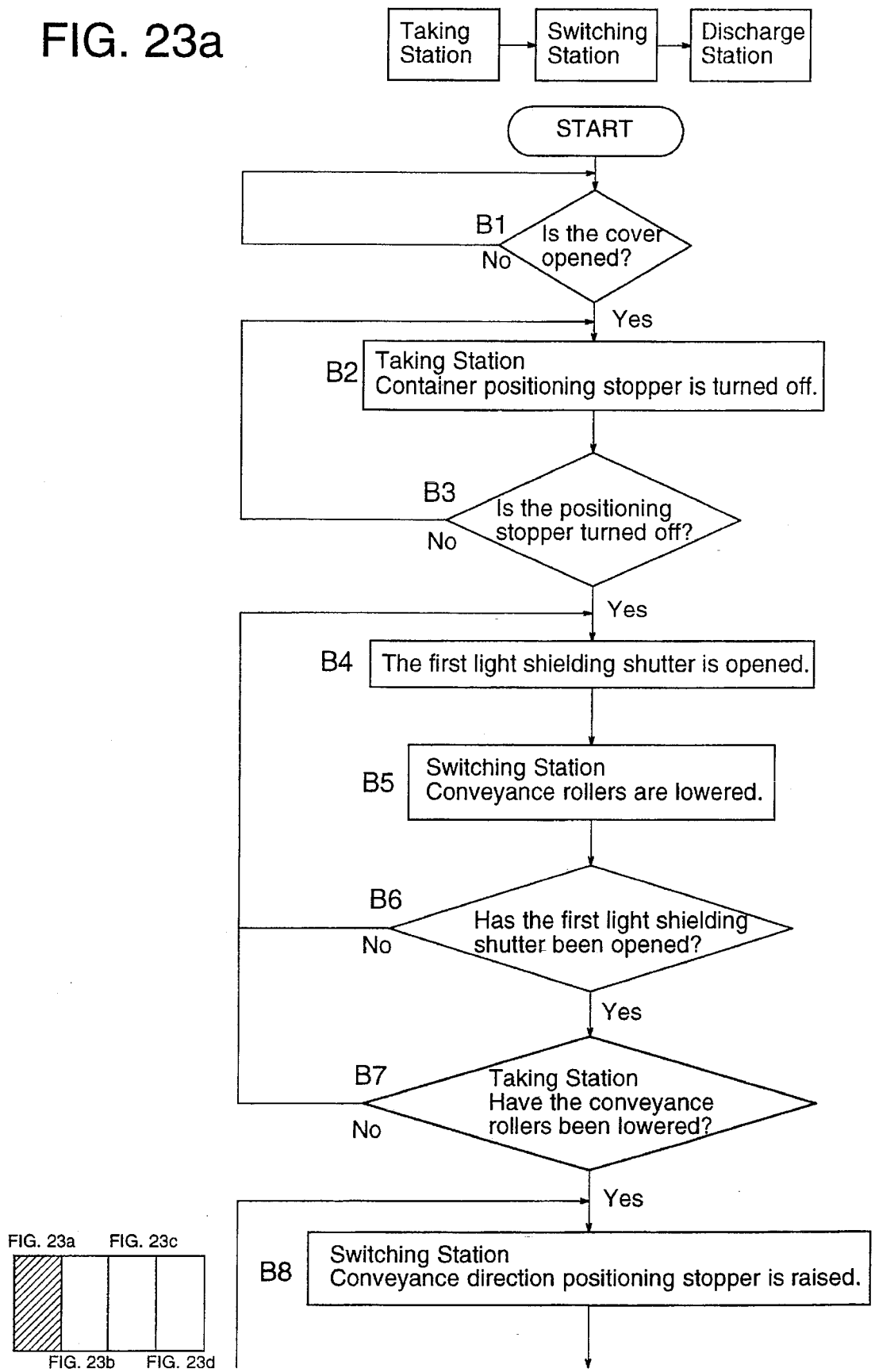

FIG. 23b
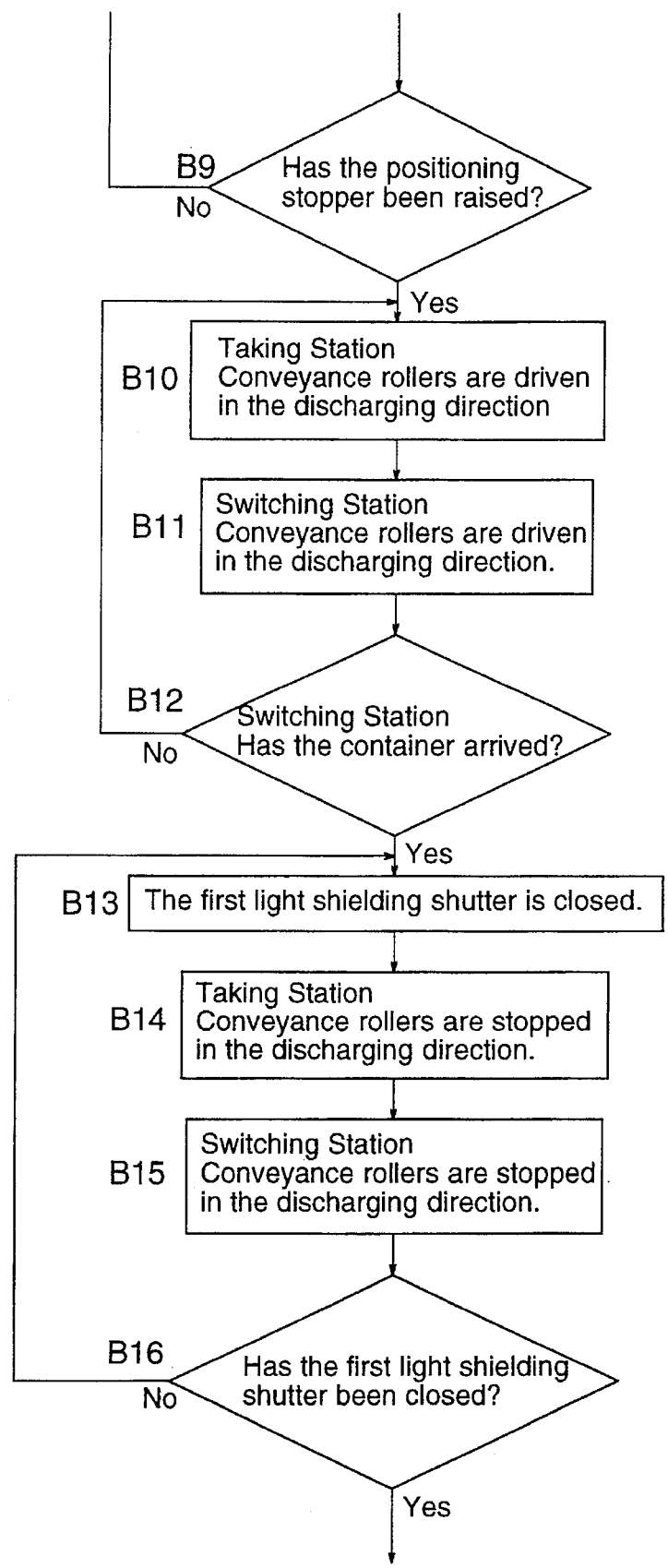
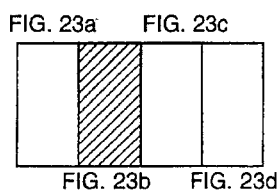

FIG. 23d
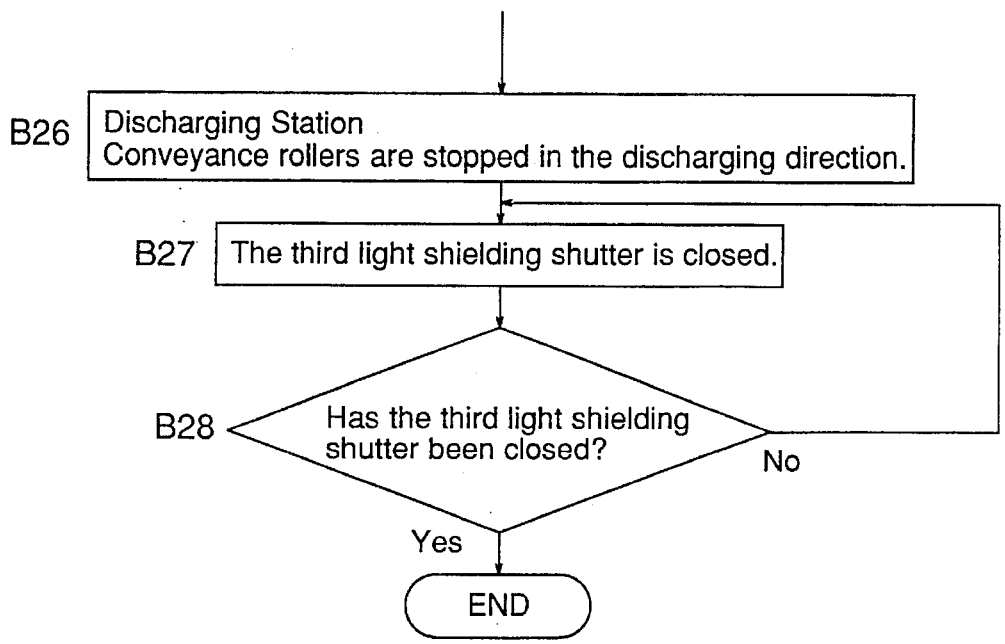
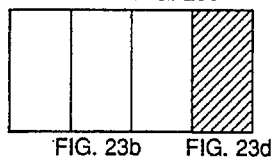

FIG. 46b
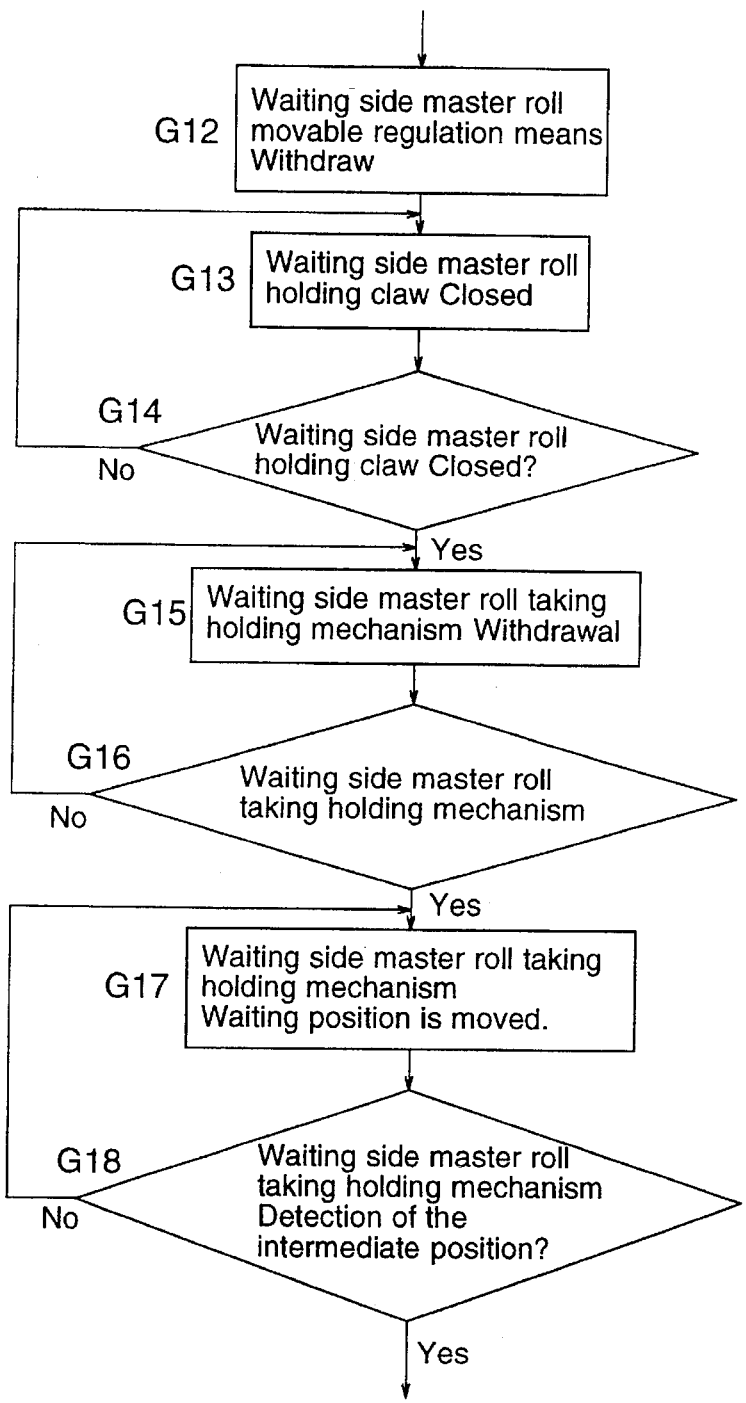
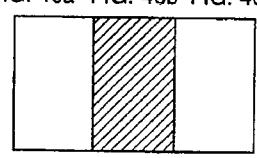
FIG. 46a  FIG. 46b  FIG. 46c

MANUFACTURING METHOD FOR PHOTOSENSITIVE FILM MAGAZINES AND MANUFACTURING METHOD FOR PHOTOSENSITIVE FILM MAGAZINES PACKED IN CONTAINERS

This application is a Continuation of application Ser. No. 08/117,786, filed Sep. 7, 1993 now abandoned.

FIELD OF THE INVENTION

The present invention relates to a manufacturing method of photosensitive film magazines and photosensitive film magazines packed in containers.

BACKGROUND OF THE INVENTION

In this specification, the terminologies are defined as follows.

"A photosensitive film magazine" is defined as a magazine in which a photosensitive film is assembled. In this case, the photosensitive film magazine includes a magazine from which one end of the photosensitive film protrudes, and also includes a magazine from which one end of the photosensitive film does not protrude.

"A photosensitive film" is defined as a web-shaped film having photosensitive properties necessary for forming images. In this case, the photosensitive film includes not only a silver halide negative color film of which the support is a film, but also a photosensitive paper, and further the photosensitive film is not limited to a silver halide photosensitive film.

"A master roll" is defined as a roll in which a photosensitive film is wound in the form of a roll. Usually, the master roll includes a roll in which a photosensitive film of several tens or several thousands meters is wound around a core.

"A light shielding tunnel" is defined as a tunnel-shaped passage that is covered with light shielding material. By this light shielding tunnel, rays of light sent from all directions can be substantially shielded.

"A dark room condition" is defined as a condition in which fog is not caused even when a photosensitive film is left in the condition for several hours. Accordingly, the dark room condition is different according to the photosensitive film. For example, in the case of a regular photosensitive film that is photo-sensitive only to rays of light in the blue region, the dark room condition can be maintained under the presence of red light as long as blue light does not exist.

Conventionally, photosensitive film magazines are manufactured in the following manner:

In one apparatus, a master roll of photosensitive film is taken out from a master roll container, and the photosensitive film is unwound from the master roll, and then photosensitive film magazines are assembled from the unwound photosensitive film and related parts. After that, the photosensitive film magazines are accommodated in photosensitive film magazine containers by another apparatus so as to provide film magazines packed in containers.

Then, some photosensitive film magazines packed in containers are sampled so as to be inspected.

In the photosensitive film magazine manufacturing apparatus described above, operations are carried out in the following manner:

A parts box in which a large number of parts are accommodated is previously set inside of the apparatus under the dark room condition, and parts are taken out from the parts box so as to assemble photosensitive film magazines. The assembled photosensitive film magazines are accommodated in a product box, and the product box is taken out from the inside maintained under the dark room condition.

A master roll container is disclosed, for example, in Japanese Utility Model Application Open to Public Inspection No. 190546/1982. According to the technique, an operator manually charges a master roll in a dark room into the master roll container having light shielding properties. This master roll container is manually conveyed out from the dark room. Alternatively, this master roll container is conveyed out from the dark room by a carriage. Then, the master roll is manually set at a master roll supply section of a photosensitive film magazine manufacturing apparatus. After that, the empty master roll container is conveyed out by the operator.

Basically, only one type photosensitive film magazine is manufactured by one photosensitive film magazine manufacturing apparatus. Therefore, when the type of a photosensitive film magazine is changed, the master roll container is manually changed.

Technique to unwind a photosensitive film from a master roll is disclosed, for example, in Japanese Patent Application Open to Public Inspection Nos. 119555/1986 and 162662/1989. According to the disclosed technique, two master rolls are provided in a master roll unwinding means, and while one master roll is being unwound, the other master roll are prepared. These operations are alternately carried out.

Photosensitive film magazine assembling technique is disclosed, for example, in Japanese Patent Application Open to Public Inspection No. 305353/1988, in which a magazine body member is supplied to a spool around which a photosensitive film has been wound.

According to the technique of the prior art, in the case where defective photosensitive films are manufactured due to the leak of light or mechanical problems, this batch of photosensitive film magazines are discarded by the operator.

In order to set a parts box and a product box into the photosensitive film manufacturing apparatus in a dark room condition, or in order to remove the parts box and the product box from the photosensitive film manufacturing apparatus, it is necessary to provide a double door structure including inner and outer doors so as to maintain light shielding properties. As a result, the structure becomes complicated.

In the case where the inner and outer door opening and closing operations are not appropriately performed, rays of light leak into the film magazine manufacturing apparatus, and fog occurs in the products, resulting in the occurrence of defective products.

Further, when the inner and outer doors are alternately opened and closed so as to set and remove the parts and product boxes, it takes the time. Therefore, it is difficult to improve the productivity of manufacture of photosensitive film magazines.

Furthermore, whereas a large number of parts are put in the parts box and a large number of photosensitive film magazines are put in the product box, they tend to be damaged or deformed when they are crashed in the boxes.

Furthermore, whereas it is necessary to provide spaces to install the parts box and the product box, it is difficult to reduce the size of the photosensitive film magazine manufacturing apparatus.

Furthermore, whereas only one master roll is accommodated in one master roll container, the master roll container must be frequently supplied, so that much labor is required.

Furthermore, the master roll container is manually set in a master roll supply position in the photosensitive film manufacturing apparatus. Therefore, the operators must work in a dark room, which causes various problems from the viewpoint of safety. Whereas the master roll is heavy, its handling is a hard labor for the operator.

Furthermore, there are provided two sets of master roll unwinding means in one photosensitive film magazine manufacturing apparatus. Accordingly, the structure of the manufacturing apparatus is complicated, and the costs are increased. Moreover, in the case of recovery of the residual master rolls, two master rolls must be recovered, which requires a cumbersome job.

In the case where a photosensitive film magazine is assembled, a magazine body is supplied to a spool around which a photosensitive film has been wound. In the case where the magazine body is not supplied, the spool around which a photosensitive film has been wound must be returned to a conveyance line, so that the detection and control become complicated. Furthermore, while the photosensitive film wound round the spool is conveyed by the conveyance line, a conveyance jig is required to prevent the film from loosening. Therefore, the cost of the manufacturing apparatus is increased. Sometimes, the conveyance jig is disconnected from the spool around which the photosensitive film has been wound, so that the manufacturing apparatus can not be stably operated.

In the case of occurrence of defective films caused by the stoppage of machines or the leak of light, the operator discards all the photosensitive film magazines of the same batch. Accordingly, even when some of the photosensitive film magazines are good, all of them are discarded, which causes a big loss.

In the case where the defective films are not realized by the operator, they are packed in the form of a photosensitive film magazine packed in a container. The occurrence of the defective films is not found until they are inspected in the process of a sampling test. Accordingly, there is a possibility that the loss is further increased.

SUMMARY OF THE INVENTION

It is an object of the present invention to improve the quality of photosensitive film magazines and the productivity of a manufacturing apparatus to manufacture photosensitive film magazines packed in containers so as to reduce a loss.

Also, it is an object of the present invention to abolish the conveyance of a parts box and a product box conducted between the inside of the apparatus maintained in a dark room condition and the outside so as to prevent the occurrence of damage and deformation of photosensitive film magazines when they are supplied to and removed from the inside of the apparatus in the dark room condition. When the photosensitive film magazines are successively conveyed, the productivity can be improved.

Also, an object of the present invention is to provide photosensitive film magazines that are insusceptible to damage and deformation.

Also, an object of the present invention is to reduce a loss when only non-defective photosensitive film magazines are accommodated in containers after all the photosensitive film magazines have been inspected.

Also, an object of the present invention is to reduce a loss of expensive photosensitive films and to minimize the size of the manufacturing apparatus and also to simplify the structure of the manufacturing apparatus when parts are detected at corresponding positions.

Also, an object of the present invention is described as follows. In the case where defective photosensitive film magazines are made in a batch of photosensitive film magazines, all the photosensitive film magazines of the same batch are not discarded, and only defective photosensitive film magazines are discharged without stopping the operation of the manufacturing apparatus. Therefore, there is little possibility that the defective photosensitive film magazines are assembled into the form of a photosensitive film magazine packed in a container.

Also, it is an object of the present invention to prevent the decrease in the productivity when defective photosensitive film magazines are continuously discharged while the dark room condition is being maintained even if the defective photosensitive film magazines are automatically discharged.

Also, it is an object of the present invention to process a plurality of types of photosensitive film cartridges by one photosensitive film magazine manufacturing apparatus.

Also, an object of the present invention is to automatically set a master roll at a master roll supply position in a dark room condition so as to reduce the labor of an operator. Therefore, it is not necessary for the operator to enter the dark room. Further, the manufacturing apparatus can be made compact.

Also, an object of the present invention is to unify the flow of photosensitive films for simplification. Therefore, the occurrence of problems can be reduced and the apparatus can be made compact.

Also, an object of the present invention is to easily recover a core from which a photosensitive film has already been supplied.

One embodiment of the present invention is a manufacturing method for a photosensitive film magazine packed in a container, said manufacturing method including the steps of assembling a photosensitive film magazine in a photosensitive film magazine assembly section under a dark condition, and setting said assembled film magazine into a photosensitive film magazine container in a container accommodation section, said manufacturing method further including the steps of: successively feeding said photosensitive film magazine from said photosensitive film magazine assembly section through a predetermined passage covered with a light-shielding tunnel necessary for substantially maintaining said photosensitive film magazine assembly section in a dark room condition; inspecting said photosensitive film magazine one by one under a non-dark room condition; successively feeding said inspected photosensitive film magazine to said container accommodation section through a predetermined passage; and setting only good photosensitive film magazine into a photosensitive film magazine container in accordance with the result of the inspection.

One embodiment of the present invention is a manufacturing method for a photosensitive film magazine including the steps of feeding parts of a photosensitive film magazine to a photosensitive film magazine assembly section in a dark room condition so as to manufacture a photosensitive film magazine from a photosensitive film and said parts, said manufacturing method for a photosensitive film magazine further including the steps of successively feeding said parts from said parts supply section to said photosensitive film magazine assembly section through a predetermined passage covered with a light-shielding tunnel necessary for maintaining said photosensitive film magazine assembly section in a dark room condition.

One embodiment of the present invention is a manufacturing method for a photosensitive film magazine including the steps of: detecting the existence of parts at a predetermined position in the predetermined passage covered with a light-shielding tunnel; and controlling the conveyance operation of said parts in said predetermined passage so that at least one part can exist in a range necessary for substantially maintaining said photosensitive film magazine assembly section covered with said light-shielding tunnel in a dark room condition.

One embodiment of the present invention is a manufacturing method for a photosensitive film magazine in a photosensitive film magazine assembly section in a dark room condition, including the steps of successively discharging said photosensitive film magazine to a non-dark room condition from said photosensitive film magazine assembly section through a predetermined passage covered with a light-shielding tunnel necessary for substantially maintaining said photosensitive film magazine assembly section in a dark room condition.

One embodiment of the present invention is a manufacturing method for a photosensitive film magazine including the steps of: detecting the existence of the photosensitive film magazine at a predetermined position in the predetermined passage covered with a light-shielding tunnel; and controlling the conveyance operation of said photosensitive film magazine in said predetermined passage so that at least one photosensitive film magazine can exist in a range necessary for substantially maintaining said photosensitive film magazine assembly section covered with said light-shielding tunnel in a dark room condition.

One embodiment of the present invention is a manufacturing method for a photosensitive film magazine including the steps of: closing a predetermined position in the passage covered with the light-shielding tunnel, with a flexible light-shielding curtain; and allowing the photosensitive film magazine to deform the flexible light-shielding curtain when the photosensitive film magazine passes through the flexible light-shielding curtain.

One embodiment of the present invention is a manufacturing method for a photosensitive film magazine packed in a container, said manufacturing method including the steps of assembling a photosensitive film magazine in a photosensitive film magazine assembly section, and setting said assembled film magazine into a photosensitive film magazine container in a container accommodation section, said manufacturing method further including the steps of: successively feeding said photosensitive film magazine from said photosensitive film magazine assembly section through a predetermined passage; inspecting said photosensitive film magazine one by one; successively feeding said inspected photosensitive film magazine to said container accommodation section through a predetermined passage; and setting only good photosensitive film magazine into a photosensitive film magazine container in accordance with the result of the inspection.

One embodiment of the present invention is a manufacturing method for a photosensitive film magazine packed in a container, said manufacturing method including the steps of assembling a photosensitive film magazine in a photosensitive film magazine assembly section, and setting said assembled film magazine into a photosensitive film magazine container in a container accommodation section, said manufacturing method further including the steps of: successively feeding said photosensitive film magazine to said container accommodation section from said photosensitive film magazine assembly section through a predetermined passage.

One embodiment of the present invention is a manufacturing method for a photosensitive film magazine packed in a container, said manufacturing method including the steps of assembling a photosensitive film magazine in a photosensitive film magazine assembly section, and setting said assembled film magazine into a photosensitive film magazine container in a container accommodation section, said manufacturing method further including the steps of:
inspecting said photosensitive film magazine one by one; successively feeding said inspected photosensitive film magazine to said container accommodation section through a predetermined passage; and setting only good photosensitive film magazine into a photosensitive film magazine container in accordance with the result of the inspection.

One embodiment of the present invention is a manufacturing method for a photosensitive film magazine including the steps of: processing a photosensitive film; synchronously feeding said processed photosensitive film and parts in order; and assembling a photosensitive film magazine from said processed photosensitive film and parts, wherein it is detected whether or not parts exist in a corresponding position when said photosensitive film is processed, and only when it has been detected that the parts exist in the corresponding position, the photosensitive film is processed.

One embodiment of the present invention is a manufacturing method for a photosensitive film magazine including the steps of continuously feeding a photosensitive film, processing the fed photosensitive film, and assembling a photosensitive film magazine from the processed photosensitive film, said manufacturing method for a photosensitive film magazine further including the steps of: detecting the quality of said photosensitive film; outputting a defective film signal in the case where a defective film has been detected; shifting this defective film signal synchronously with the movement of the photosensitive film; changing over a conveyance passage so that the photosensitive film can be discharged outside of the system in the case where the defective film signal has been shifted to a corresponding position in which the photosensitive film can be discharged outside of the system; changing over the conveyance passage so that the photosensitive film can be assembled to a photosensitive film magazine in the case where the defective film signal has not been shifted; discharging the defective film outside of the system; and assembling a good film to the photosensitive film magazine.

One embodiment of the present invention is a manufacturing method for a photosensitive film magazine including the steps of continuously feeding a photosensitive film, processing the fed photosensitive film, and assembling a photosensitive film magazine from the processed photosensitive film, said manufacturing method for a photosensitive film magazine further including the steps of: detecting a defective portion of said photosensitive film; changing over a conveyance passage so that the defective portion of the photosensitive film can be discharged outside of the system in the case where the defective portion of the photosensitive film has come to a change-over position of the conveyance passage at which the photosensitive film can be discharged outside of the system; changing over the conveyance passage so that the photosensitive film can be assembled to a photosensitive film magazine in other cases; discharging a defective film outside of the system; and assembling a good film to the photosensitive film magazine.

One embodiment of the present invention is a manufacturing method for a photosensitive film magazine including the steps of continuously feeding a photosensitive film in a dark room condition, processing the fed photosensitive film, and assembling a photosensitive film magazine from the processed photosensitive film, said manufacturing method for a photosensitive film magazine further including the steps of: changing over a conveyance passage so that a defective portion of the photosensitive film can be discharged outside of the system in the case where the defective portion of the photosensitive film has arrived at a conveyance passage changeover position where the photosensitive film can be discharged outside of the system; discharging the defective portion of the photosensitive film outside of the system into a non-dark room condition along a predetermined passage covered with a light-shielding tunnel necessary for maintaining portions for feeding, processing and assembling in a dark room condition; and changing over the conveyance passage in other cases so that the photosensitive film can be assembled to the photosensitive film magazine, wherein the defective film is discharged outside of the system, and the good film is assembled to the photosensitive film magazine.

One embodiment of the present invention is a manufacturing method for a photosensitive film magazine including the steps of continuously feeding a photosensitive film in a dark room condition, processing the fed photosensitive film, and assembling a photosensitive film magazine from the processed photosensitive film, wherein articles are conveyed between the outside of the system and the portions for feeding, processing and assembling of the photosensitive film through a predetermined passage covered with a light-shielding tunnel necessary for substantially maintaining the portions for feeding, processing and assembling of the photosensitive film in a dark room condition.

One embodiment of the present invention is a manufacturing method for a photosensitive film magazine including the steps of feeding a master roll one by one from a master roll container, unwinding a photosensitive film from the fed master roll, and manufacturing a photosensitive film magazine from the unwound photosensitive film, said manufacturing method for a photosensitive film magazine further including the steps of: specifying the type of a photosensitive film magazine to be manufactured; specifying the type of a photosensitive film necessary for manufacturing the photosensitive film magazine; feeding a master roll container in which a master roll of the type of photosensitive film is contained; and the master roll is fed one by one from the fed master roll container so that a plurality of types of photosensitive film magazines are manufactured from a plurality of types of photosensitive films.

One embodiment of the present invention is a manufacturing method for a photographic film magazine characterized in that: the master roll container accommodates only one type of photosensitive film master roll; a recording medium is provided which records the type of the accommodated photosensitive film; the content of the recording medium is checked before the photosensitive film is unwound from the fed master roll; it is detected whether or not the content of the recording medium coincides with the type of the required photosensitive film; in the case where the content of the recording medium coincides with the type of the required photosensitive film, the master roll is fed one by one from the fed master roll container; and in the case where the content of the recording medium does not coincide with the type of the required photosensitive film, the fed master roll container is discharged outside.

One embodiment of the present invention is a method for manufacturing a photosensitive film magazine characterized in that: a master roll container having a photosensitive film master roll is supplied to a master roll supply position; the supplied master roll is fed from the master roll container at the master roll supply position; a photosensitive film is unwound from the fed master roll; and a photosensitive film magazine is manufactured from the unwound photosensitive film. In this photosensitive film magazine manufacturing method, the outside of the system is in a non-dark room condition; the master roll feed position is in a dark room condition; a changeover station is provided between the outside of the system and the master roll feed position; an outside system side shutter is provided between the outside of the system and the changeover station; a master roll feed position side shutter is provided between the changeover station and the master roll feed position; it is detected whether or not the master roll feed position side shutter is completely closed; the outside system side shutter is opened only when the master roll feed position side shutter is completely closed; the master roll container is conveyed between the outside of the system and the changeover station when the outside system side shutter is opened; it is detected whether or not the outside system side shutter is completely closed; the master roll feed position side shutter is opened only when the outside system shutter is completely closed; and the master roll container is conveyed between the switching station and the master roll feed position when the master roll feed position side shutter is opened.

One embodiment of the present invention is a method for manufacturing a photosensitive film magazine characterized in that: a master roll is fed one by one from the master roll container; a photosensitive film is unwound from the fed master roll; and a photosensitive film magazine is manufactured from the unwound photosensitive film.

In this photosensitive film manufacturing method, the following means are provided: a taking and holding means to take and hold a master roll from the master roll container; and a master roll unwinding and holding means to unwind the photosensitive film from the fed master roll. Using the aforementioned means, one master roll is taken out from the master roll container and held by the taking and holding means; the photosensitive film of the master roll is unwound from the master roll unwinding and holding means; when the photosensitive film of the master roll held by the master roll unwinding and holding means is approximately used up, the photosensitive film is cut, and the residual photosensitive film wound around the core is removed from the master roll unwinding and holding means; and when all the photosensitive film of the master roll held by the master roll unwinding and holding means has been used up, a master roll is fed to the master roll unwinding and holding means from the taking and holding means.

One embodiment of the present invention is a method for manufacturing a photosensitive film magazine characterized in that: a master roll is fed one by one from the master roll container; a photosensitive film is unwound from the fed master roll; and a photosensitive film magazine is manufactured from the unwound photosensitive film. In this photosensitive film manufacturing method, the following means are provided: a taking and holding means to take and hold a master roll from the master roll container; and a master roll unwinding and holding means to unwind the photosensitive film from the fed master roll. Using the aforementioned means, one master roll is taken out from the master roll container and held by the taking and holding means; when the photosensitive film held by the master roll unwinding and holding means has approximately used up, the end of the photosensitive film held by the taking and holding means is spliced with the end of a photosensitive film unwound from the master roll unwinding and holding means; and all the master roll has been used up in the master roll unwinding and holding means, a master roll is fed to the master roll unwinding and holding means from the taking and holding means.

A preferred embodiment of the present invention will be described as follows.

The present invention is preferably applied to a small photosensitive film magazine such as a 135 cartridge, the film length of which is not more than 100 m. It is more preferable that the present invention is applied to a small photosensitive film magazine, the film length of which is not more than 50 m.

It is preferable that the present invention is applied to a photosensitive film, the ISO photographic sensitivity of which is not less than 25. It is more preferable that the present invention is applied to a photosensitive film, the ISO photographic sensitivity of which is not less than 100.

It is preferable that the present invention is preferably applied to a silver halide color film.

It is preferable that the width of the master roll is the same as that of the photosensitive film to be assembled to a photosensitive film magazine.

It is preferable that the inside of the light-shielding tunnel is black so that light can be absorbed. From the viewpoint of strength and durability, the light-shielding tunnel is preferably made of metal. In order to avoid the deformation of the tunnel caused by corrosion, the tunnel is preferably made of stainless steel or subjected to corrosion prevention treatment. In order to make the inside of the light-shielding tunnel black, the inside is preferably coated with black paint. It is preferable that this black paint contains dye or pigment that absorbs rays of light, the wavelength of which is in a region in which the photosensitive film is substantially sensitive. It is preferable to apply delustering paint, and it is preferable that the paint contains a matting agent. In order to make the inside black, velvet may be applied to the inside of the light-shielding tunnel.

The present invention not necessarily provides all the following effects, however, at least one of the effects can be provided by the present invention. It should be easily understood by a person skilled in the art that the present invention provides either of the following effects.

The present invention provides the following effects: quality and productivity can be improved in the manufacturing process of photosensitive film magazines and photosensitive film cassettes packed in a container, so that the loss can be decreased.

Also, the present invention provides the following effects: parts and photosensitive film magazines can be successively conveyed through a light-shielding tunnel in the manufacturing process of photosensitive film magazines.

Also, the present invention provides the following effects: a parts accommodation box and a product accommodation box are abolished when parts and products are conveyed between the inside of the apparatus maintained under a dark room condition and the outside of the apparatus; the occurrence of damage and deformation can be prevented when parts are supplied to the inside maintained in a dark room condition and when photosensitive magazines are taken out from the inside; and the parts and products are successively conveyed so that the productivity can be improved.

Also, the present invention provides the following effects: the occurrence of damage and deformation of the manufactured photosensitive film magazines can be avoided.

Also, the present invention provides the following effects: after all the photosensitive film magazines have been inspected, only good products are accommodated in containers, so that the loss can be decreased.

Also, the present invention provides the following effects: the loss of expensive photosensitive films can be reduced when the parts are detected at corresponding positions.

Also, the present invention provides the following effects: the apparatus can be made compact and simplified while the parts are supplied in accordance with the photosensitive film.

Also, the present invention provides the following effects: in the case of the occurrence of defectives, it is not necessary to discharge all the batch of photosensitive films, and the defectives are automatically discharged without stopping the operation of the apparatus; and there is no possibility that the defective photosensitive films are assembled into photosensitive film magazines packed in containers.

Also, the present invention provides the following effects: even when the defective films are automatically discharged, they are continuously discharged through a light-shielding tunnel while the dark room condition is maintained, so that the decrease in productivity can be prevented in the case where the defective films are discharged.

Also, the present invention provides the following effects: a plurality of types of photosensitive films can be manufactured by one photosensitive film magazine manufacturing apparatus, so that the productivity can be maintained even when small amounts of products of many types are manufactured.

Also, the present invention provides the following effects: the accommodated photosensitive film is made certain by the recording medium attached onto the master roll container, so that the photosensitive film can be properly charged even when a plurality of types of photosensitive films are processed.

Also, the present invention provides the following effects: a master roll is automatically set at the master roll supply position maintained in a dark room condition, so that the operator's labor can be saved, and it is not necessary for the operator to frequently enter the dark room.

Also, the present invention provides the following effects: a taking and holding means and an unwinding and holding means different from the taking and holding means are provided, so that the flow of photosensitive film supply can be made simple and the occurrence of trouble can be reduced.

Also, the present invention provides the following effects: the apparatus can be made simple.

Also, the present invention provides the following effects: the cores from which the photosensitive films have been supplied can be easily recovered.

BRIEF DESCRIPTION OF THE DRAWINGS

FIGS. 22a–22e, taken together, are a flow chart showing a supplying operation of a master roll container;

FIGS. 23a–23d, taken together are a flow chart showing a discharging operation of the master roll container;

FIGS. 46a–46c, taken together, are a flow chart showing a delivery operation of a master roll;

DESCRIPTION OF THE PREFERRED EMBODIMENT

Next, with reference to the attached drawings, will be explained in detail a method of the present invention for manufacturing film magazines to which photosensitive films are assembled. Also, an apparatus of the present invention for manufacturing film magazines to which photosensitive films are assembled, and a master roll container will be explained as follows In this connection, in the following examples, "a film magazine to which a photosensitive film is assembled" is defined as "a film cassette". Also, "a roll in which a long photosensitive film is rolled" is defined as "a master roll". Further, "a cutting operation to cut a photosensitive film to a predetermined length necessary for the film cassette" is defined as "sizing".

In this example, will be explained a manufacturing method and a manufacturing apparatus for a film cassette to which a photosensitive film stipulated by JIS K-7519-1982 (ANSI PH1, 14-1990) is assembled. However, it should be understood that the present invention is not limited to the specific example. For example, the present invention can be applied to a cartridge made of resin disclosed in Japanese Patent Application Open to Public Inspection Nos. 306844/1989 and 306845/1989, and a small cartridge disclosed in Japanese Patent Application Open to Public Inspection No. 335639/1992. Also, the present invention can be applied to a 110 cartridge and a roll magazine.

Figure 1:
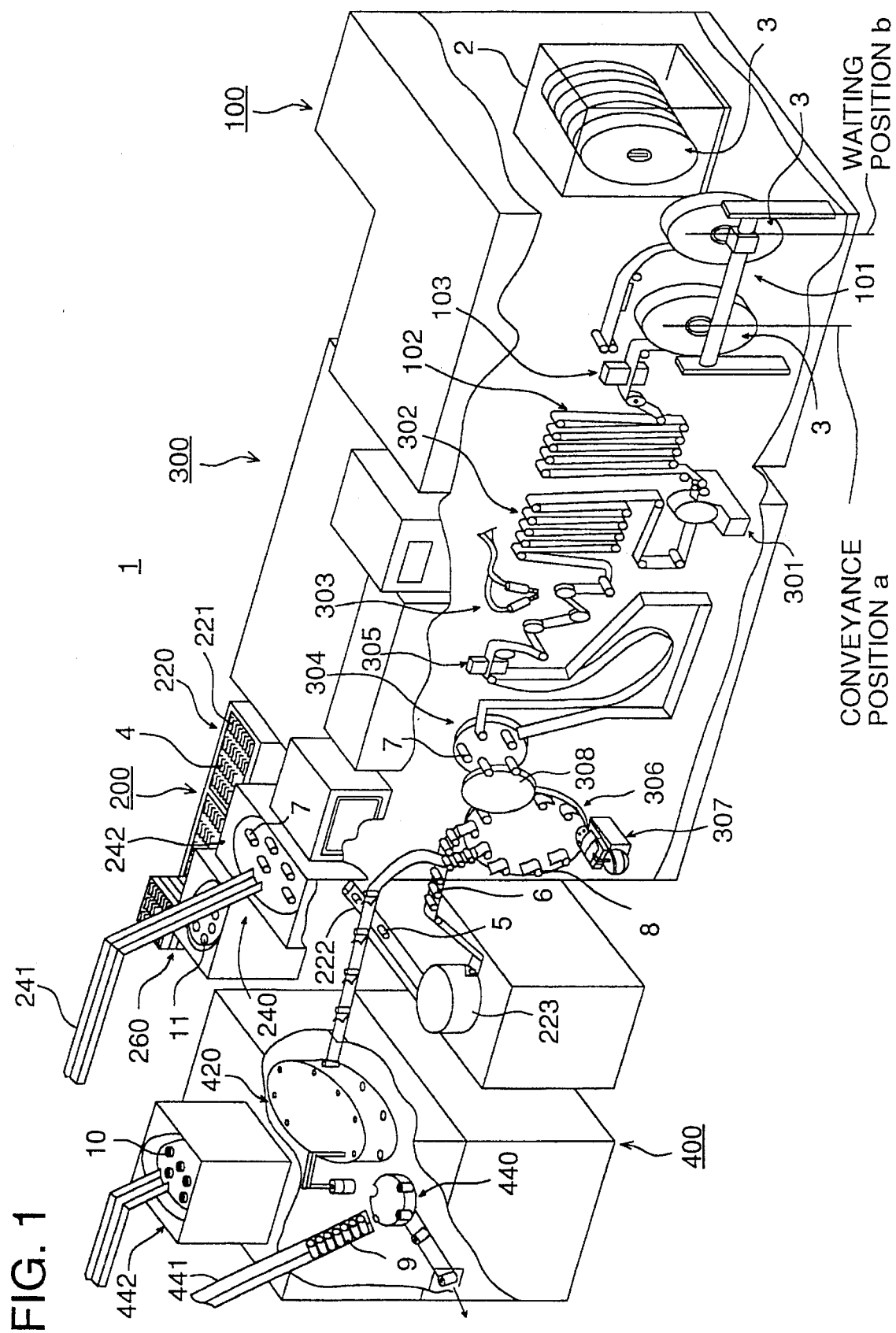
FIG. 1 is a perspective view showing an outline of the overall arrangement of a film cassette manufacturing apparatus.

FIG. 1 is a perspective view showing an overall arrangement of a film cassette manufacturing apparatus. This film cassette manufacturing apparatus 1 includes: a film splicing section 100 in a dark room condition in which a master roll 3 is taken out from a master roll container 2 and then a photosensitive film is fed to the next process from the master roll 3; a parts supply section 200 that supplies the parts to be assembled to a film cartridge; a film processing and assembling section 300 in a dark room condition that processes and assembles the parts supplied from the parts supply section 200 and the photosensitive film conveyed from the film splicing section 100; and a container accommodation section 400 in which the film cassette having the photosensitive film is accommodated in a container.

The film splicing section 100 is maintained in a dark room condition. In the film splicing section 100, the master roll 3 accommodated in the master roll container 2 is taken out and the photosensitive film of the master roll 3 is spliced. The master roll 3 is taken out from the master roll container 2 by an automatic switcher 101. The master rolls 3 are set in the automatic switcher 101, wherein one master roll 3 is set in a conveyance position "a", and the other master roll 3 is set in a waiting position "b". A photosensitive film of the master roll 3 that has been set in the conveyance position "a" is conveyed to a film processing assembly section 300 through an accumulating section 102. A leading end of the photosensitive film of the master roll 3 that has been set at the waiting position "b" is set so that it can be fed. After the photosensitive film of the master roll 3 set at the conveyance position "a" has been used up, the photosensitive film is cut by the splicer 103 and a core at the conveyance position "a" is recovered. Then, the master roll 3 set at the waiting position "b" is moved to the conveyance position "a", and the leading end of the photosensitive film is spliced with the trailing end of the previous photosensitive film that has been cut before. Then, the next master roll 3 is set at the waiting position "b".

The parts supplying section 200 includes a one side calking cartridge processing device 220, a spool supplying device 240, and a cartridge cap supplying section 260.

The one side calking cartridge processing device 220 includes a U-shaped parts automatic supplying section 221, a U-shaped parts forming section 222, and a cartridge cap calking section 223. A U-shaped member 4 accommodated in the U-shaped parts automatic supplying section 221 is formed, so that the U-shaped member 4 can be automatically formed into a one-side calked cartridge 6. This one-side calked cartridge 6 is supplied to a cartridge assembling section 306 of a film processing assembly section 300. In this connection, the one-side cartridge may not be calked.

A spool supplying device 240 includes a supplying rail 241 and a concentrated accommodation section 242. Spools 7 are sent through the supplying rail 241 and temporarily accommodated in the concentrated accommodation section 242. In this concentrated accommodation section 242, the spools 7 are aligned and supplied to a spool assembly section 304 in the film processing assembly section 300 in a predetermined timed relation.

In a cartridge cap supplying section 260, cartridge caps 11 are accommodated. The cartridge caps 11 are supplied to a cartridge assembling section 306 in the film processing assembly section 300.

The film processing assembly section 300 is maintained in a dark room condition. In the processing assembly section 300, perforations are formed with a punch 301 on a photosensitive film conveyed from the accumulating section 102 of the film splicing section 100. This photosensitive film is conveyed to a latent image print section 303 through the accumulating section 102. Frame numbers are printed on the photosensitive film in this latent image print section 303. Then, this photosensitive film is conveyed to the spool assembly section 304, and then cut to a predetermined length by a cutter 305.

The spools 7 are successively supplied to the spool assembly section 304 from the spool supplying device 240. An end of the photosensitive film is attached to a slit of this spool and wound around it. Under the condition that the photosensitive film is wound around the spool, the photosensitive film is supplied to the cartridge assembling section 306 by the carrier 308. One-sided calked cartridges 6 are supplied to the cartridge assembling section 306 from the one side calking cartridge processing device 220. This one side calked cartridge 6 is composed in such a manner that the cartridge cap 11 is calked only at one end of the cartridge body.

The cartridge caps 11 are supplied to the cartridge assembling section 306 from the cartridge cap supplying section 260, and the spool 7 around which the photosensitive film is wound is accommodated in the one-side calked cartridge 6. The cartridge cap 11 is calked to the one-sided calked cartridge 6 by a calking machine 307. In this way, the film cassette 8 into which the photosensitive film has been assembled is manufactured. This film cassette 8 is conveyed to a container accommodation section 400. This container accommodation section 400 includes an inspection device 420 and a cartridge container accommodation section 440.

In the inspection device 420, the pulling force of the photosensitive film provided in the film cassette 8 that has been conveyed from the film processing assembly section 300 is inspected. Faulty film cassettes 8 are discharged from the apparatus, and good film cassettes are sent to the cartridge container accommodation section 440.

The cartridge container accommodation section 440 is provided for the purpose of accommodating the film cassette 8 in the cartridge container 9. The cartridge containers 9 are supplied from the cartridge container supplying section 441. Cartridge caps 10 are supplied from a cartridge cap supplying section 442. In this cartridge container accommodation section 440, the film cassette 8 is accommodated in the cartridge container 9, and under the condition that the cartridge container 9 is closed by the container cap 10, the product is successively conveyed to an outer package line.

Figure 2:
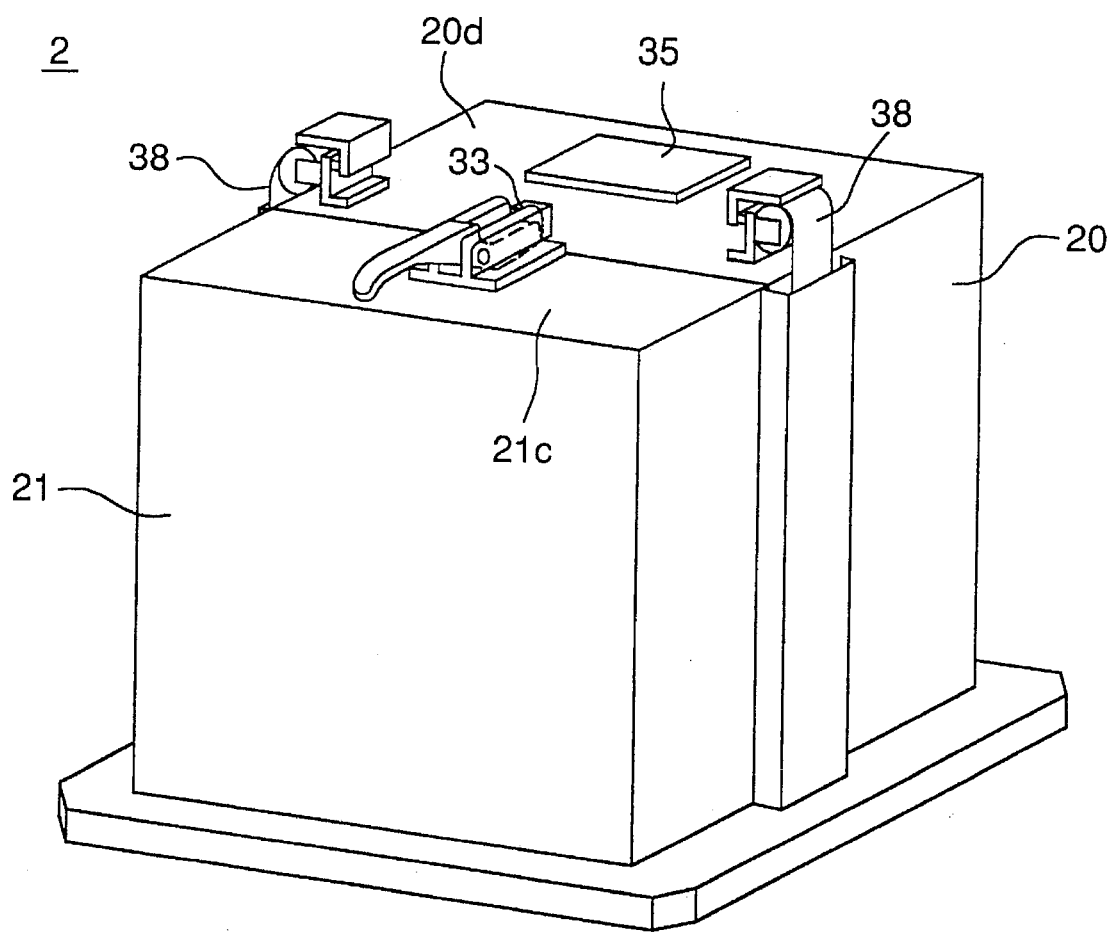
FIG. 2 is a perspective view showing a condition in which a cover of a master roll container is closed.
Figure 3:
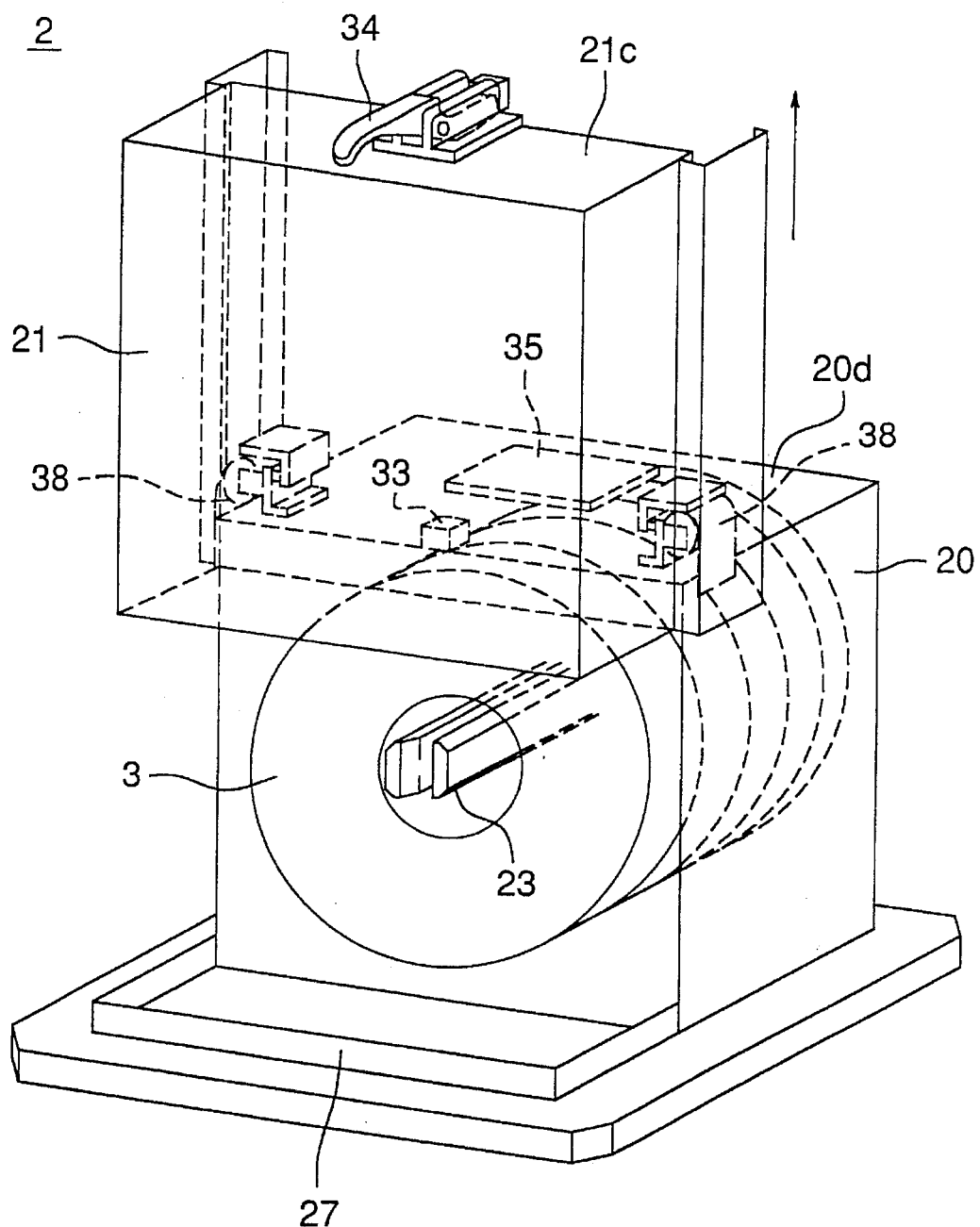
FIG. 3 is a perspective view showing a condition in which the cover of the master roll container is opened.
Figure 4:
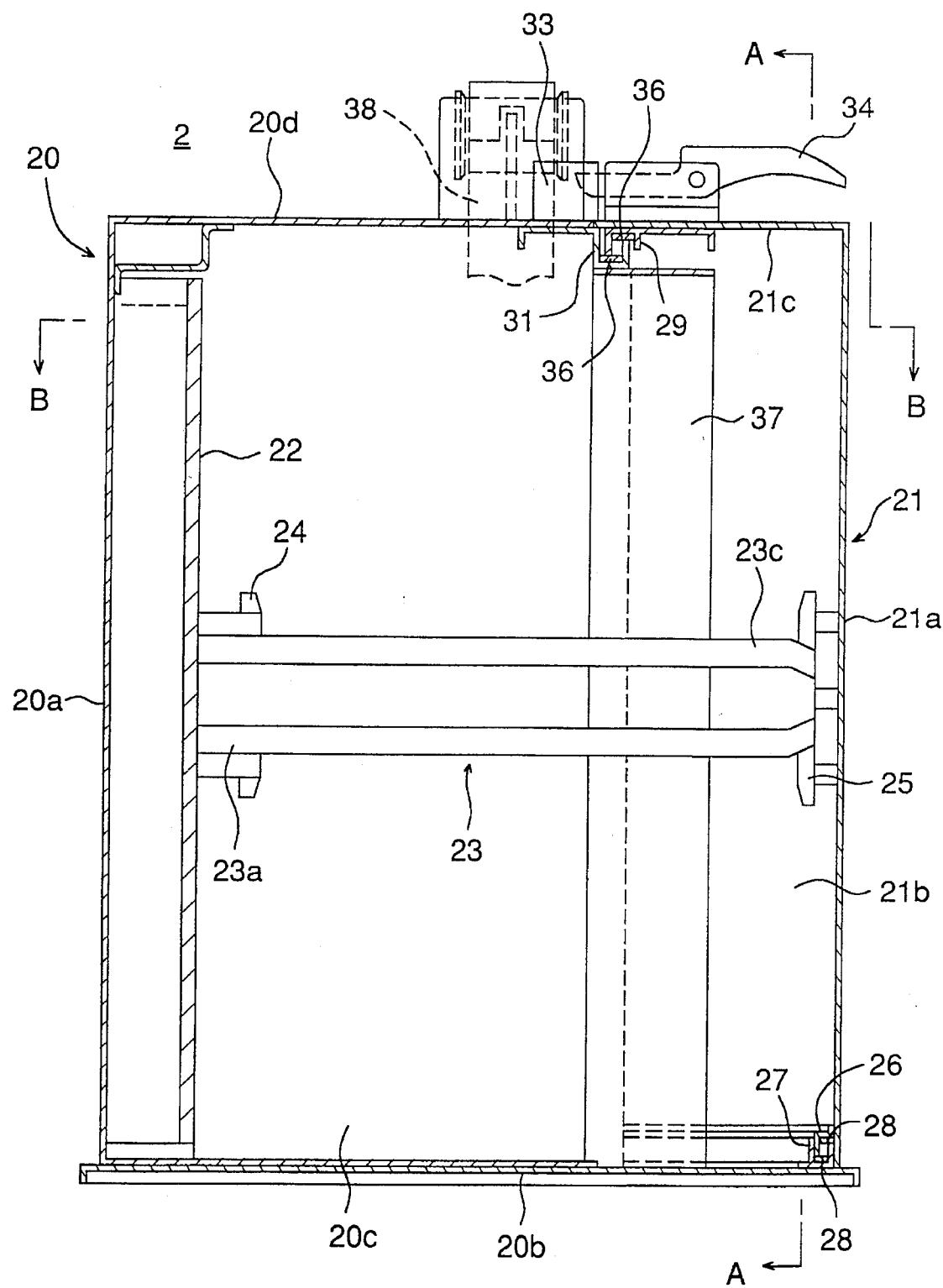
FIG. 4 is a sectional view showing the master roll container.
Figure 5:
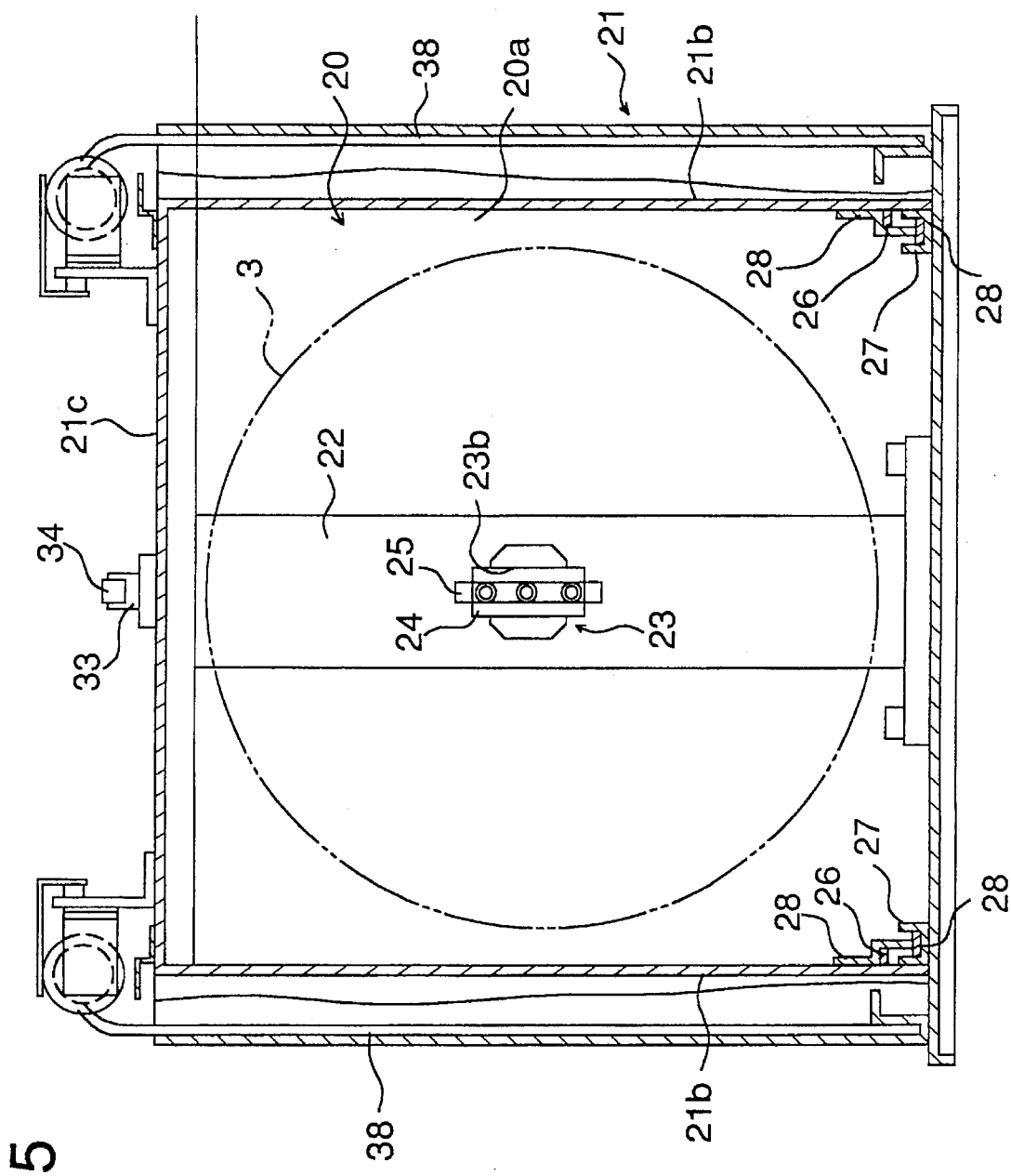
FIG. 5 is a sectional view taken on line A—A in FIG. 4.
Figure 6:
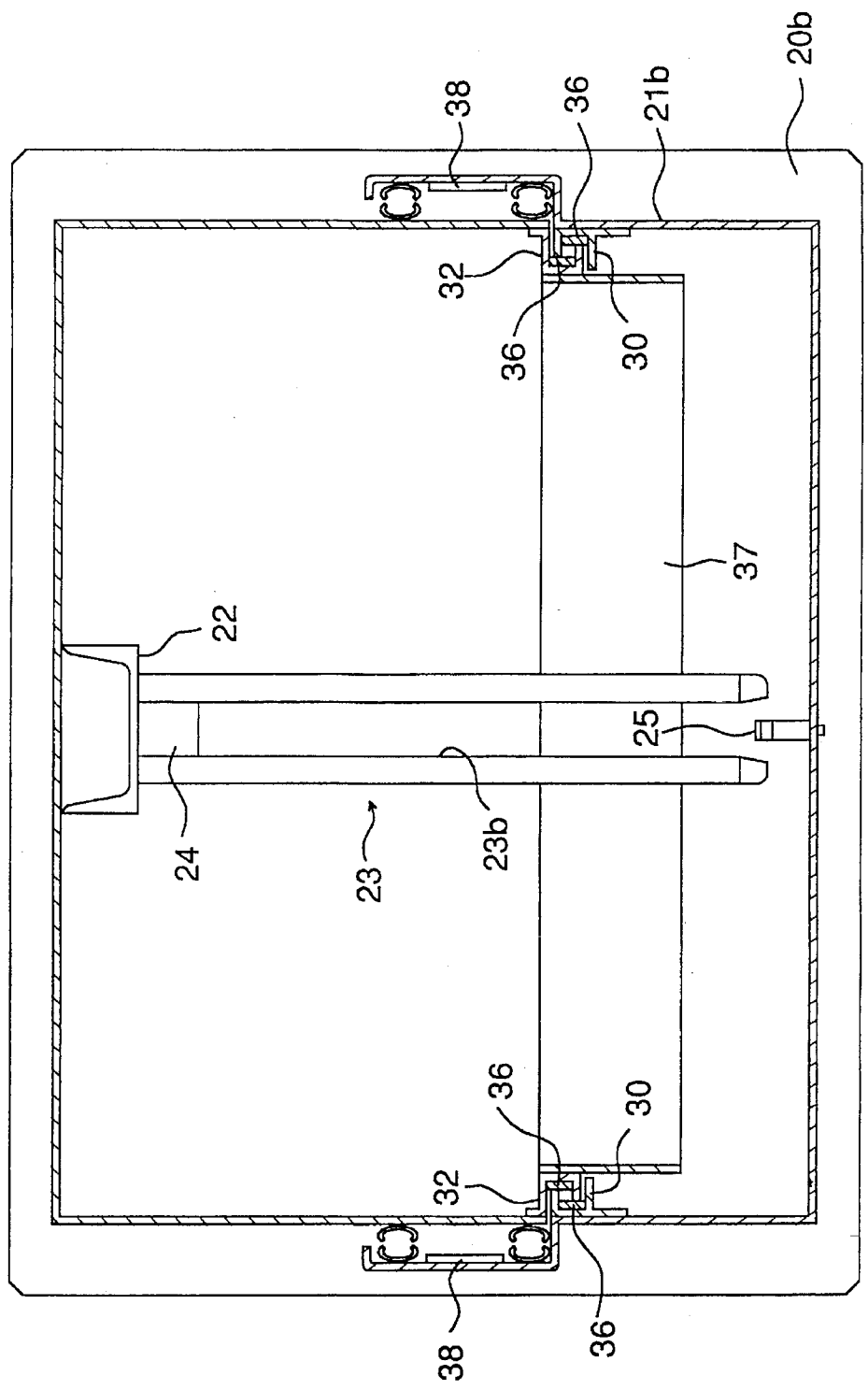
FIG. 6 is a sectional view taken on line B—B in FIG. 4.

Next, with reference to FIGS. 2 to 6, the master roll container 2 will be explained as follows. FIG. 2 is a perspective view of the master roll container 2, the cover of which is closed. FIG. 3 is a perspective view of the master roll container 2, the cover of which is opened. FIG. 4 is a longitudinal sectional view of the master roll container 2. FIG. 5 is a sectional view taken on line A—A in FIG. 4. FIG. 6 is a sectional view taken on line B—B in FIG. 4.

This master roll container 2 is composed of a container body 20 and a cover 21. An inner wall 20a of the container body 20 is provided with a mount plate 22, and a base portion 23a of a support shaft 23 is attached to the center of this mount plate 22. A plurality of master rolls 3 are held by the support shaft 23 that is supported in a cantilever condition. A stopper 24 is provided on the mount side of the support shaft 23. The master roll 3 is positioned by this stopper 24. A slit 23b is formed in the support shaft 23 in the axial direction. The taking and holding means is inserted into this slit 23b when the master roll 3 is taken out. The master roll is lifted by this taking and holding means one by one so that the master roll 3 can be taken out.

A stopper 25 is provided inside of a front wall 21a of the cover 21. This stopper 25 is engaged with the slit 23b at the end 23c of the support shaft 23. When this stopper 25 is engaged with the slit 23b under the condition that the cover 21 is closed, the master roll 3 held by the support shaft 23 is positioned.

An engagement plate 26 is provided in the lower portion of the front wall 21a and the side wall 21b of the cover 21, and an engagement plate 27 is provided in the lower portion of a bottom wall 20b and a side wall 20c of the container body 20, wherein the engagement plates 26 and 27 are opposed to each other. These front wall 21a, side wall 21b and engagement plate 26 are engaged with the engagement plate 27 in such a manner that protruding portions and cutout portions are engaged with each other, and light shielding members are provided inside of the engagement plates 26 and 27 for shielding. In this case, the front wall 21a, side wall 21b and engagement plate 26 are engaged with the engagement plate 27 so that the protruding portions and cutout portions are engaged in a double structure, however, a triple or quadruple or other structure may be employed.

An upper wall 21c and a side wall 21b of the cover 21 are provided with engagement plates 29 and 30. An upper wall 20d and a side wall 20c of the container body 20 are provided with engagement plates 31 and 32 that are opposed to each other. The engagement plates 29 and 30, and the engagement plates 31 and 32 are engaged with each other in such a manner that protruding portions and cutout portions are engaged. Light shielding members 36 are applied inside of the engagement plates 29, 30 and the engagement plates 31, 32 for shielding. In this case, the engagement plates 29, 30 and the engagement plates 31, 32 are engaged in such a manner that the protruding portions and cutout portions are engaged in a double structure, however, a triple or quadruple or other structure may be employed.

A light shielding wall 37 is welded to the engagement plates 31, 32 of the container body 20. This light shielding wall 37 is provided on the entire inner circumference of the cover 21 so as to shield light.

Leaf springs 38 are provided on both sides of the upper portion of the container body 20, and also on both sides of the lower portion of the cover 21. The cover 21 is slid with respect to the container body 20 in a direction perpendicular to the support shaft 23 by an upward force generated by the leaf spring 38, so that the cover 21 can be opened and closed.

A lock mechanism 33 is provided on an upper wall 20d of the container body 20. On the other hand, a release lever 34 is provided on an upper wall 21c of the cover 21. The cover 21 is locked and released by these release lever 34 and the lock mechanism 33. When the release lever 34 is operated upward, the lock is released, and the cover 21 can be opened. In this connection, various mechanisms such as a conventional lock mechanism and a pin mechanism can be applied to the lock mechanism of the cover 21.

A recording medium 35 is provided on the upper wall 20d of the container body 20, wherein information necessary for controlling the photosensitive film is recorded on the recording medium 35, for example, the number of a master roll container, the date of slitting of a master roll, the type of a photosensitive film, the number of a slitting machine, and the number of photographic emulsion are recorded in the recording medium 35.

As described above, in the master roll container 2, a plurality of master rolls 3 are held by the support shaft 23 inside the container body 20. When the cover 21 of the container body 20 is closed, the protruding and cutout portions are engaged so light can be shielded. In the case where the master roll 3 is taken out, the lock release lever 34 is operated upward. Then, the cover 21 is unlocked and lifted, so that the cover 21 is slid and opened in a direction perpendicular to the support shaft 23. In this way, the master roll 3 can be taken out. Further, when information necessary for controlling the photosensitive film is read from the recording medium 35 provided outside of the container body 20, the photosensitive film can be easily controlled during the manufacturing process.

Accordingly, when this master roll container 2 is used, photosensitive films can be automatically set into and taken from the film splicing section 100. Further, all the control operations are automatically carried out, and at the same time, it is not necessary for the operator to manually set and take a master roll in a dark room condition. Therefore, labor can be saved, and safety can be improved.

Next, with reference to FIGS. 7 to 52, the film splicing section 100 will be explained in detail as follows. First, a station to supply the master roll container 2 to the film splicing section 100 will be explained with reference to FIGS. 7 to 23.

Figure 7:
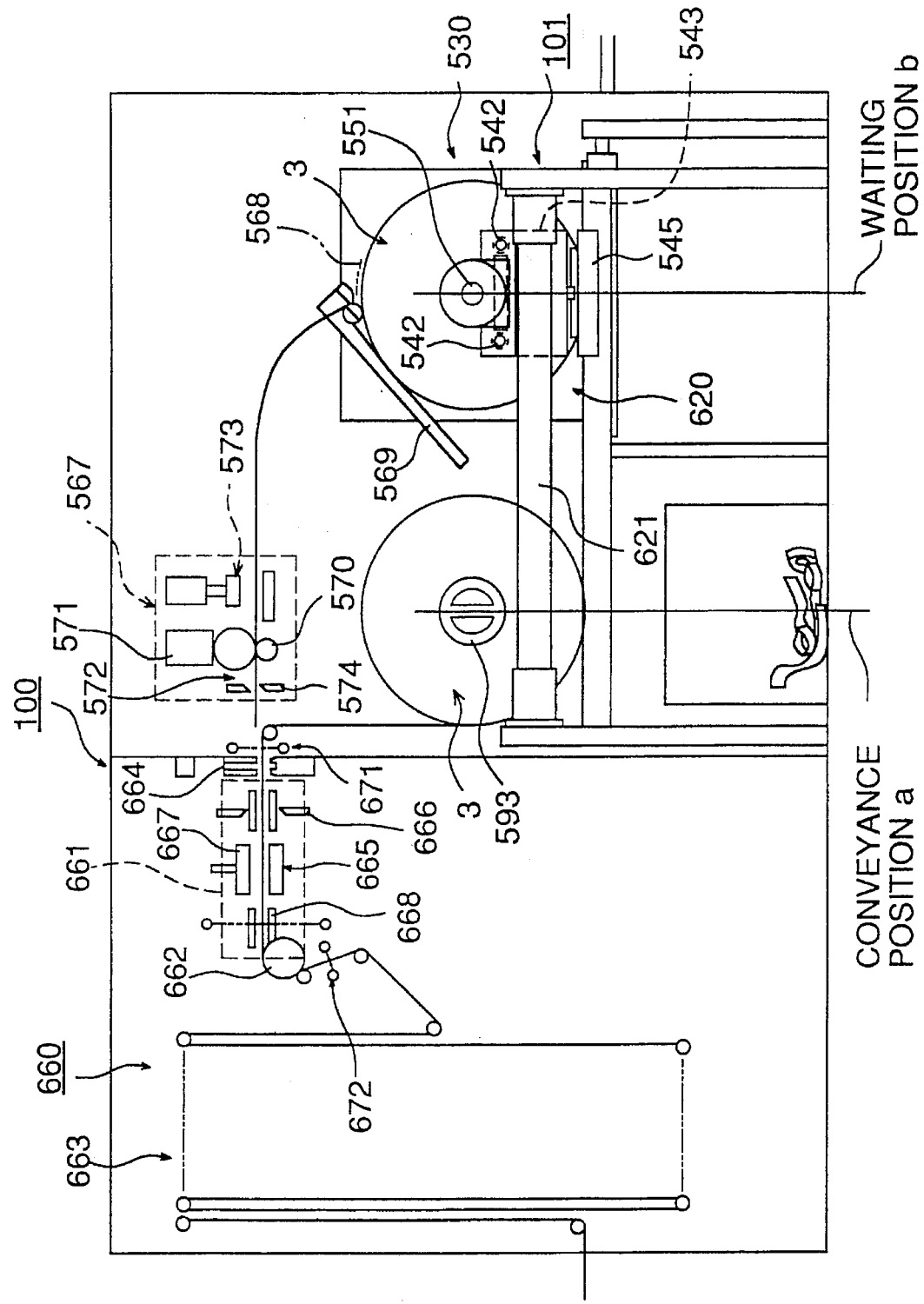
FIG. 7 is a side view showing an outline of a film splicing section.
Figure 8:
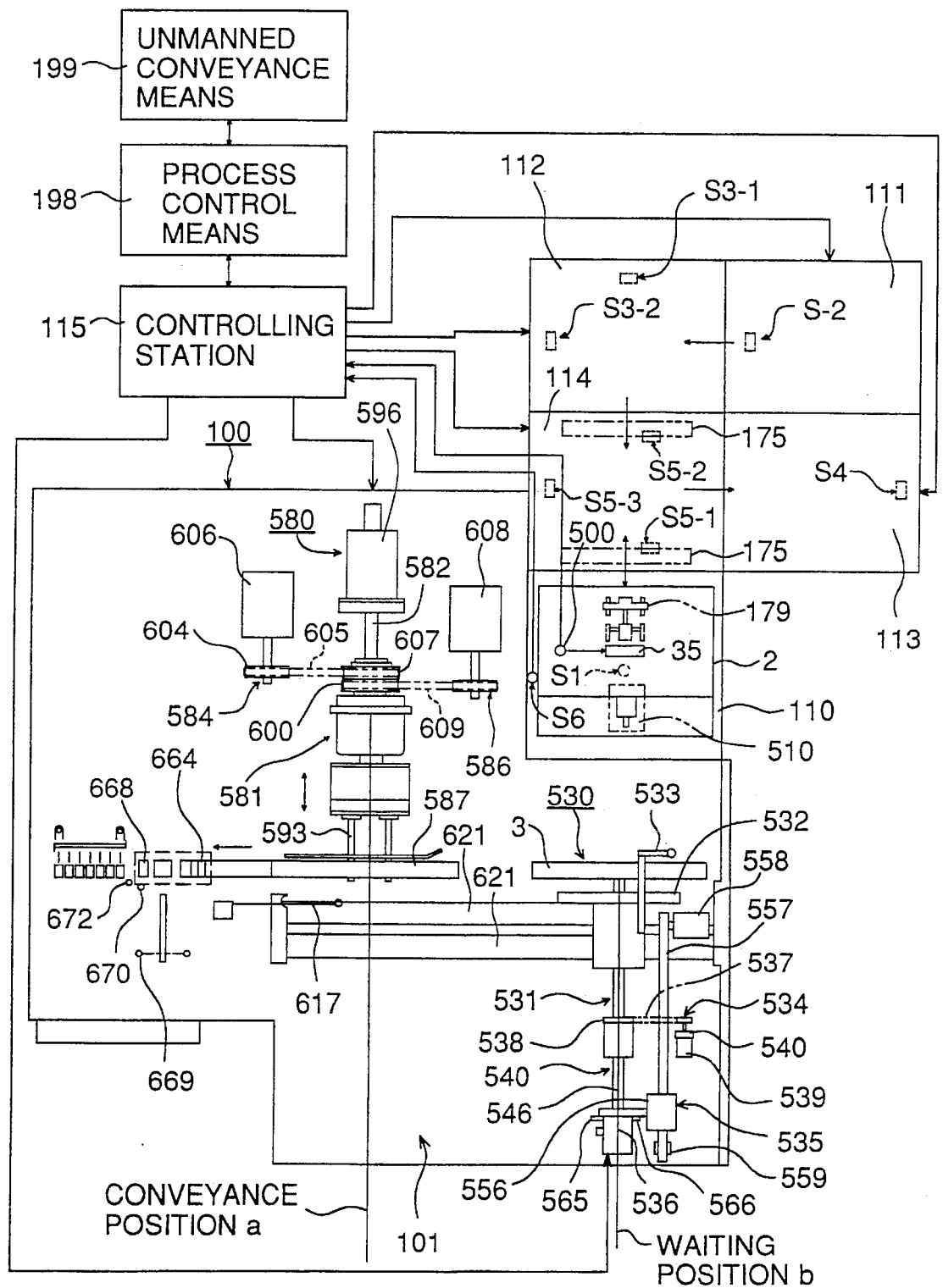
FIG. 8 is a plan view showing an outline of the film splicing section.
Figure 9:
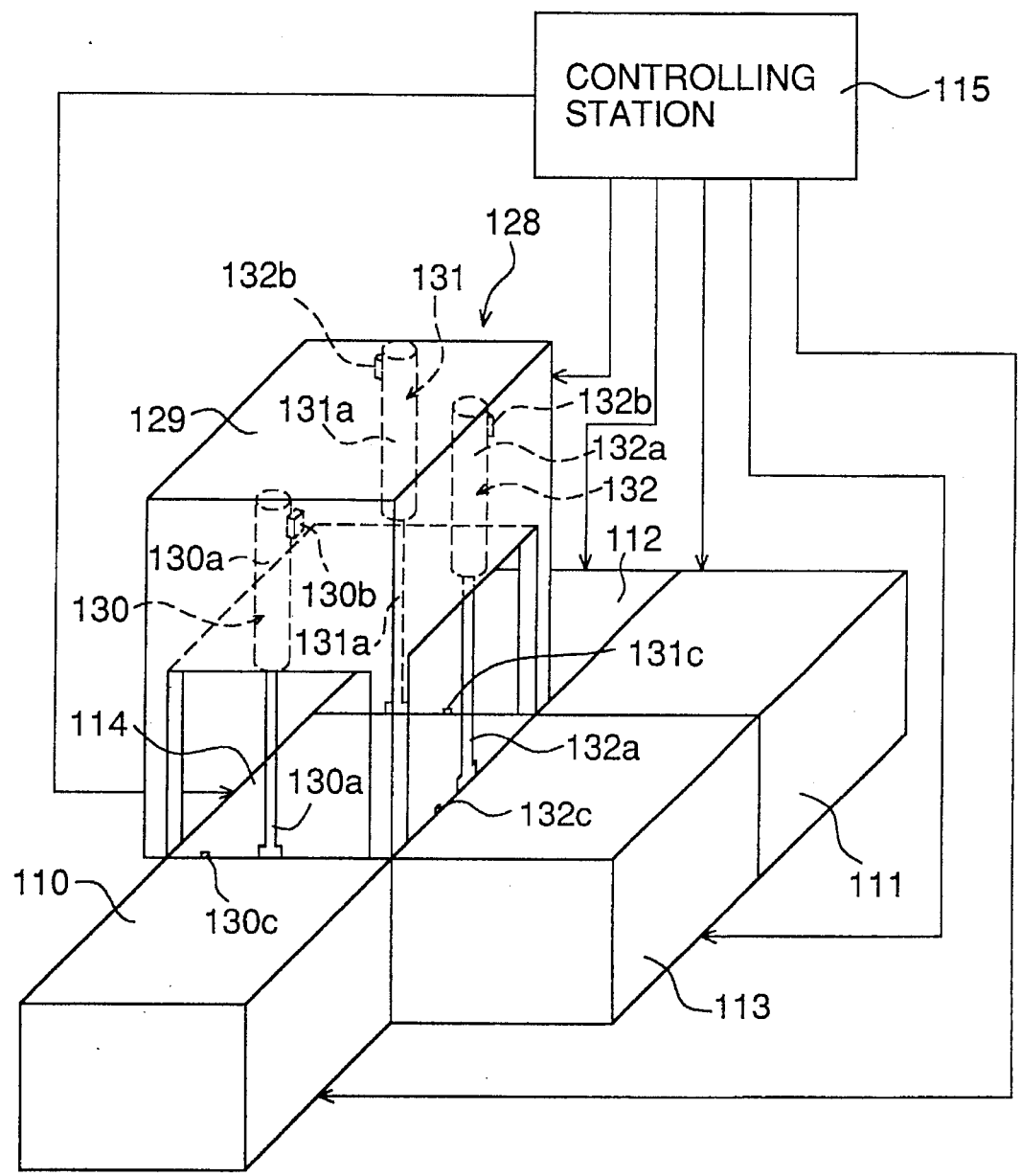
FIG. 9 is a schematic illustration showing an arrangement of a station of the film splicing section.
Figure 10:
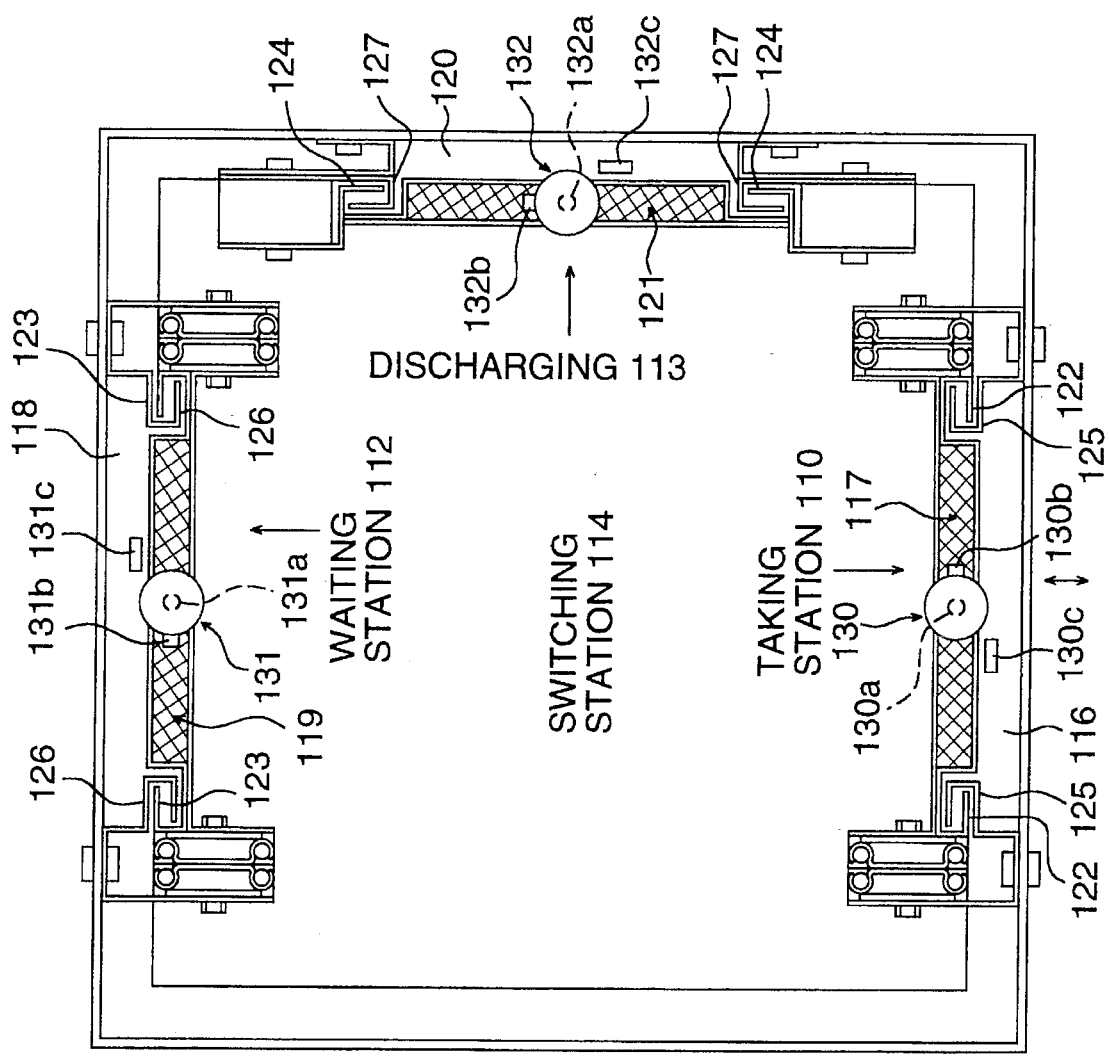
FIG. 10 is a plan view showing an arrangement of a light shielding shutter of the station of the film splicing section.
Figure 11:
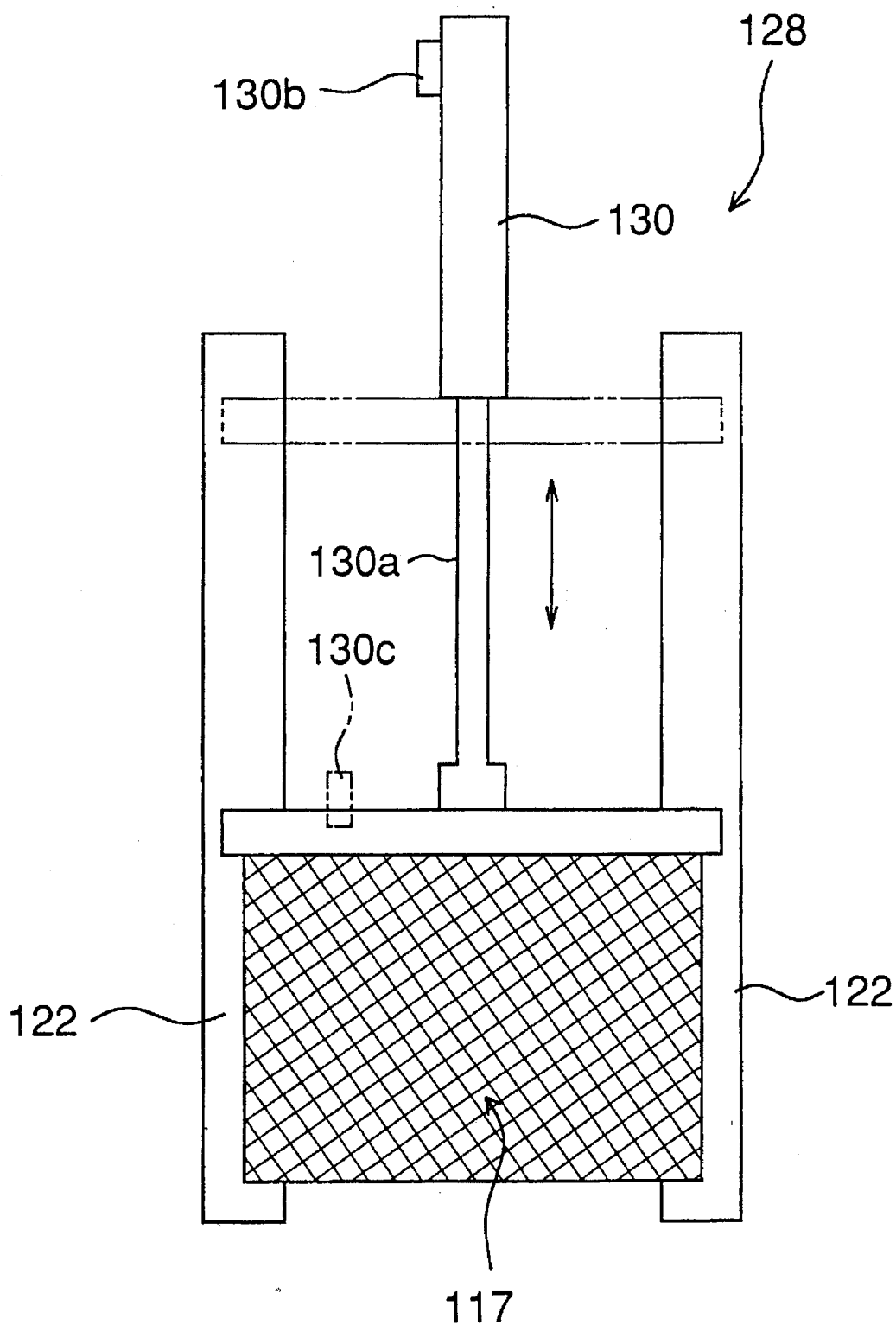
FIG. 11 is a schematic illustration showing an opening and closing mechanism of the light shielding shutter.
Figure 12:
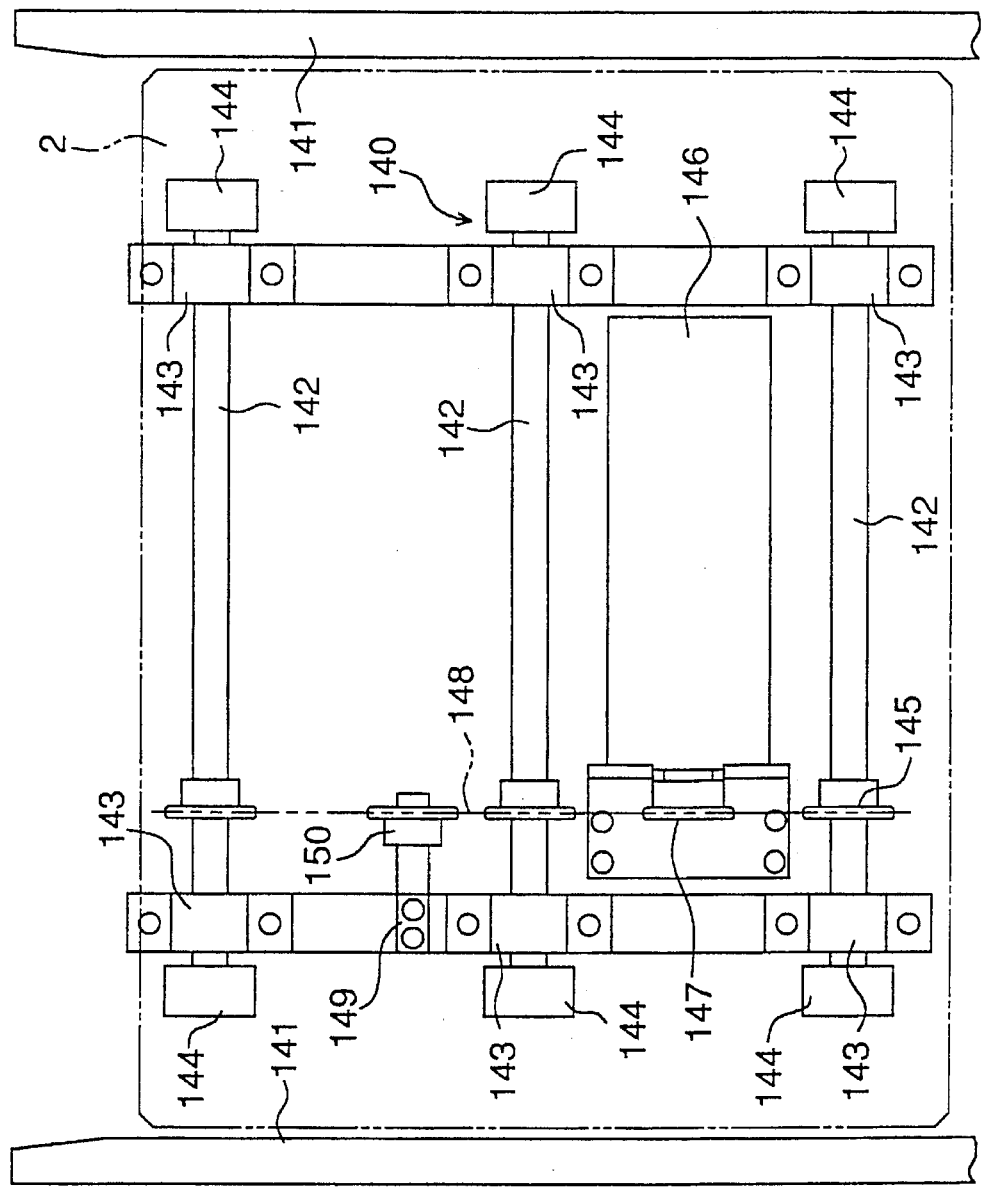
FIG. 12 is a plan view showing conveyance mechanisms of taking, supplying and discharging stations.
Figure 13:
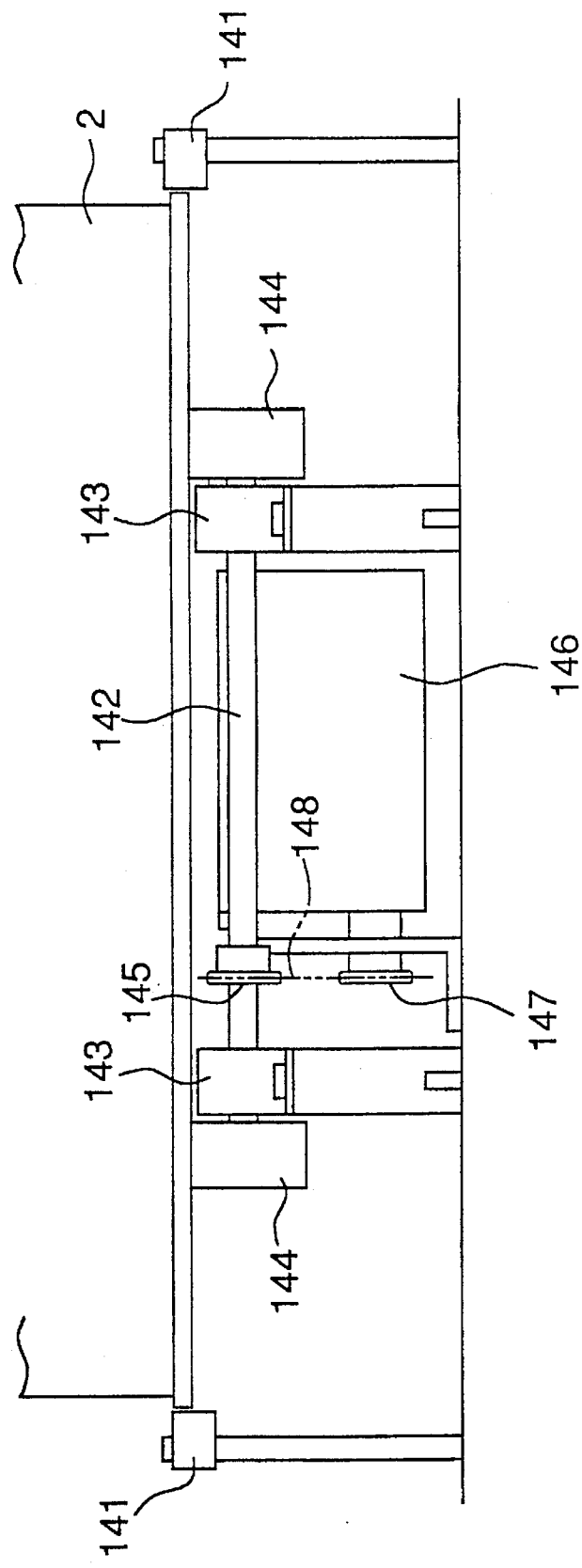
FIG. 13 is a front view showing the conveyance mechanisms of the taking, supplying and discharging stations.
Figure 14:
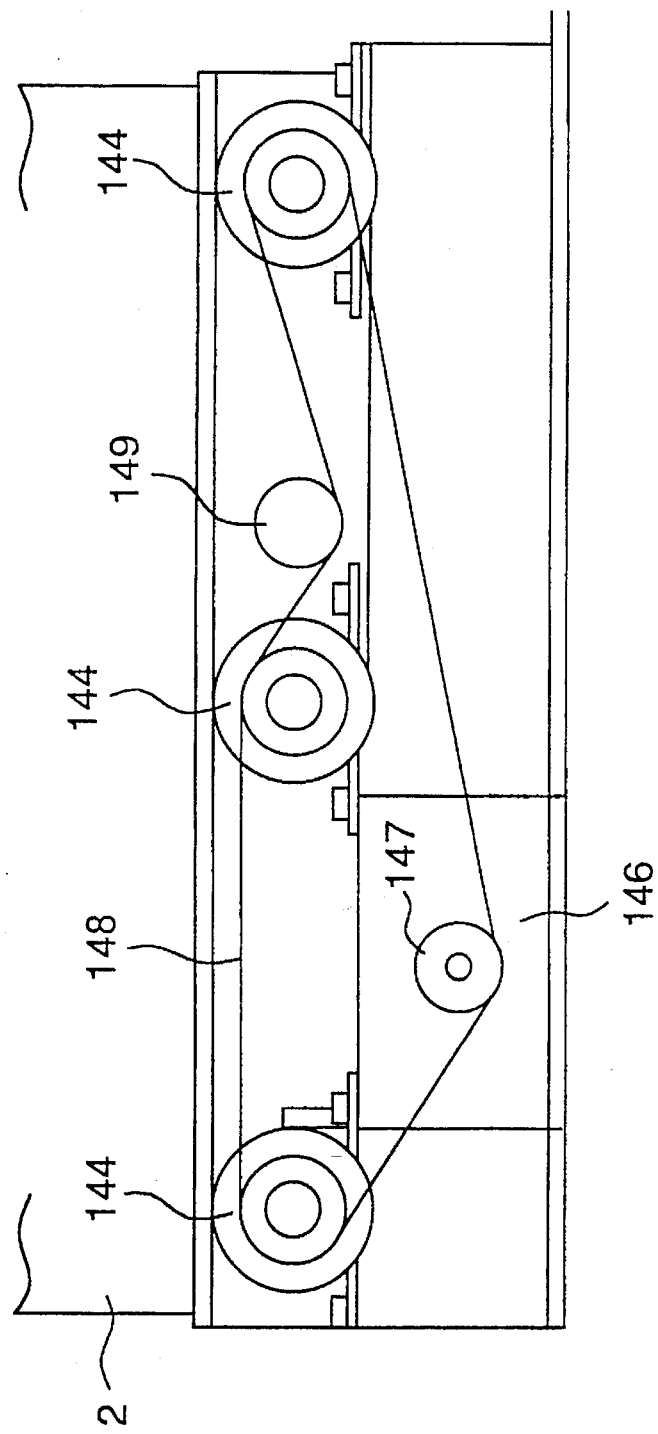
FIG. 14 is a side view showing the conveyance mechanisms of the taking, supplying and discharging stations.
Figure 15:
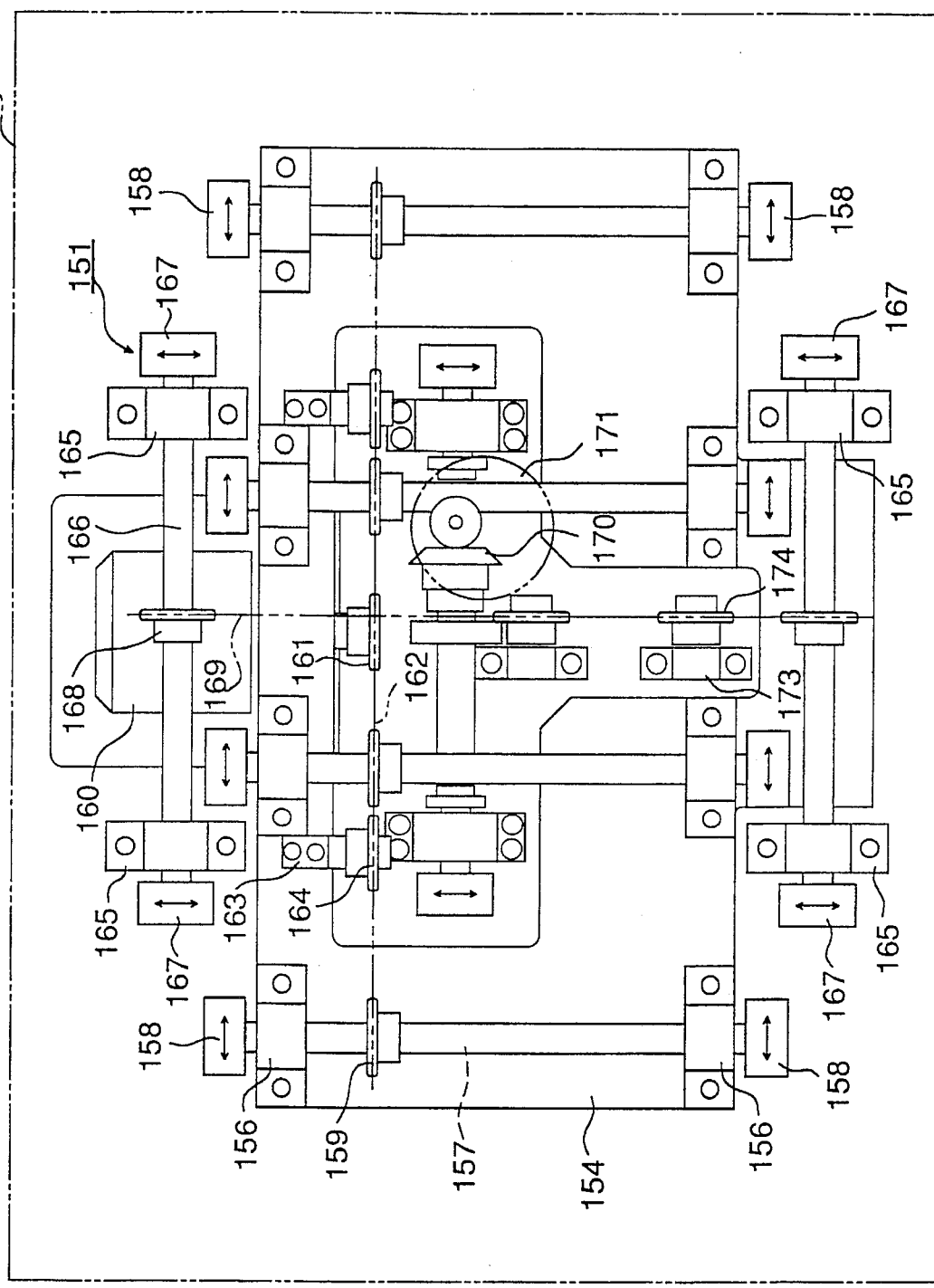
FIG. 15 is a plan view showing conveyance mechanisms of waiting and switching stations.
Figure 16:
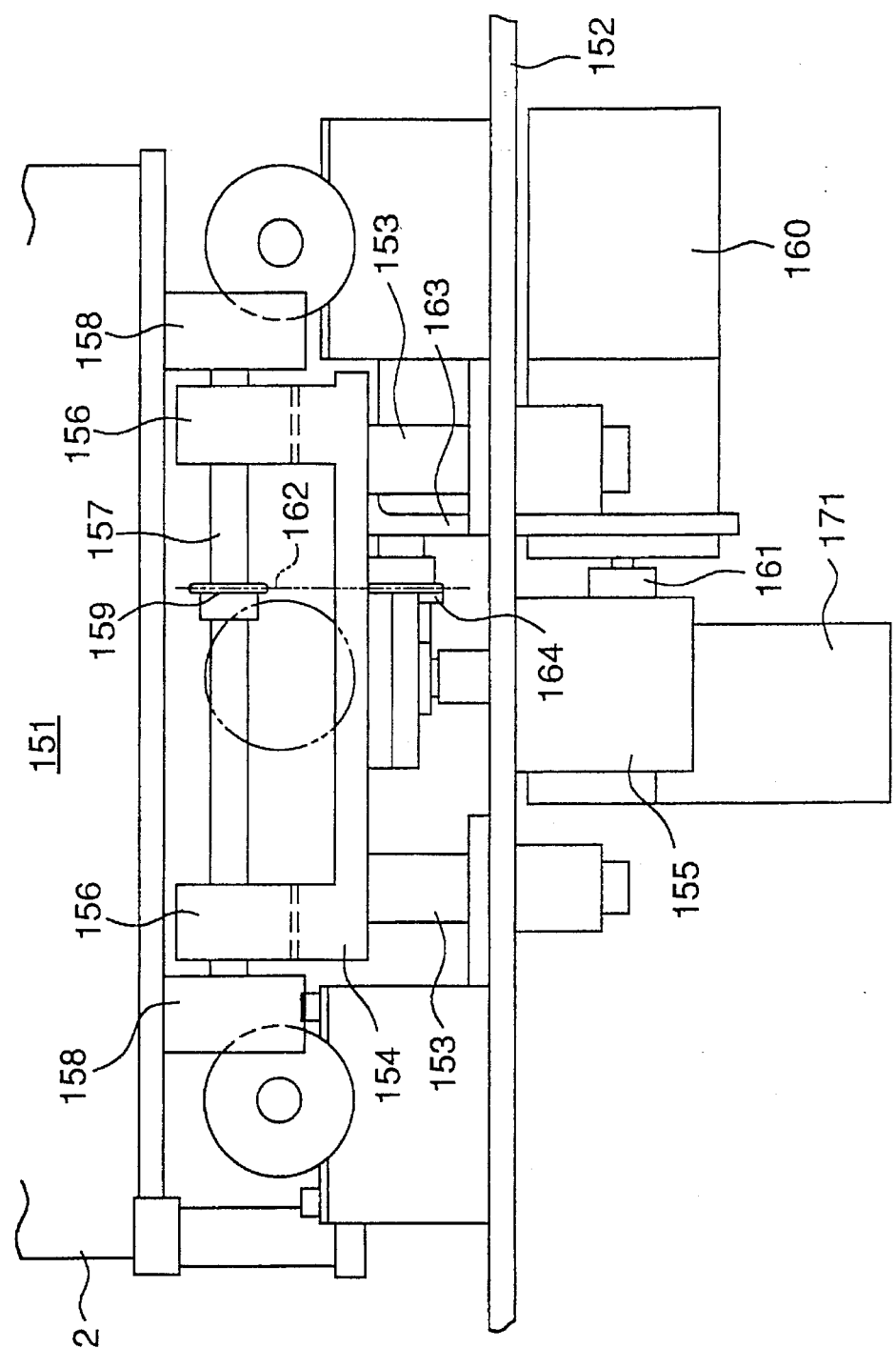
FIG. 16 is a side view showing conveyance mechanisms of waiting and switching stations.
Figure 17:
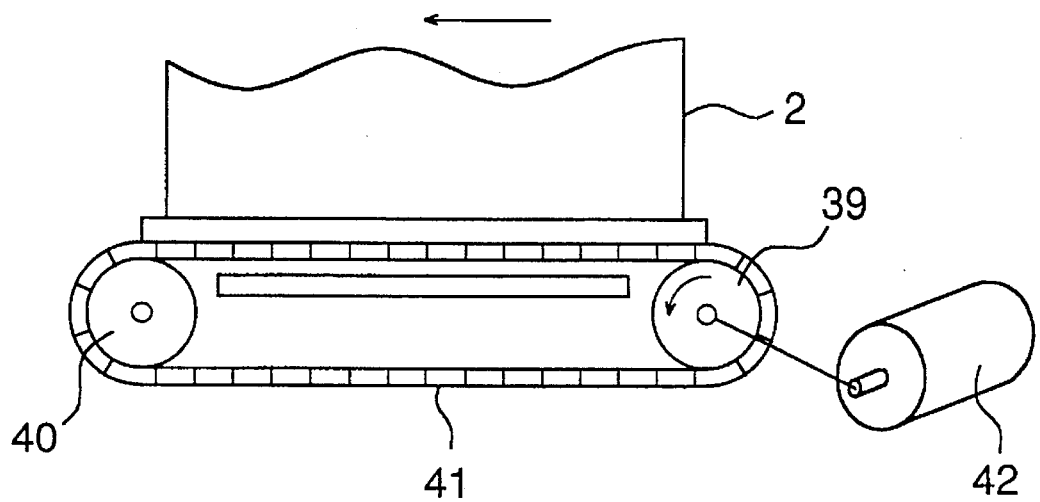
FIG. 17 is a schematic illustration showing another example of the conveyance mechanism.
Figure 18:
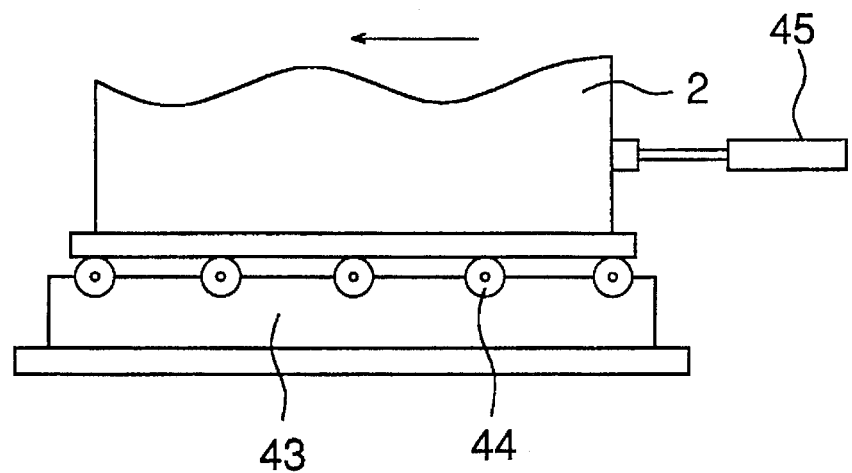
FIG. 18 is a schematic illustration showing still another example of the conveyance mechanism.
Figure 19:
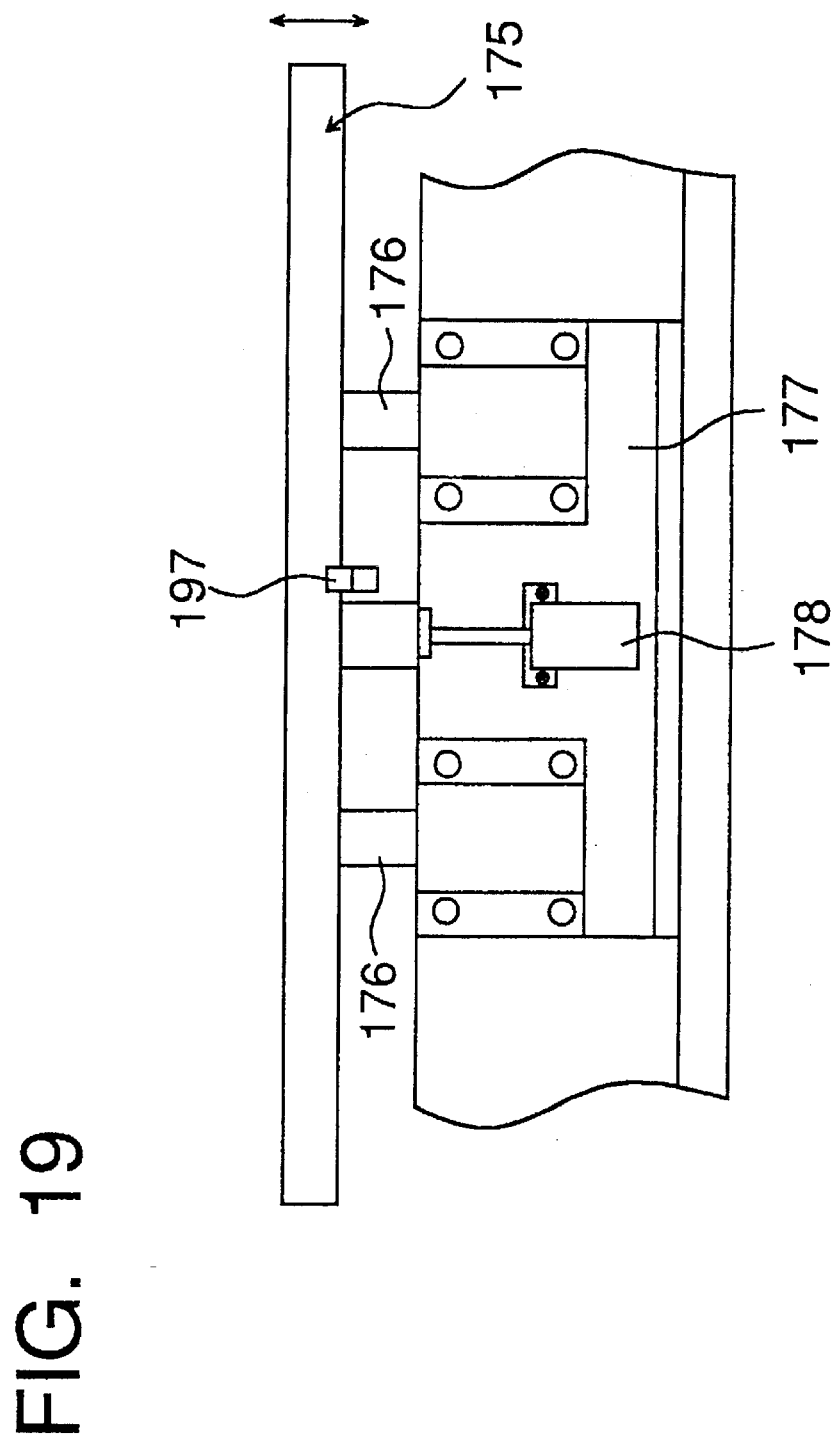
FIG. 19 is a side view showing a positioning stopper of the switching station.
Figure 20:
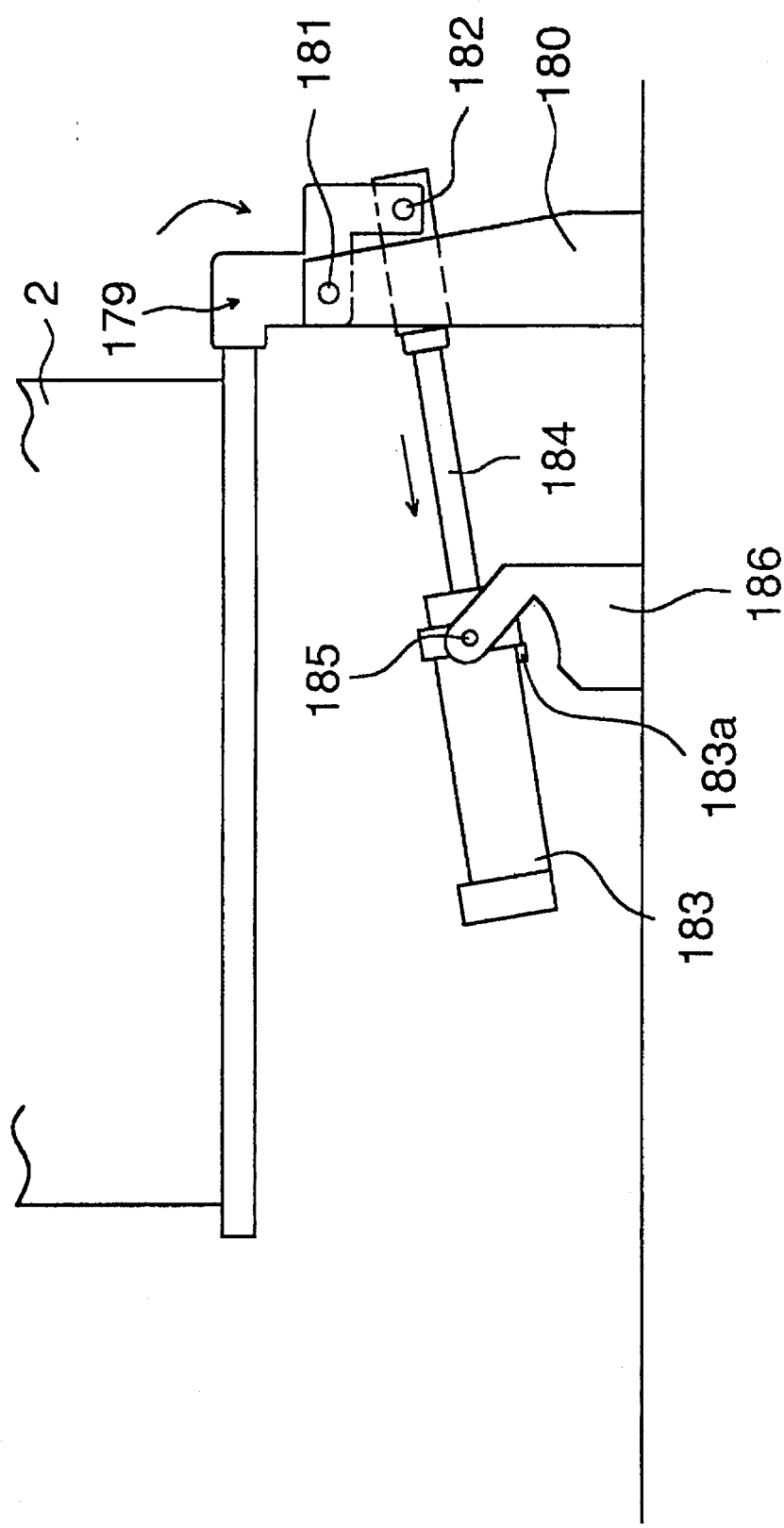
FIG. 20 is a side view showing a positioning stopper of the taking station.
Figure 21:
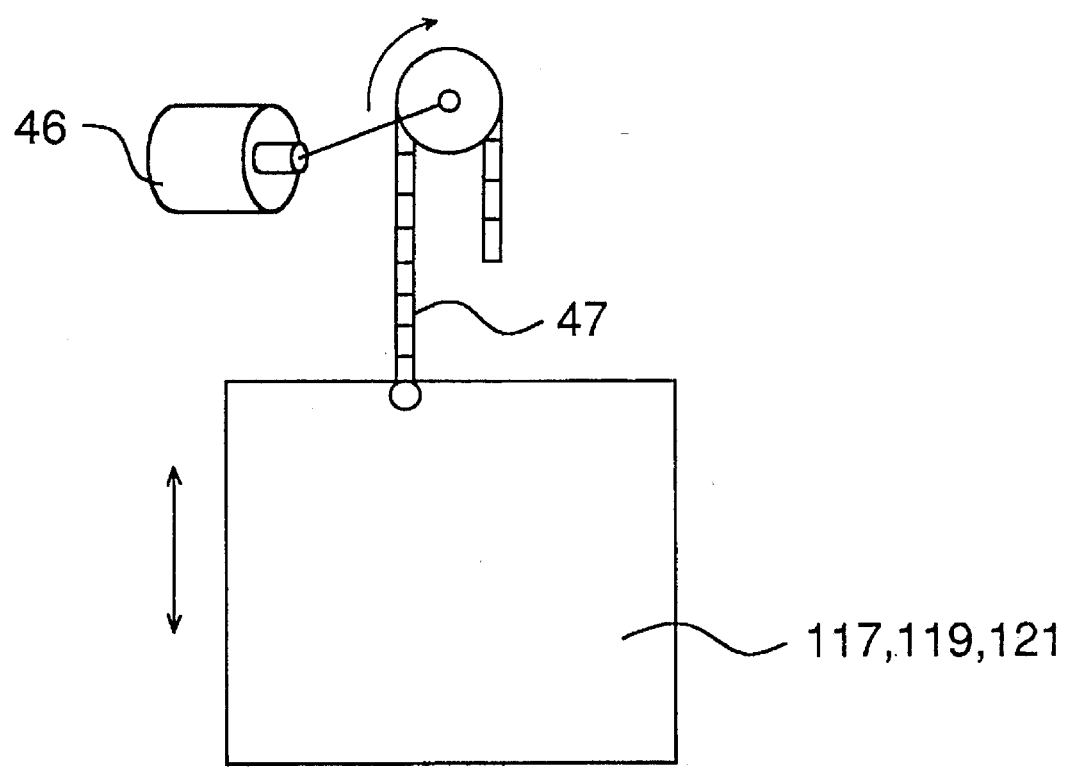
FIG. 21 is a schematic illustration of another example of the opening and closing mechanism of the light shielding shutter.
Figure 22B:
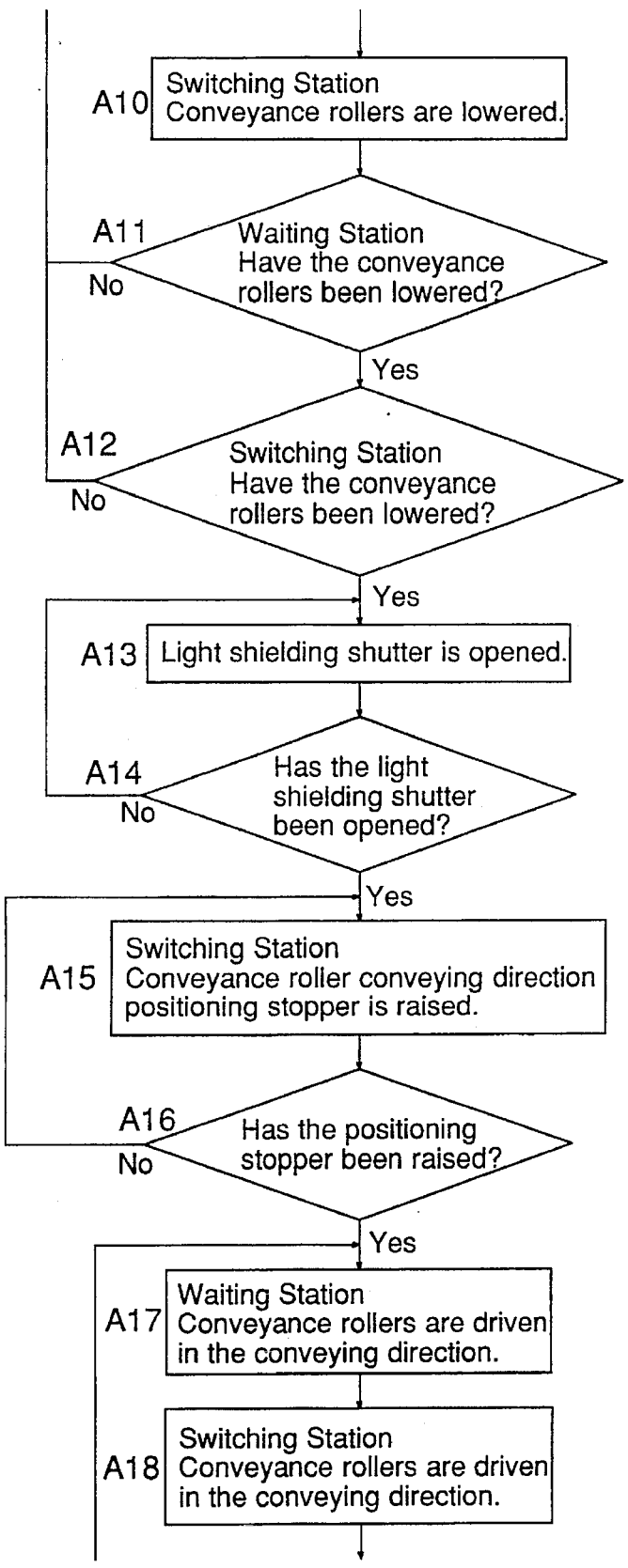
Figure 22C:
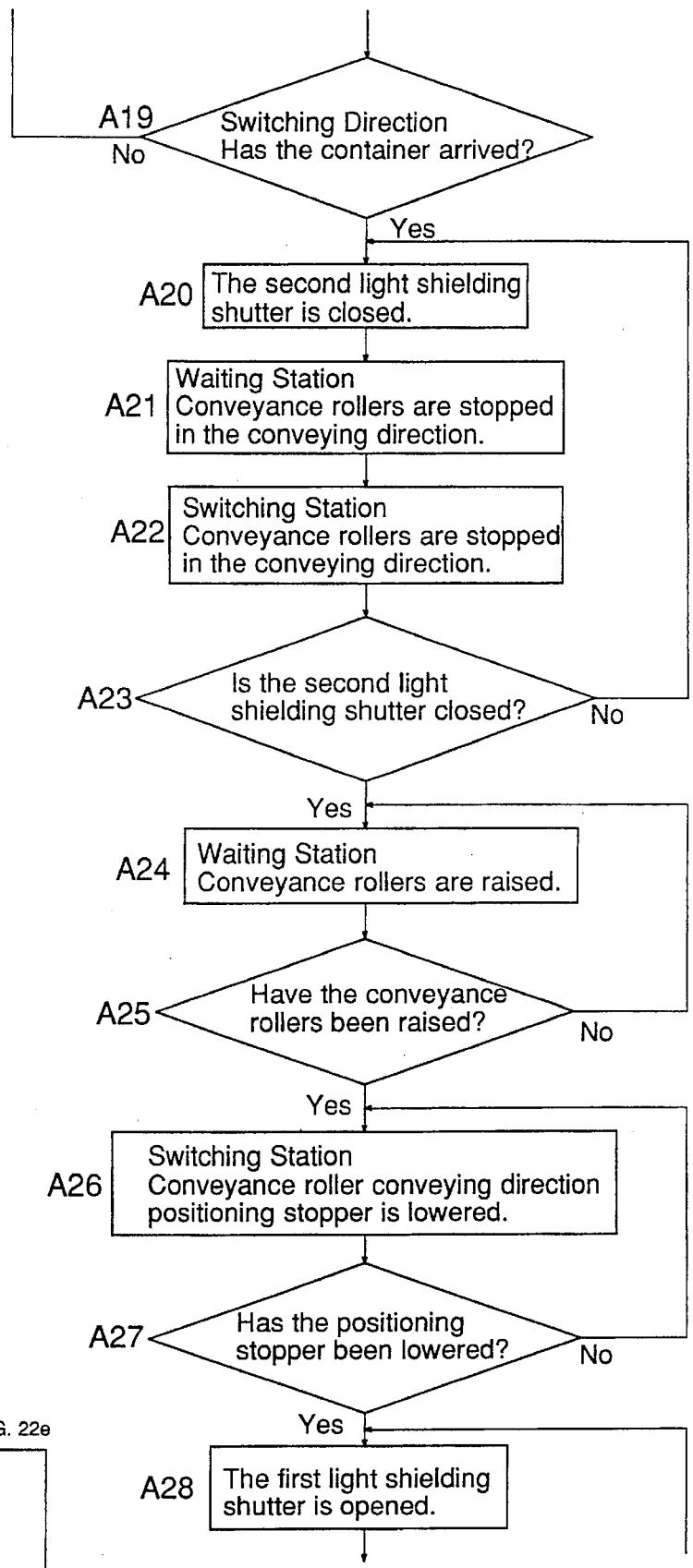
Figure 22D:
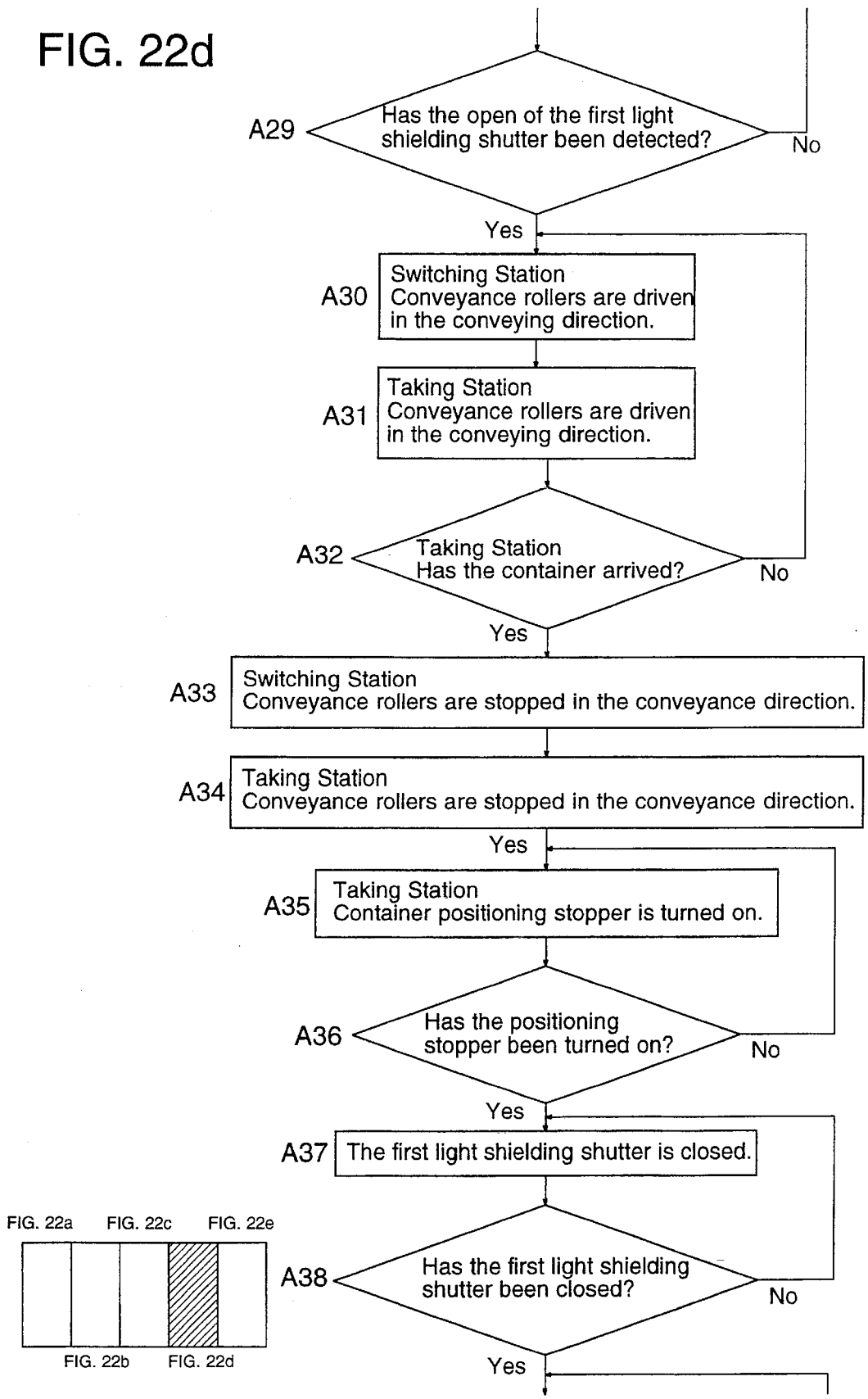
Figure 23C:
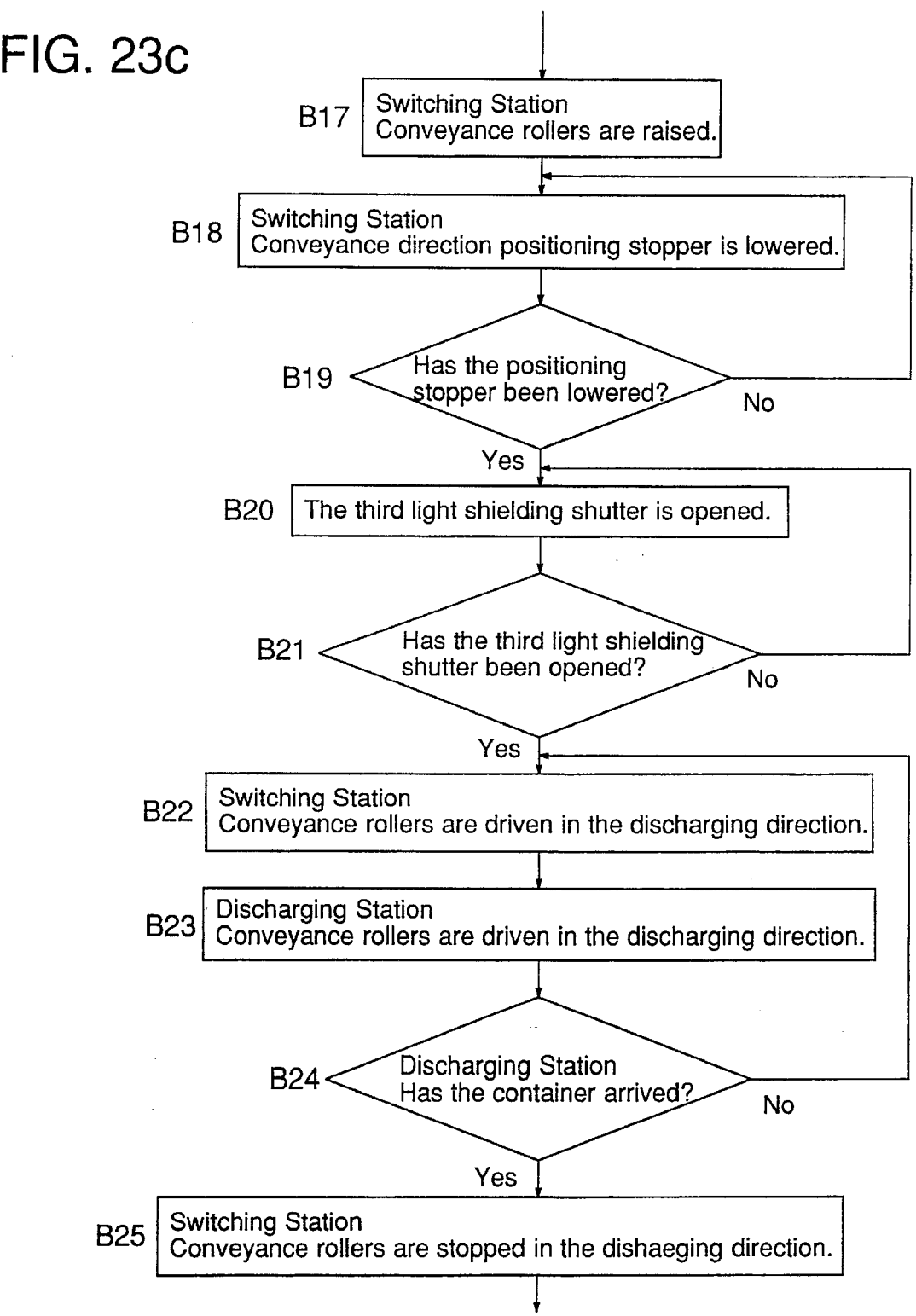

FIG. 7 is a side view showing an outline of the film splicing section. FIG. 8 is a plan view showing an outline of the film splicing section. FIG. 9 is a schematic illustration showing an arrangement of the station of the film splicing section. FIG. 10 is a plan view showing an arrangement of a light shielding shutter of the station. FIG. 11 is a schematic illustration showing an opening and closing mechanism of the light shielding shutter. FIG. 12 is a plan view showing conveyance mechanisms of a taking station, a supply station, and a discharge station. FIG. 13 is a front view showing the conveyance mechanisms of the taking station, the supply station, and the discharge station. FIG. 14 is a side view showing the conveyance mechanisms of the taking station, the supply station, and the discharge station. FIG. 15 is a plan view showing the conveyance mechanisms of a waiting station and a switching station. FIG. 16 is a side view showing the conveyance mechanisms of the waiting station and the switching station. FIG. 17 is a schematic illustration showing another example of the conveyance mechanism. FIG. 18 is a schematic illustration showing yet another example of the conveyance mechanism. FIG. 19 is a side view of a positioning stopper of the switching station. FIG. 20 is a side view of a positioning stopper of the taking station. FIG. 21 is a schematic illustration of the light shielding shutter opening and closing mechanism of another example. FIG. 22 is a flow chart in the case where a master roll container is supplied. FIG. 23 is a flow chart in the case where the master roll container is discharged.

The film splicing section 100 is maintained in a dark room condition in which the master roll 3 is taken out from the master roll container 2 and the photosensitive film is unwound to the next process. This film splicing section 100 includes a taking station 110, supplying station 111, waiting station 112, discharging station 113, and switching station 114. Further, the film splicing section 100 includes a control means 115 to control those stations. The taking station 110, supplying station 111, waiting station 112, discharging station 113, and switching station 114 are respectively provided with proximity sensors S1, S2, S3-1, S3-2, S4, S5-1, S5-2 and S5-3 that check the existence of the master roll container 2.

In the taking station 110, the master roll 3 is taken out from the master roll container 2. To the supplying station 111, the master roll container 2 accommodating the master roll 3 that has been cut to a predetermined length in a cutting process is supplied. In the waiting station 112, the master roll container 2 sent from the supplying station 111 waits for the next process. In the discharging station 113, the empty master roll container 2 from which the master roll has been taken out is discharged. In the switching station 114, the empty master roll container 2 is received from the taking station 110 and conveyed to the discharging station 113. Further in the switching station 114, the master roll container 2 is received from the waiting station 112 and conveyed to the taking station 110.

The master roll container 2 is supplied to the supplying station 111 being controlled by the control means 115. Then, the master roll container 2 is conveyed to the waiting station 112, and waits in this waiting station 112. After all the photosensitive film has been taken out from the master roll container 2 in the taking station 110, this empty master roll container 2 is conveyed to the discharging station 113 through the switching station 114. After that, the master roll container 2 waiting in the waiting station 112 is supplied to the taking station 110 through the switching station 114.

The conveyance mechanisms 140 of the taking station 110, the supplying station 111 and the discharging station 113 are constructed as shown in FIGS. 12 to 14. The master roll container 2 is conveyed being guided by a pair of guide rails 141. Between the pair of guide rails 141, there are provided three drive shafts 142 that are supported by bearings 143. The number of the drive shafts is not limited to three, that is, the number of the drive shafts may be four. Conveyance rollers 144 are provided at both sides of this drive shaft 142. The master roll container 2 is set on the conveyance rollers 144. When the conveyance rollers 144 are rotated, the master roll container 2 is conveyed.

A sprocket 145 is mounted on each drive shaft 142. A chain 148 is provided between this sprocket 145 and a drive sprocket 147 of a drive motor 146. Each drive shaft 142 is rotated by the drive motor 146. The chain 148 is given a predetermined tension by the action of a tightener 150 supported by a bearing 149.

The conveyance mechanisms 151 of the waiting station 112 and the switching station 114 are constructed as shown in FIGS. 15 and 16. A sliding shaft 153 is provided on a base plate 152. A bearing mount 154 is supported by this sliding shaft 153. This bearing mount 154 is elevated by a drive cylinder 155 provided on the base plate 152. Four drive shafts 157 are supported by the bearings 156 of the bearing mounts 154. Conveyance rollers 158 are provided at both ends of this drive shaft 157. The master roll container 2 is set on these conveyance rollers 158. When these conveyance rollers 158 are rotated, the master roll container 2 is conveyed.

A sprocket 159 is mounted on each drive shaft 157. A chain 162 is provided between the sprocket 159 and a drive sprocket 161 of a drive motor 160. Each drive shaft 157 is rotated by the drive motor 160. The chain 162 is given a predetermined tension by the action of a tightener 164 supported by a bearing 163.

Three drive shafts 166 are supported by bearings 165 on the base plate 152. Conveyance rollers 167 are provided at both ends of this drive shaft 166. The master roll container 2 is set on these conveyance rollers 167. The master roll container 2 is conveyed by these conveyance rollers 167.

A sprocket 168 is mounted on each drive shaft 166. A chain 169 is provided around the sprocket 168. A bevel gear 170 is mounted on the central drive shaft 166, and the bevel gear 170 is engaged with a bevel gear 172 of a drive motor 171. The central drive shaft 166 is rotated by the drive motor 171, and each drive shaft 166 is rotated by the chain 169 being linked with each other. The chain 169 is given a predetermined tension by the action a tightener supported by a bearing 173.

In this connection, the conveyance mechanisms 140 of the taking station 110, the supplying station 111 and the discharging station 113, and the conveyance mechanisms 151 of the waiting station 112 and the switching station 114 are composed of the rollers and motors as described above. However, as shown in FIG. 17, a chain 41 may be provided between sprockets 39 and 40, and the sprocket 39 may be driven by a motor 42 so that the master roll container 2 can be conveyed by a chain 41. Also, an endless conveyance means such as a pulley and a belt may be employed.

Further, as shown in FIG. 18, the conveyance mechanisms 140, 151 may be provided with a conveyance mount 43 and rollers 44, and the master roll container 2 may be set on the rollers 44 and pushed by a cylinder 45 so as to be conveyed.

A positioning stopper 175 of the switching station 114 is constructed as shown in FIG. 19. The positioning stoppers 175 are respectively disposed on the taking station 110 side and the waiting station 112 side in a direction perpendicular to the conveyance direction of the master roll container 2. This positioning stopper 175 is supported by a support plate 177 through a slide shaft 176. This support plate 177 is provided with an elevating cylinder 178. The positioning stopper 175 is elevated by this elevating cylinder 178. An arrival detection proximity sensor 197 is disposed in the lower position of this positioning stopper 175. This arrival detection proximity sensor 197 detects that the master roll container 2 has been conveyed into the switching station 114.

A positioning stopper 179 of the taking station 110 is constructed as shown in FIG. 20. This positioning stopper 179 is disposed on the switching station 114 side in a direction perpendicular to the conveyance direction of the master roll container 2. This positioning stopper 179 is rotatably supported by a support plate 180 through a support pin 181. This positioning stopper 179 is connected with a rod 184 of a stopper drive cylinder 183 through a connecting pin 182. This stopper drive cylinder 183 is supported by a support bracket 186 through a support pin 185. When a rod 184 of this stopper drive cylinder 183 is extended and contracted, this positioning stopper 179 can be turned on and off. When this positioning stopper 179 is turned on and off, its movement is detected by an operation detection sensor 183a of the stopper drive cylinder 183.

The third light shielding shutter 117 is disposed at a communicating hole 116 between the switching station 114 and the taking station 110. The first light shielding shutter 119 is disposed at a communicating hole 118 between the switching station 114 and the waiting station 112. The second light shielding shutter 121 is disposed at a communicating hole 120 between the switching station 114 and the discharging station 113. The side slide frames 122, 123 and 124 of the third light shielding shutter 117, the first light shielding shutter 119 and the second light shielding shutter 121 are respectively engaged with the support frames 125, 126 and 127 of the switching station 114 in such a manner that protruding portions and cutout portions are engaged for light shielding.

An opening and closing mechanism 128 of the light shielding shutter is disposed in the upper portion of the switching station 114. Side slide frames 122, 123, 124 of the third, first and second light shielding shutters 117, 119, 121 are slidably engaged with a support frame 129 of the light shielding shutter opening and closing mechanism 128. Rods 130a, 131a, 132a of opening and closing cylinders 130, 131, 132 supported by this support frame 129 are respectively connected with the third, first and second light shielding shutters 117, 119, 121. When these opening and closing cylinders 130, 131, 132 are operated, the third, first and second light shielding shutters 117, 119, 121 are vertically moved so as to be opened and closed.

The drive mechanisms to open and close the third, first and second light shielding shutters 117, 119, 121 may be composed of a motor 46 and a pulling means 47 such as a chain, belt and wire as shown in FIG. 21.

The opening and closing cylinders 130, 131, 132 are respectively provided with shutter opening detection sensors 130b, 131b, 132b. Under the condition that the rods 130a, 131a, 132a are contracted, the detection sensors detect that the shutters have been opened. Under the condition that the rods 130a, 131a, 132a are extended, the shutters are closed. This shutter closing condition is detected when different shutter closing detection sensors 130c, 131c, 132c detect the frames of the first and second light shielding shutters 119, 121. The shutter opening and closing operations must be positively detected. Accordingly, microswitches, photoelectric sensors and magnetic sensors may be applied. Also, the shutter opening and closing operations may be detected by one detection means.

The opening and closing mechanism 128 of the light shielding shutter is controlled by the control means 115. When the third light shielding shutter 117 is opened, the first and second light shielding shutters 119, 121 are in an opening condition. When the first light shielding shutter 119 or the second light shielding shutter 121 is opened, the third light shielding shutter 117 is in a closing condition. Therefore, the light shielding condition can be always maintained, so that the master roll container 2 can be automatically conveyed into the film splicing section 100 under a light shielding condition.

Next, the supply of the master roll 3 will be explained as follows. The master roll to be manufactured is supplied from a cutting process. At this time, a command is always outputted from a process control means 198 that controls the progress of the process and the production schedule, to an unmanned conveyance means 199 referred to as AGV, and also outputted to the control means 115. The command is outputted in the following manner. For example, in the case where it is judged that the production of the photosensitive film can be attained by the master roll presently supplied, the selection of the next type of photosensitive film is automatically given to the unmanned conveyance means.

The command is given by the process control means 198 for each master roll container 2. Accordingly, the supply of the master roll 3 is conducted for each master roll container 2. The selected master roll container 2 is automatically delivered to the unmanned conveyance means 199. Then, the supply of the master roll 3 is requested, and the master roll container 2 is conveyed to the film cassette manufacturing apparatus 1.

In this explanation, the delivery means of the master roll container 2 is composed of an AGV, however, a conveyor and a carriage may be applied. The master roll container 2 not only conveys a master roll, but also has the following functions.

There is a section under a bright room condition between the cutting process and the film cassette manufacturing process. Accordingly, the master roll container 2 is provided with a light shielding construction. Therefore, even a highly sensitive color film is not exposed to light also, the master roll container 2 has a recording medium 35, and a magnetic ID card is attached to each recording medium 35. Therefore, the content of a photographic film accommodated in the master roll container can be checked at the film splicing section 100. It should be understood that the recording medium 35 is not limited to an ID card, and an IC card and a magnetic tape can be applied to the recording medium 35. Further, in order to make it easy to set a master roll, the support shaft 23 is formed into a cantilever structure, so that the master roll 3 can be easily set in the master roll container. Further, the cover 21 of the master roll container 2 can be vertically opened and closed so that it can be automatically operated. After the master roll container 21 has been conveyed to the film cassette apparatus by the unmanned conveyance means 199, the master roll container 21 is automatically delivered to a conveyor that is a conveyance means to convey the master roll cassette 2 to the film splicing section 100. At this time, the master roll container 2 is put on the conveyor at a predetermined position. Therefore, the master roll container is positively set on the supplying station 111.

Next, with reference to the flow chart shown in FIG. 22, the supply of the master roll container 2 will be explained as follows.

In step A1, it is checked by the proximity sensor S2 whether or not the master roll container 2 exists in the supplying station. After the master roll container 2 has been put on the supplying station 111, in step A2, it is checked by the proximity switch S3-1 that the master roll container 2 does not exist in the waiting station 112. In step A3, the conveyance roller 144 of the conveyance mechanism 140 of the supplying station 111 is driven. After that, in step A4, the conveyance roller 158 of the conveyance mechanism 151 of the waiting station 112 is driven in the conveyance direction. In step A5, it is checked by the proximity sensor S3-2 whether or not the master roll container 2 exist. When the master roll container 2 is conveyed into the waiting station 112, in step A6, the conveyance mechanism 140 of the supplying station 111 is stopped, and in step 7, the conveyance mechanism 151 of the waiting station 112 is stopped, and the master roll container 2 waits for the next process.

This operation is conducted for the purpose of maintaining a condition in which the master roll container 2 can be received whenever the unmanned carriage brings the master roll container 2. The reason why the master roll container 2 is waiting for the next process in the waiting station 112 and does not advance to the switching station 114 will be described as follows: when the master roll container 2 presently used in the taking station 114 becomes empty and is delivered onto the unmanned carriage, it passes through the switching station 14 and is conveyed to the discharging station 113.

In step A8, it is checked by the proximity sensors S5-1, S5-2, S5-3 and S1 that the master roll container 2 does not exist in the switching station 114 and the taking station 110. In step A9, the conveyance roller 158 of the conveyance mechanism 151 of the waiting station 112 is lowered. In step A10, the conveyance roller 158 of the conveyance mechanism 151 of the switching station 114 is lowered. After the conveyance roller 158 of the conveyance mechanism 151 of the waiting station 112 has been lowered in step A11, and in the same manner, after the conveyance roller 158 of the conveyance mechanism 151 of the switching station 114 has been lowered in step A12, the first light shielding shutter 119 is opened in steps A13 and A14. In steps A15 and A16, the positioning stopper 175 of the switching station 114 on the taking station 110 side is raised. In step A17, the conveyance roller 167 of the conveyance mechanism 151 of the waiting station 112 is driven. In step A18, the conveyance roller 167 of the conveyance mechanism 151 of the switching station 114 is driven, so that the master roll container 2 is conveyed to the switching station 114 from the waiting station 112.

In step A19, it is detected by the arrival detection proximity sensor 197 attached to the positioning stopper 175 of the switching station 114 on the taking station side that the master roll container 2 has been conveyed into the switching station 114. In step A20, the first light shielding shutter 119 is closed. In step A21, the conveyance roller 167 of the conveyance mechanism 151 of the waiting station 112 is stopped. In step A22, the conveyance roller 167 of the conveyance mechanism 151 of the switching station 114 is stopped. In step A23, the closing condition of the first light shielding shutter 119 is detected by the shutter opening and closing detection switch 131b. In steps A24 and A25, the conveyance roller 158 of the conveyance mechanism 151 of the waiting station 112 is raised. In steps A26 and A27, the positioning stopper 175 of the switching station 114 on the taking station side 110 is lowered.

In steps A28 and A29, the third light shielding shutter 117 is opened. In step A30, the conveyance roller 167 of the conveyance mechanism 151 of the switching station 114 is driven. In step A31, the conveyance roller 144 of the conveyance mechanism 140 of the taking station 110 is driven, so that the master roll container 2 is conveyed to the taking station 110 from the switching station 114. In step A32, the existence of the master roll container 2 is checked by the proximity sensor S1.

In step A33, the conveyance roller 167 of the conveyance mechanism 151 of the switching station 114 is stopped. In step A34, the conveyance roller 144 of the conveyance mechanism 140 of the taking station 110 is stopped. In steps A35 and A36, the positioning stopper 179 of the taking station 110 is turned on. In steps A37 and A38, the third light shielding shutter 117 is closed. This closing condition is detected by the shutter opening and closing detection switch 130b. In steps A39 and A40, the conveyance roller 158 of the conveyance mechanism 151 of the waiting station 112 is raised.

Next, with reference to the flow chart shown in FIGS. 23a–23d, the discharge of the master roll container 2 will be described as follows.

In step B1, the closing condition of the cover 21 of the master roll container 2 is detected by the reflection type sensor S6. In steps B2 and B3, the positioning stopper 179 of the taking station 110 is turned off. In steps B4 to B7, the third light shielding shutter 117 is opened, and the conveyance roller 158 of the conveyance mechanism 151 of the switching station 114 is lowered. In steps B8 and B9, the positioning stopper 175 of the switching station 114 on the waiting station 112 side is raised.

In step B10, the conveyance roller 144 of the conveyance mechanism 140 of the taking station side 110 is driven. In step B11, the conveyance roller 167 of the conveyance mechanism 151 of the switching station 114 is driven. In step B12, it is detected by the arrival detection proximity sensor 197 attached to the positioning stopper 175 on the waiting station 112 side that the master roll container 2 has been conveyed into the switching station 114. In step B13, the third light shielding shutter 117 is closed.

In step B14, the conveyance roller 144 of the conveyance mechanism 140 of the taking station 110 is stopped. In step B15, the conveyance roller 167 of the conveyance mechanism 151 of the switching station 114 is stopped. In step B16, the closing condition of the third light shielding shutter 117 is detected by the shutter closing detection sensor 130c. In step B17, the conveyance roller 158 of the conveyance mechanism 151 of the switching station 114 is raised. In steps B18 and B19, the positioning stopper 175 of the switching station 114 on the waiting station 112 side is lowered. In steps B20 and B21, the second light shielding shutter 121 is opened.

In step B22, the conveyance roller 158 of the conveyance mechanism 151 of the switching station 114 is driven. In step B23, the conveyance roller 144 of the conveyance mechanism 140 of the discharging station 113 is driven, so that the master roll container 2 is conveyed to the discharging station 113 from the switching station 114. In step B24, the existence of the master roll container 2 is checked by the proximity sensor S4. In step B25, the conveyance roller 158 of the conveyance mechanism 151 of the switching station 114 is stopped. In step B26, the conveyance roller 144 of the conveyance mechanism 140 of the taking station 110 is stopped. In steps B27 and B28, the second light shielding shutter 121 is closed, and this shutter closing condition is detected by the shutter closing detection sensor 132c.

As described above, the producing operation advances, and all the film is sent out from the master roll container 2 located in the taking station 110, and the master roll container 2 passes through the switching station 114 and arrives at the discharging station 113. Then, the master roll container 2 that has been waiting for the next process in the waiting station 112 passes through the switching station 114 and is set in the taking station 110. When the master roll container 2 is replaced, the master rolls are supplied in the following manner. Since two master rolls are stocked in the film splicing section 100, the last two master rolls in the master roll container 2 located in the taking station 110 are set in the film splicing section 100. Therefore, no problems are caused in the production. That is, while these two master rolls 3 are being used, the master roll container 2 may be replaced, if necessary.

The empty master roll 2 that has arrived at the discharging station 113 waits for the recovery operation conducted by the unmanned conveyance carriage. At this time, a command is given to the unmanned carriage by the process control means 198. After that, the unmanned conveyance carriage arrives, and the master roll container 2 is delivered onto the unmanned carriage and conveyed to the cutting process.

In the aforementioned series of operations, the master roll container 2 is moved from the bright room to the dark room, or from the dark room to the bright room. In order to shield the dark room at this time, the third light shielding shutter 117, the first light shielding shutter 119 and the second light shielding shutter 121 are vertically slid. In this example, the shutters are driven by air cylinders so that the dark room can be shielded.

As described above, the film splicing section 100 maintained in the dark room condition includes the taking station 110, switching station 114, waiting station 112, discharging station 113, third light shielding shutter 117, first light shielding shutter 119, and second light shielding shutter 121. Therefore, it is possible to automatically convey the master roll container 2 to the film splicing section 100 under the dark room condition. Accordingly, the master roll 3 can be automatically set in the film splicing section 100 under the dark room condition, so that labor of the operator can be saved, and the apparatus can be made compact so that the operator is not required to enter the dark room.

Further, the film splicing section includes: the reading means 500 located at a position opposed to the taking station 110 in which the master roll container 2 is set and from which the master roll container 2 is taken out, the reading means 500 reading the control information recorded on the recording medium 35 in the master roll container 2; the cover opening and closing mechanism 510 that opens and closes the cover by operating the release lever 34 of the lock mechanism 33; and the master roll taking and holding mechanism 530 that takes out the master rolls 3 one by one under the condition that the cover 21 of the master roll container 2 is opened.

The control information of the photosensitive film that has been read in the reading means 500 is inputted into the control means 115 and collated with the data stored in the control means 115 in order to check whether or not the photosensitive film is the one to be produced. Accordingly, the information can be controlled by the recording medium 35 stuck to the master roll container 2. Conventionally, the operator visually checks the information recorded on a tape stuck on the outer circumference of the master roll 3, and then the checked information is written on a document so as to control the production. However, according to the present invention, the aforementioned work of the operator can be eliminated. Therefore, labor can be greatly saved, and further erroneous operations can be avoided.

Figure 24:
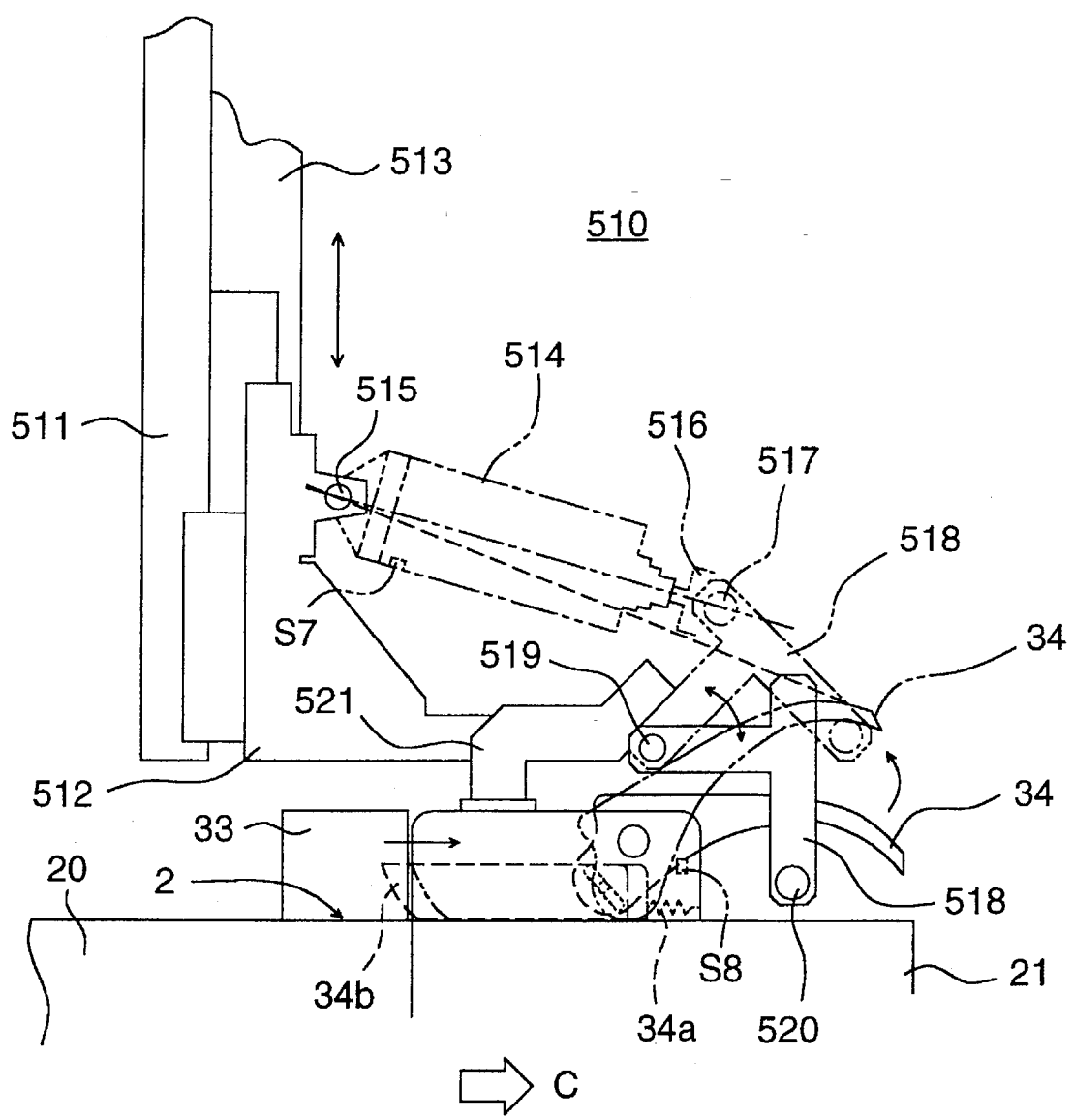
FIG. 24 is a side view showing an operating condition of a cover opening and closing mechanism.
Figure 25:
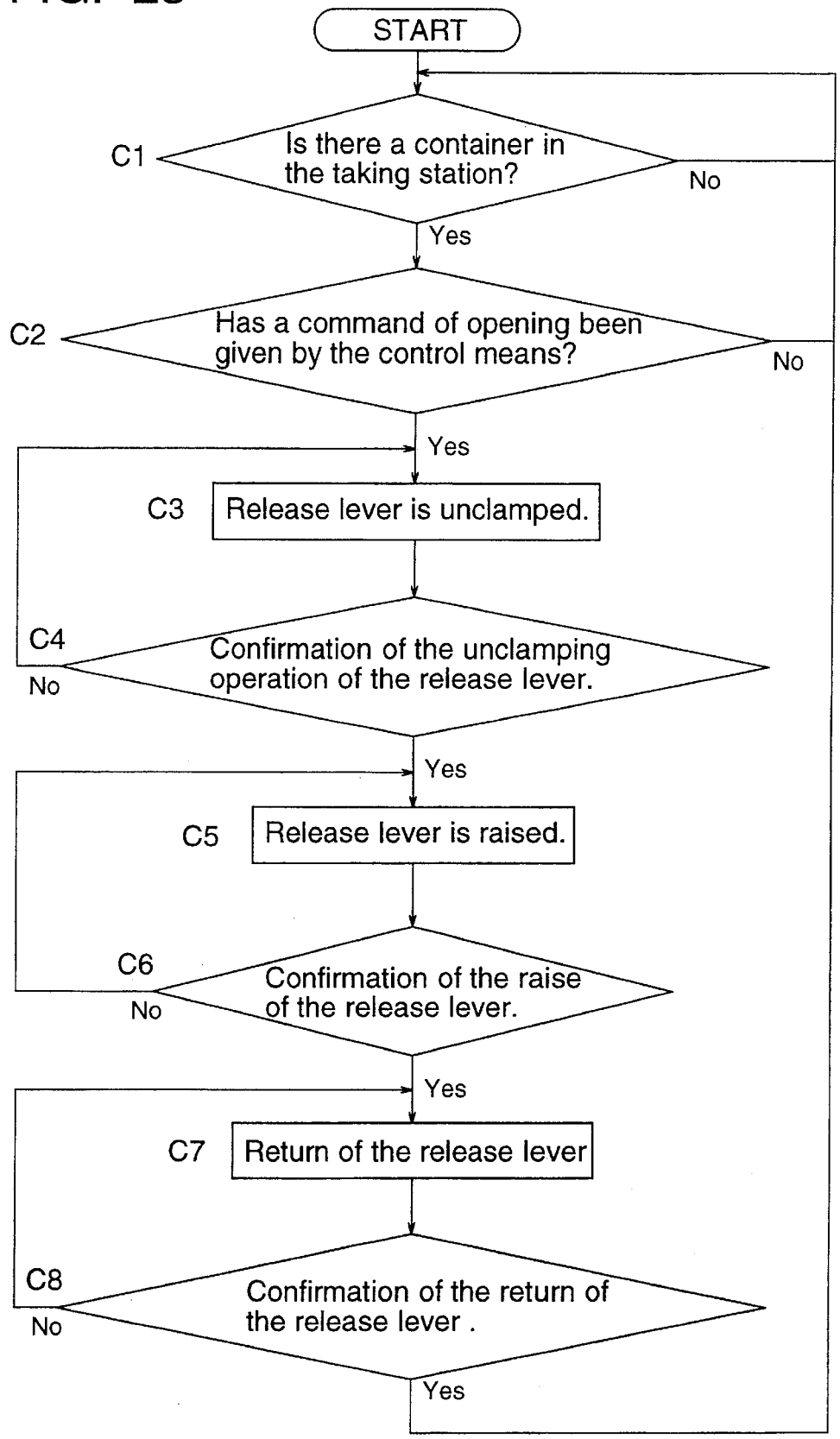
FIG. 25 is a flow chart showing an opening and closing operation of a master roll container cover.

Next, with reference to FIGS. 24 and 25, the cover opening and closing mechanism 510 will be explained as follows. FIG. 24 is a side view showing the operation of the cover opening and closing mechanism 510. As shown in FIG. 24, the opening and closing section holding slider 511 of the cover opening and closing mechanism 510 is provided with the opening and closing section 512. This opening and closing section holding slider 511 can be elevated in the film splicing section 100 by the rodless cylinder 513. A lever opening and closing drive cylinder 514 is pivotally attached to the opening and closing section 512 through a support pin 515. An opening and closing lever 518 is connected with the rod 516 of this lever opening and closing drive cylinder 514 through a connection pin 517. This opening and closing lever 518 is rotatably supported by the opening and closing section 512 around a support pin 519, and a hook 520 is provided at the fore end of the opening and closing lever 518. Further, the opening and closing section 512 is provided with a stopper 521.

Under the condition that the opening and closing section 512 of the cover opening and closing mechanism 510 is lowered, the rod 516 of the lever opening and closing cylinder 514 is extended. Under the aforementioned condition, the master roll container 2 is conveyed to the taking station 110 in the arrowed direction C. Due to the foregoing, the lock mechanism 33 comes into contact with the stopper 521, and the lock release lever 34 is set in an upper position of the hook 520 of the opening and closing lever 518. Accordingly, when the lever opening and closing drive cylinder 514 is activated so as to pull the rod 516, the opening and closing lever 518 is rotated counterclockwise around the support pin 519. When the opening and closing lever 518 is activated in the aforementioned manner, the hook 520 operates the lock release lever 34 upward. Therefore, a claw 34b always pushed in the locking direction by a spring 34a is moved in parallel in the arrowed direction, resisting against a force of the spring 34a. Accordingly, the lock of the locking mechanism 33 is released. After that, the opening and closing section 512 is raised when the rodless cylinder 513 is activated. Then, the cover 21 is lifted, so that the master roll 3 can be taken out from the master roll container 2.

Next, the opening and closing operation of the cover 21 of this master roll container 2 will be explained as follows. FIG. 25 is a flow chart of the opening and closing operation of the cover 21 of this master roll container 2. In step C1, it is judged that the master roll container 2 exists in the taking station 110. In step C2, a command of opening is inputted from the control means 115. In steps C3 and C4, the lever opening and closing drive cylinder 514 is activated, so that the lock release lever 34 is pulled by the opening and closing lever 518, and this cramping condition is detected by the stroke check sensor S7 mounted on the lever opening and closing drive cylinder 514. In steps C5 and C6, the opening and closing section 512 is raised and the lock release lever 34 is raised. The rising operation of this lock release lever 34 is checked by the proximity sensor S8.

The cover 21 of the master roll container 2 is closed in the following manner:

In steps C7 and C8, the lock release lever 34 is uncramped so that the opening and closing section 512 is lowered. The rod 16 is extended when the lever opening and closing drive cylinder 514 is activated, so that the lock release lever 34 is returned by the opening and closing lever 518. This returning operation is detected by the stroke check sensor S7 mounted on the lever opening and closing drive cylinder 514 so that the cramping condition is released.

Consequently, after it is confirmed that the third light shielding shutter 117 has been closed, the cover 21 of the master roll container 2 is opened and closed by the cover opening and closing mechanism 510 provided in an upper portion of the taking station 110. This lock release lever 34 is constructed in a simple manner that the cover 21 is opened using a handle of the cover 21.

As described above, in the master roll container 2, a plurality of master rolls 3 are held by the support shaft 23 disposed inside the container body 20 under a light shielding condition, and when the lock release lever 34 is operated, the cover 21 can be released. Then, the cover 21 is slid and opened in a direction perpendicular to the support shaft 23, and the master roll 3 is taken out of the container. Further, the control information of the photosensitive film is read from the recording medium 35 provided outside of the container body 20. Accordingly, the photosensitive film can be automatically charged and taken out, and further the information can be easily controlled, and manual labor can be saved.

Figure 26:
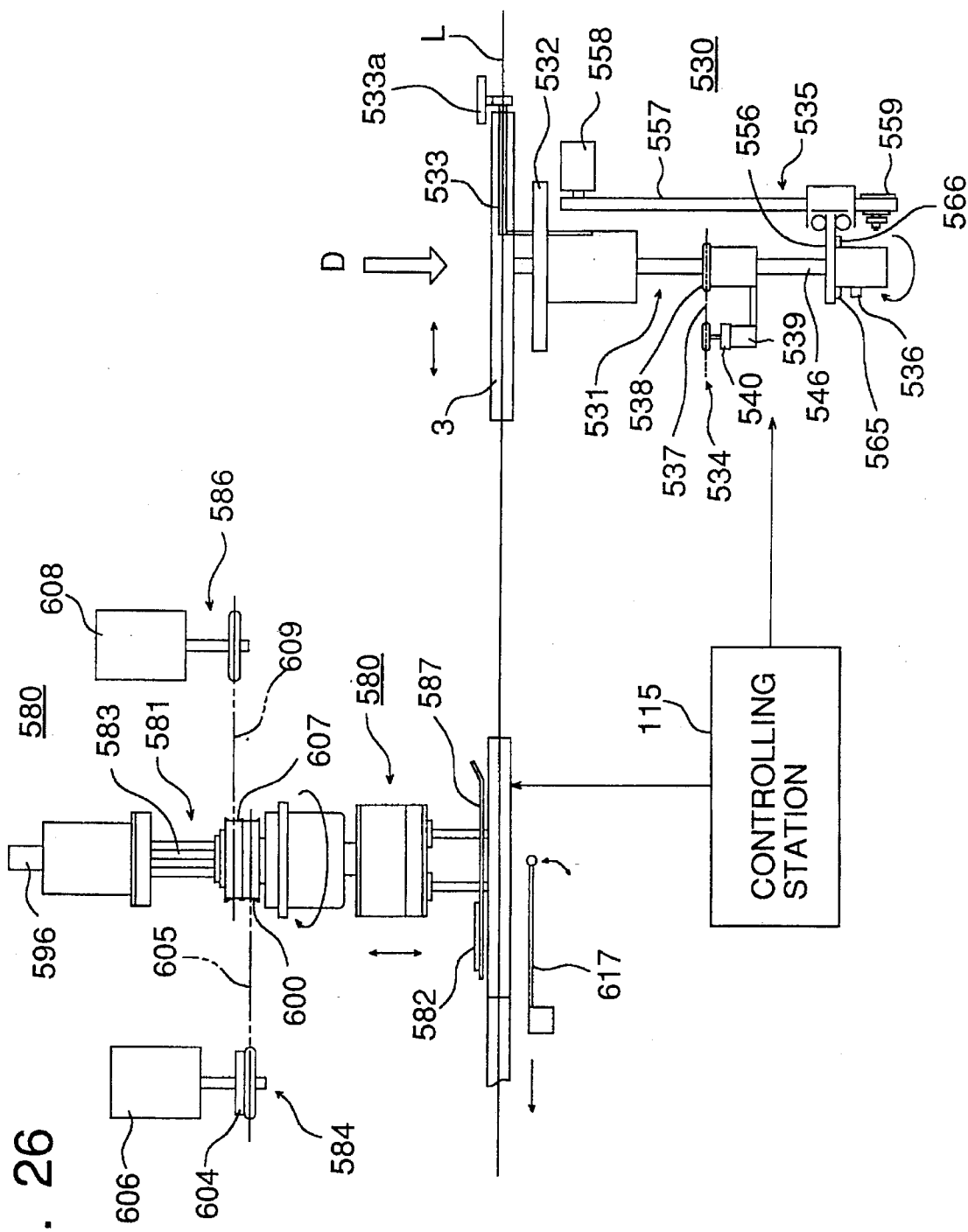
FIG. 26 is a plan view showing an outline of an automatic switching device.
Figure 27:
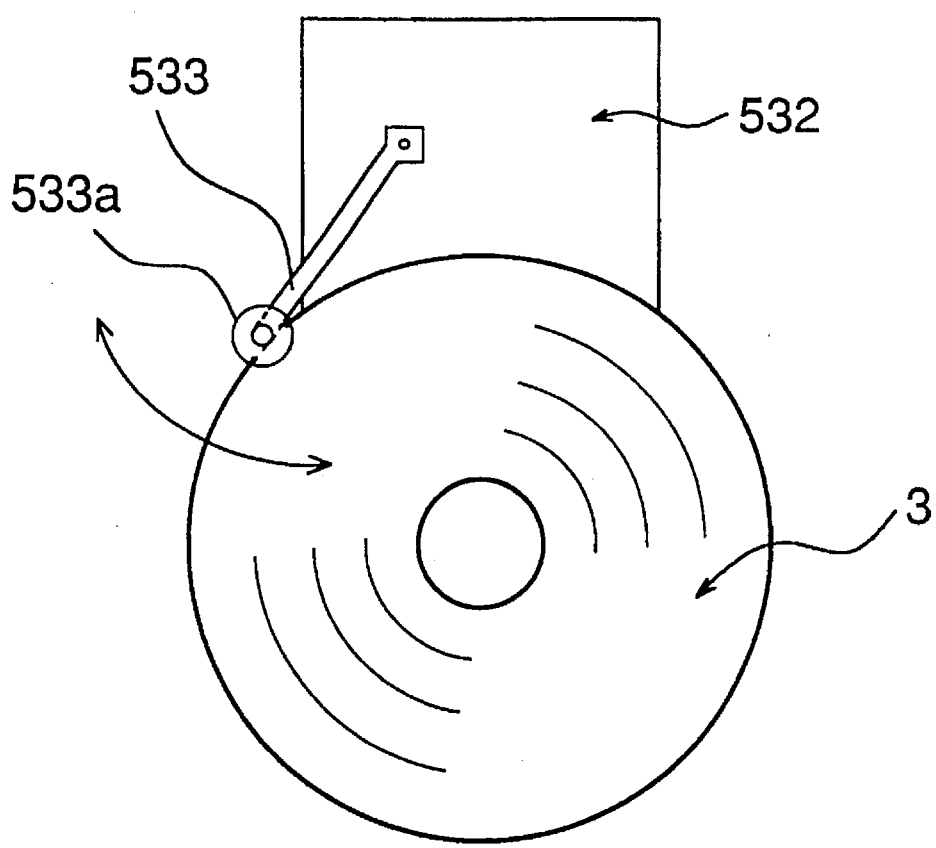
FIG. 27 is a view taken in the direction of arrow D in FIG. 26.
Figure 28:
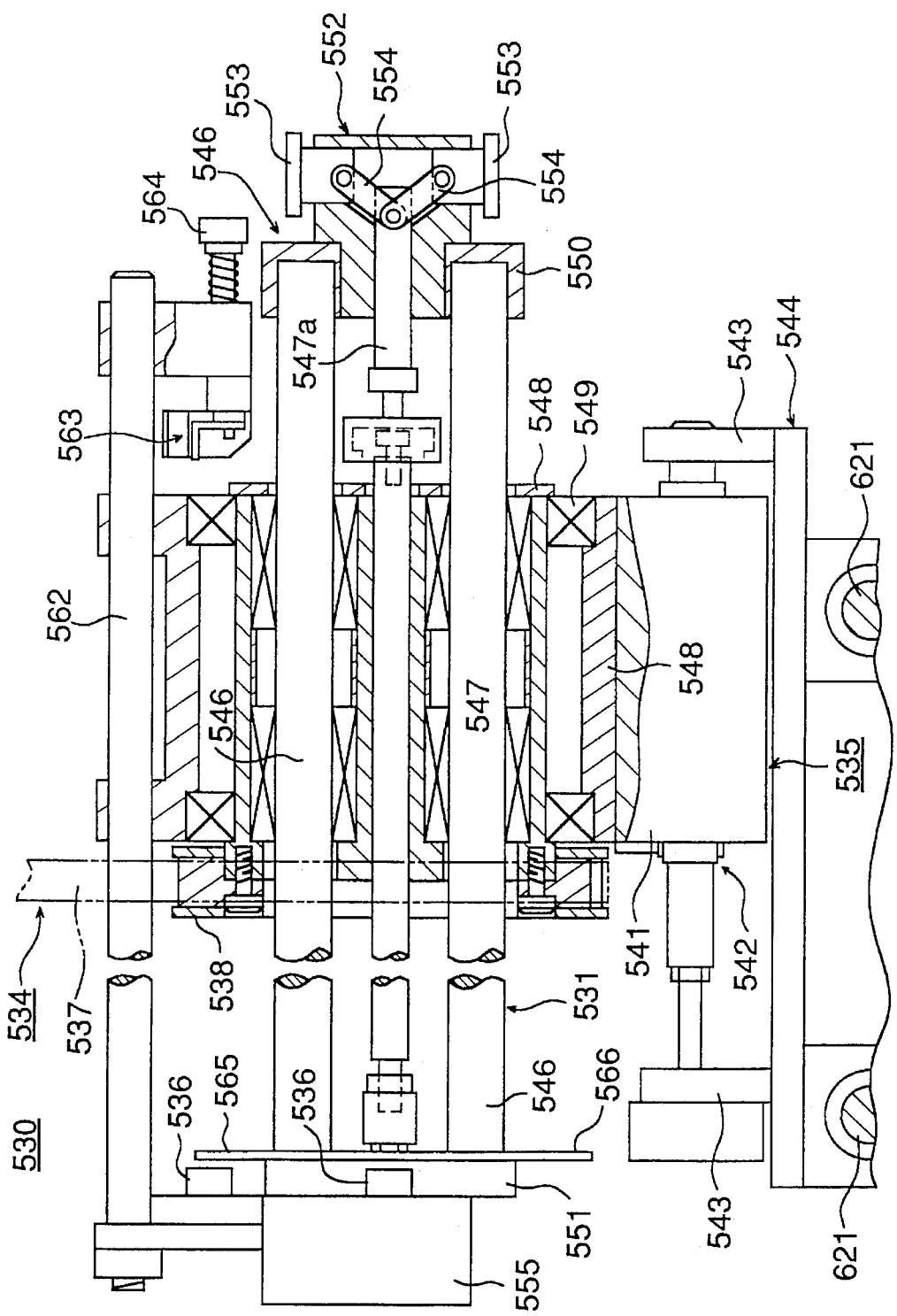
FIG. 28 is a side view of a master roll taking and holding mechanism, wherein a portion is shown in a sectional view.
Figure 29:
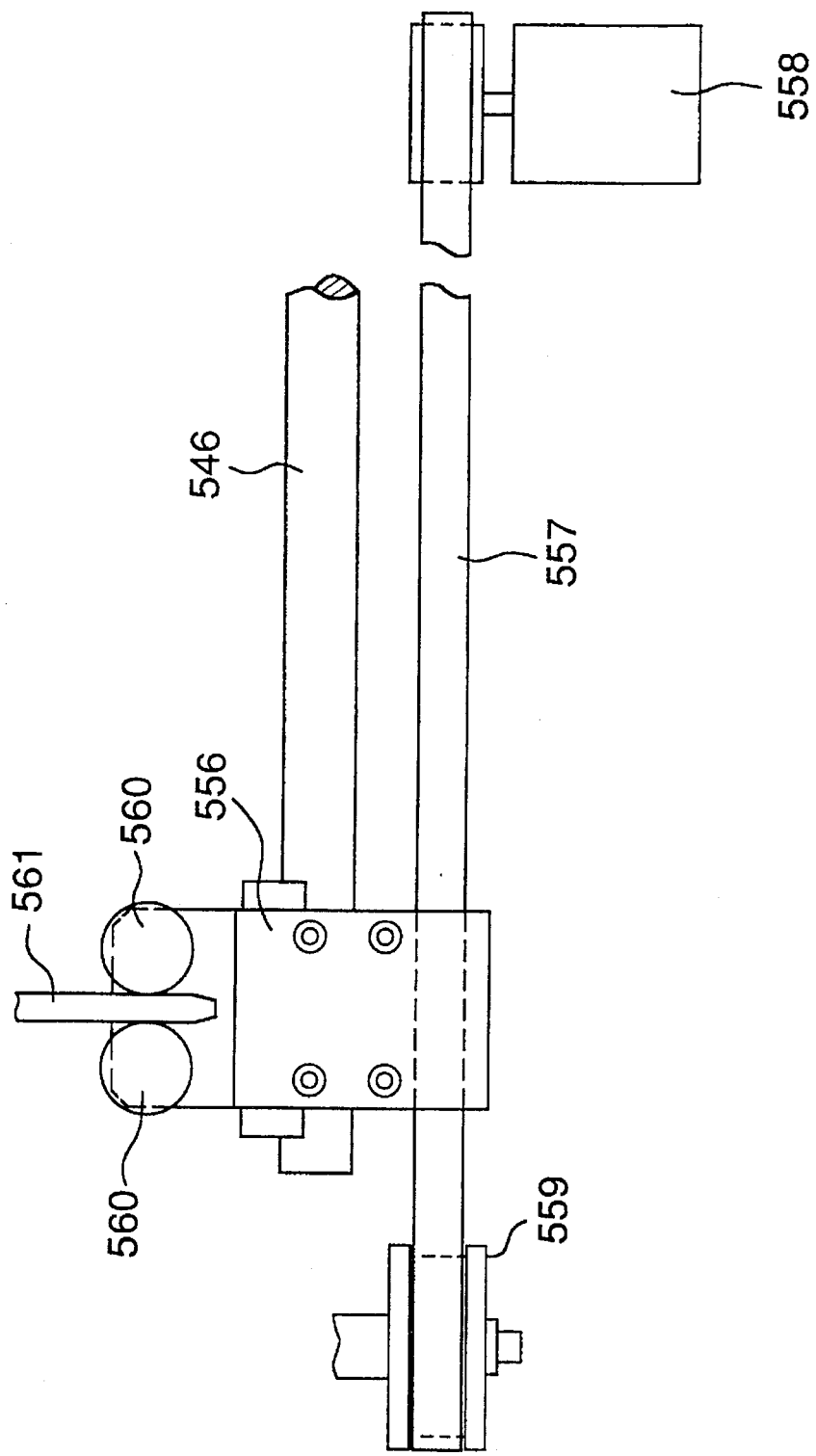
FIG. 29 is a plan view showing a portion of the master roll taking and holding mechanism.
Figure 30:
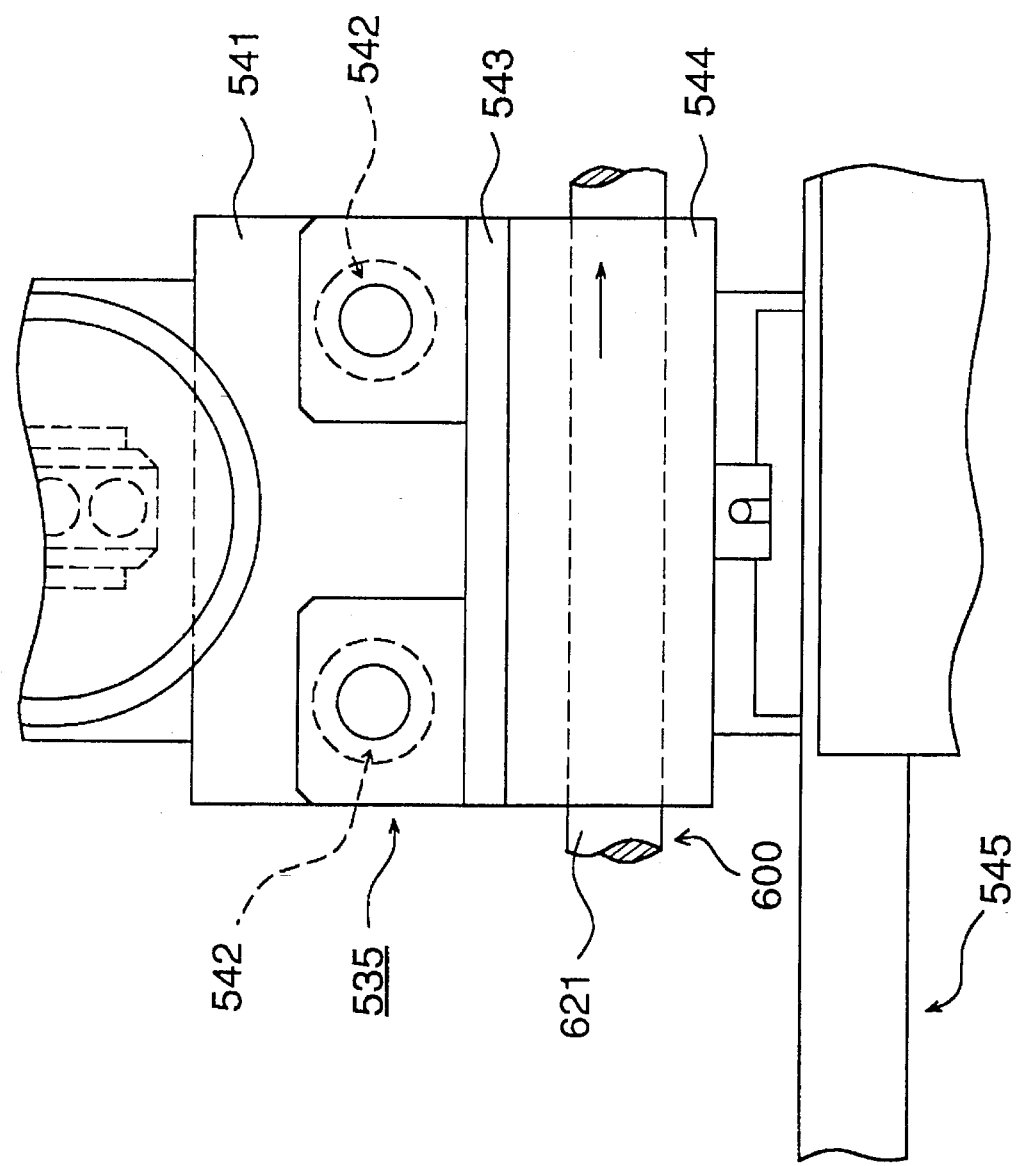
FIG. 30 is a front view showing a portion of the master roll taking and holding mechanism.
Figure 31:
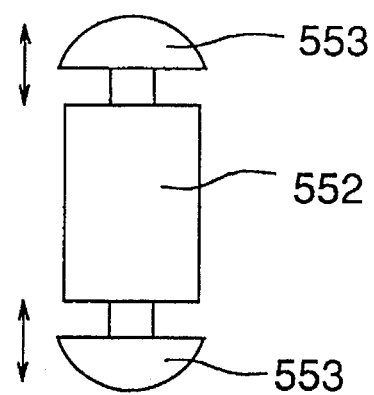
FIG. 31 is a front view showing a chuck portion of the master roll holding mechanism.
Figure 32:
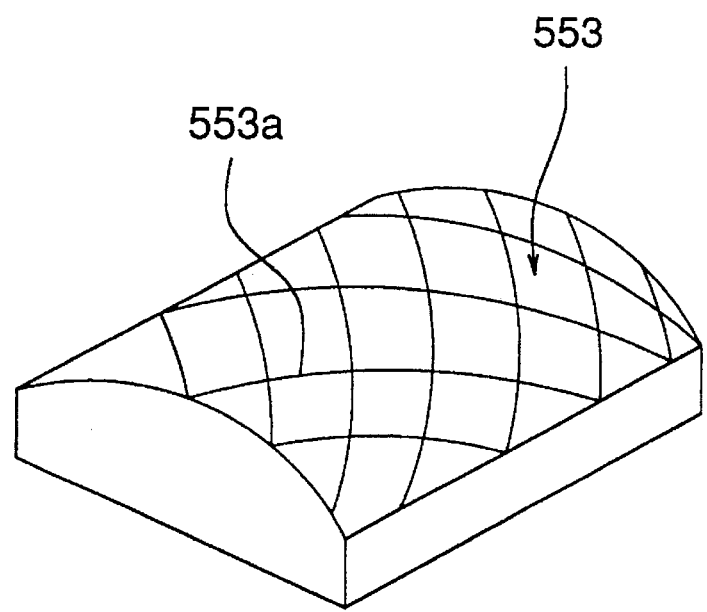
FIG. 32 is a perspective view showing another example of a holding claw of the chuck portion.
Figure 33:
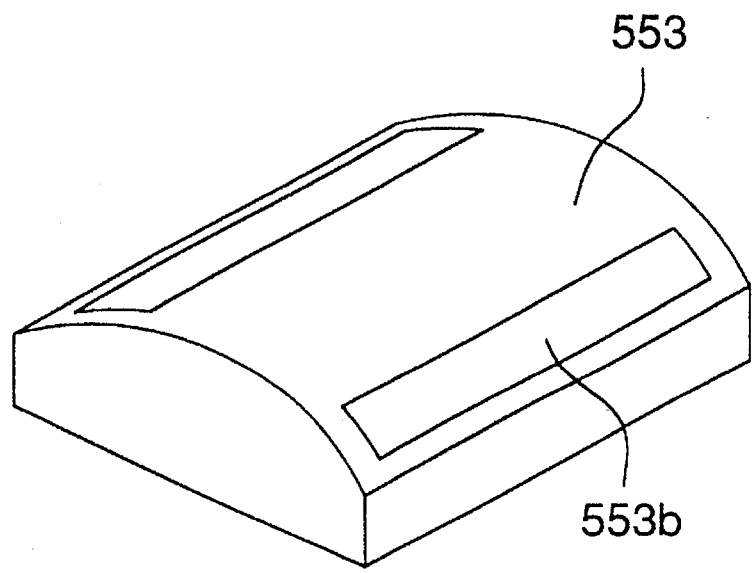
FIG. 33 is a perspective view showing still another example of the holding claw of the chuck portion.
Figure 34:
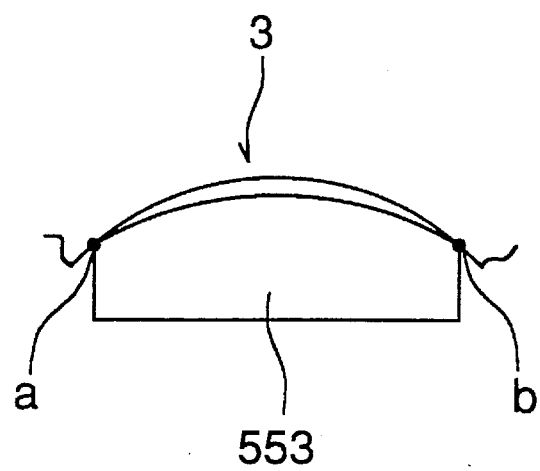
FIG. 34 is a perspective view showing still another example of the holding claw of the chuck portion.
Figure 35:
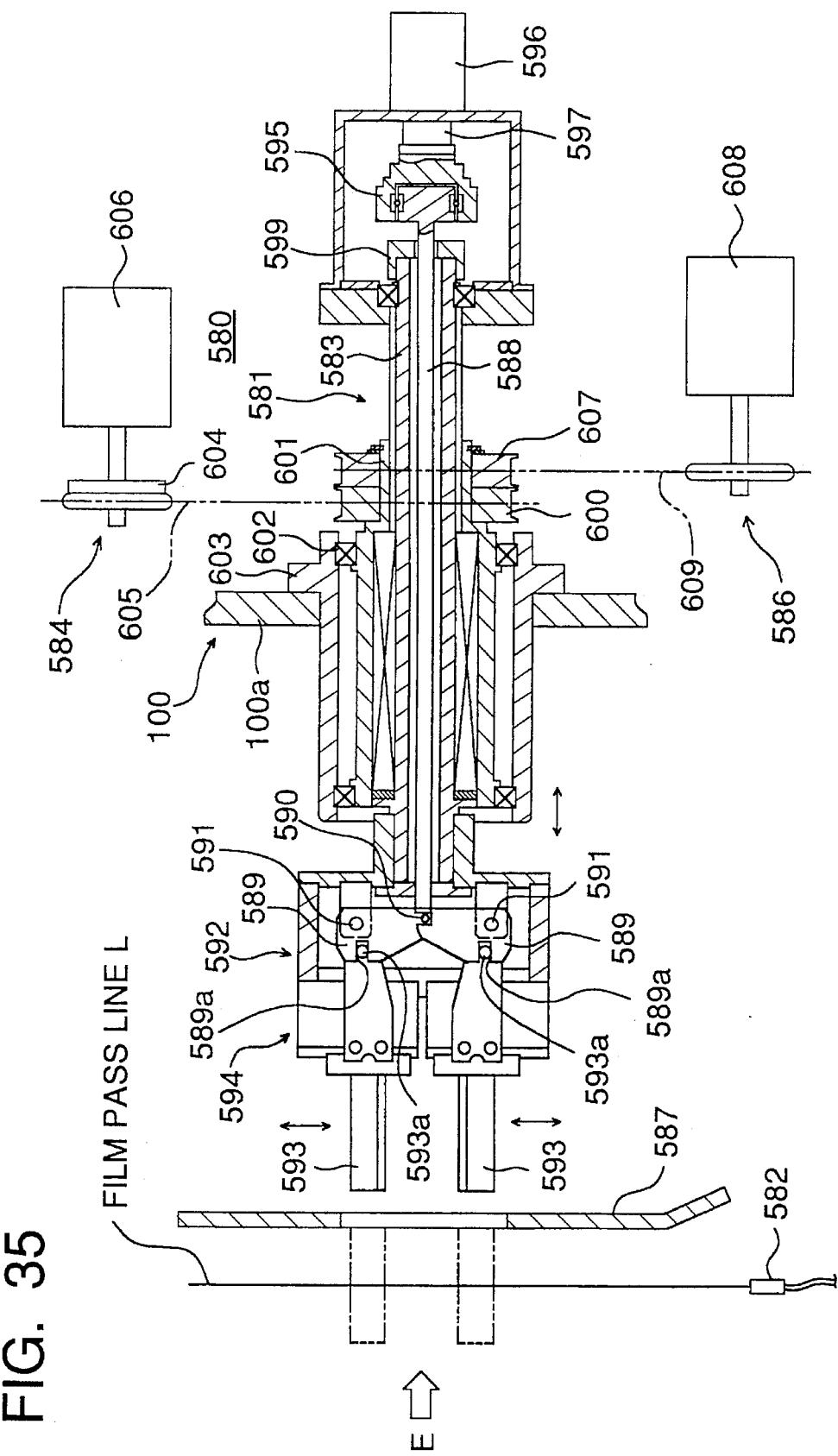
FIG. 35 is a sectional view of a master roll unwinding and holding mechanism.
Figure 36:
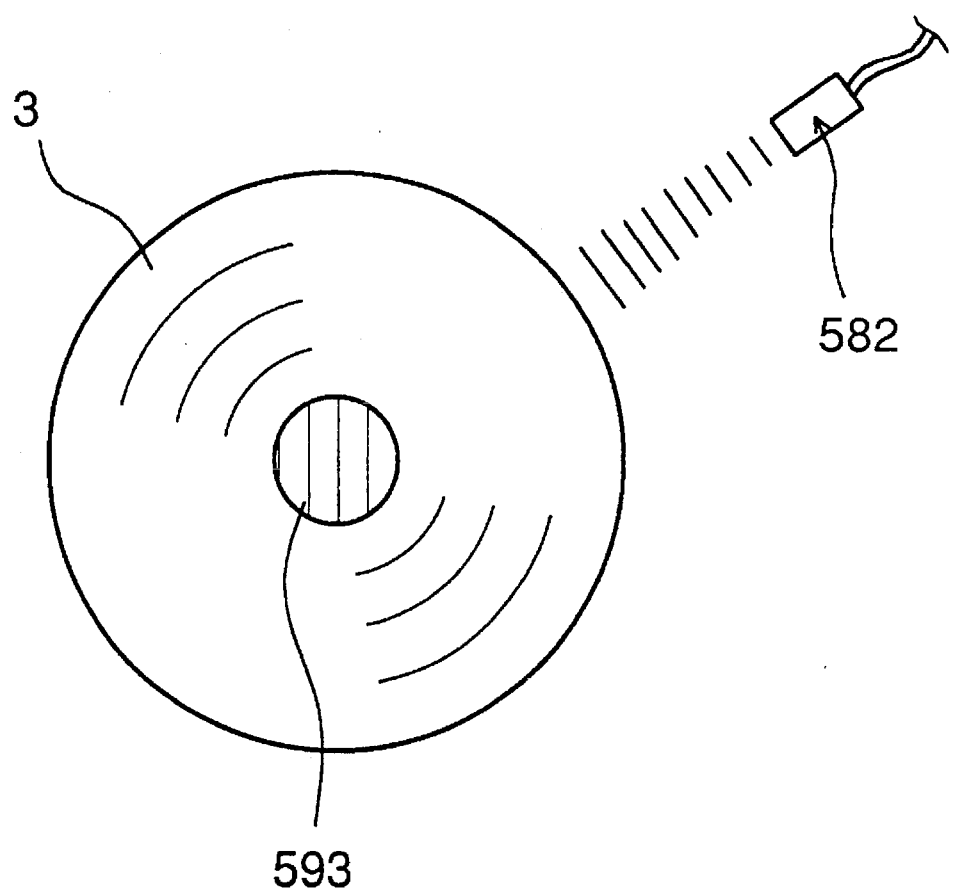
FIG. 36 is a view showing an arrangement of a roll diameter detection means, wherein the view is taken in the direction of arrow E in FIG. 35.
Figure 37:
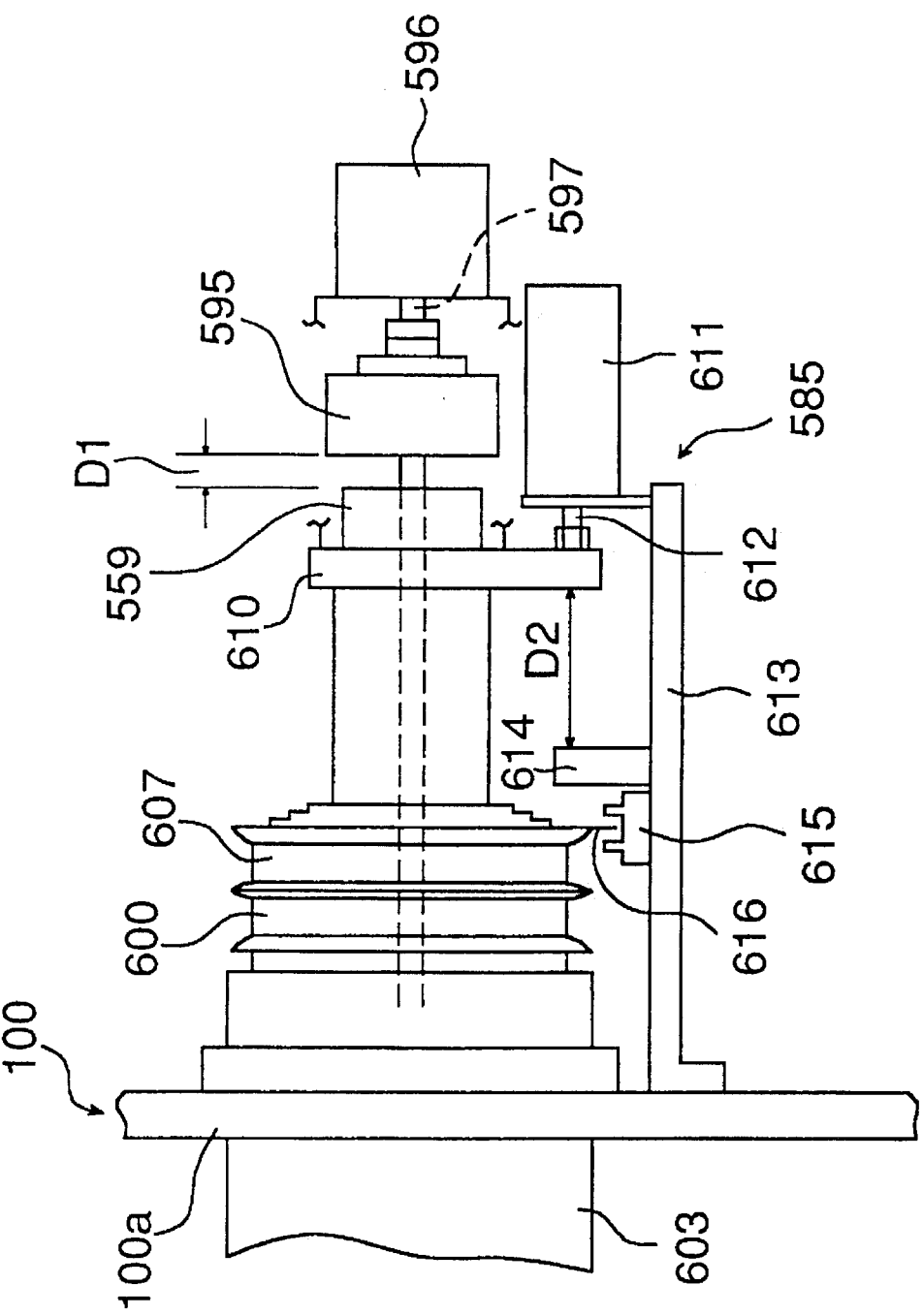
FIG. 37 is a side view showing a portion of the master roll unwinding and holding mechanism.
Figure 38:
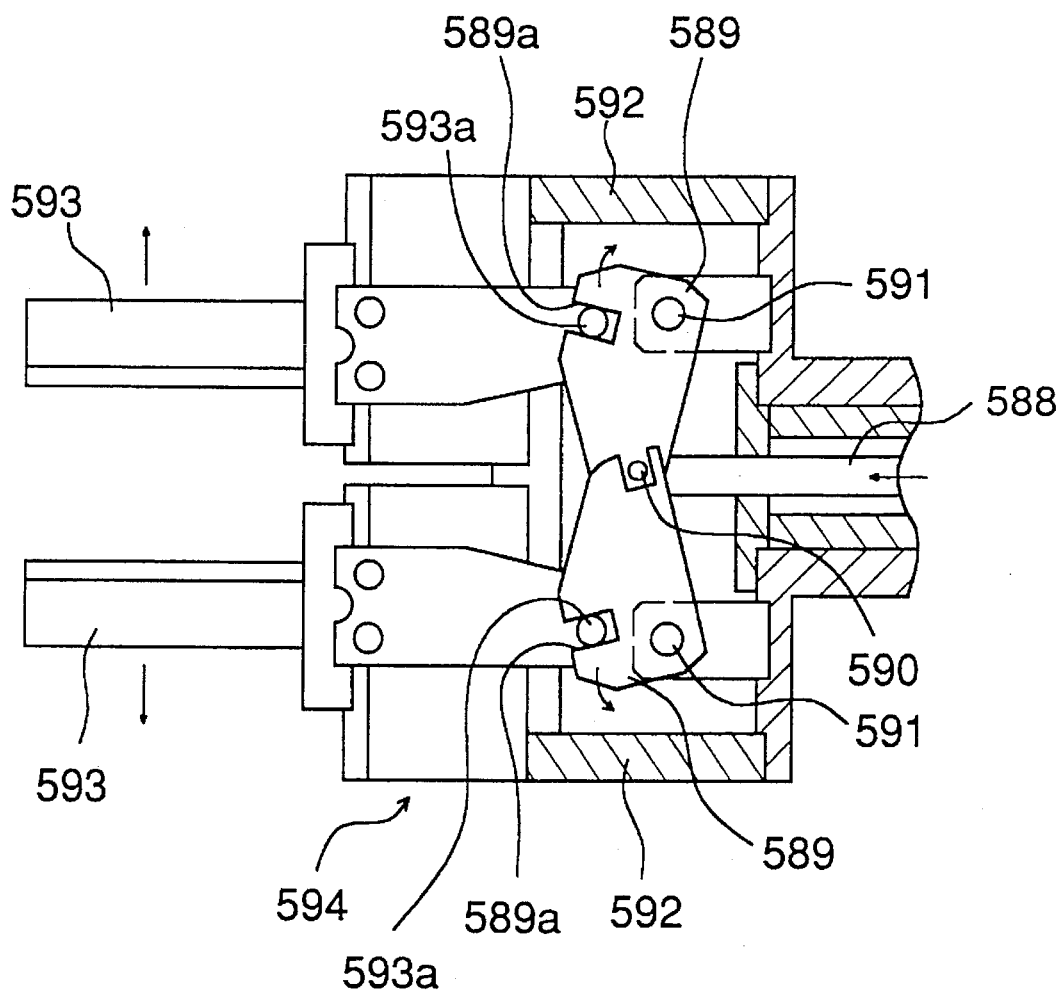
FIG. 38 is a side view showing an operating condition of the chuck portion of the master roll unwinding and holding mechanism.
Figure 39:
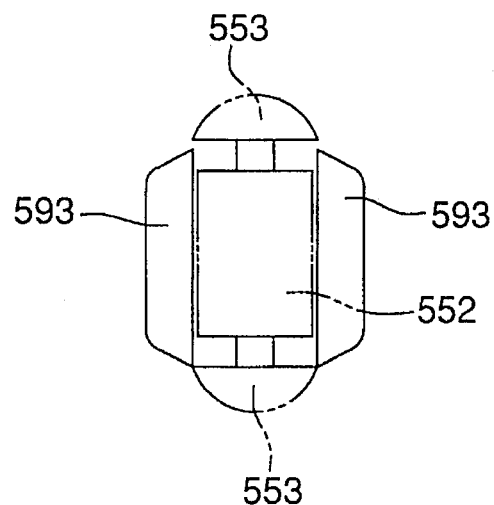
FIG. 39 is a front view of a holding claw of the master roll unwinding and holding mechanism.
Figure 40:
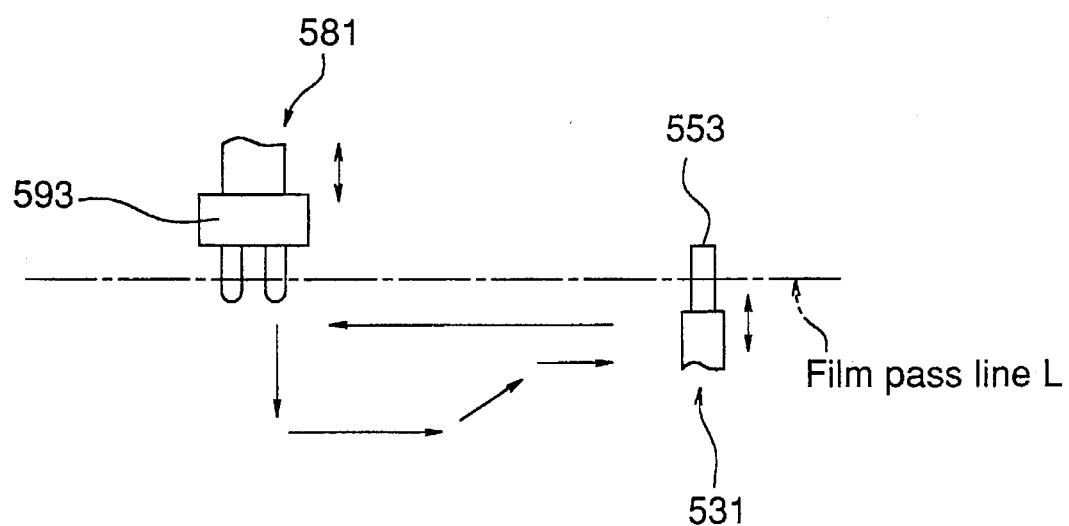
FIG. 40 is a view showing a splicing operation of a master roll.
Figure 41:
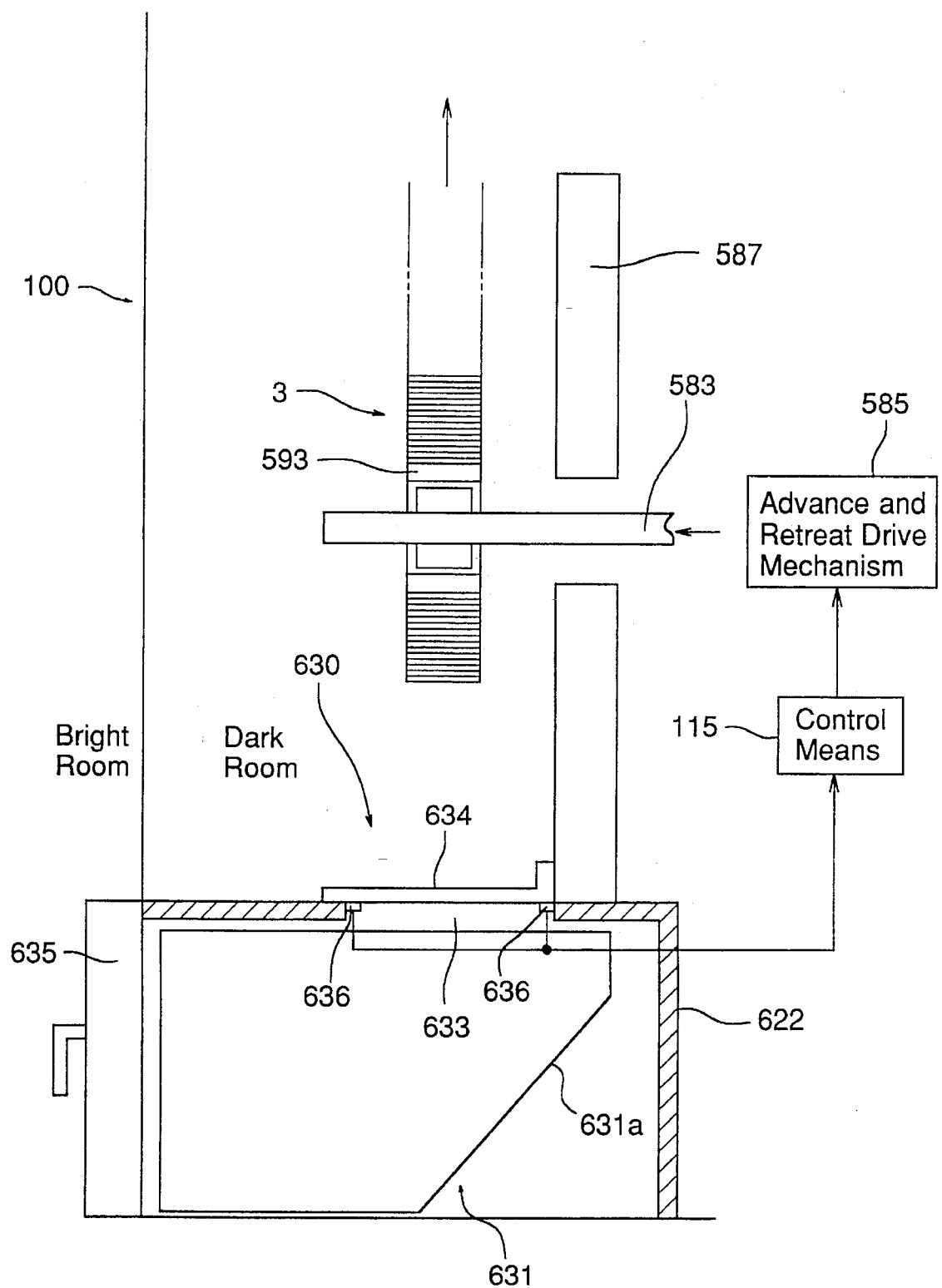
FIG. 41 is a sectional view of a core recovery mechanism showing a condition before a master roll is discharged.
Figure 42:
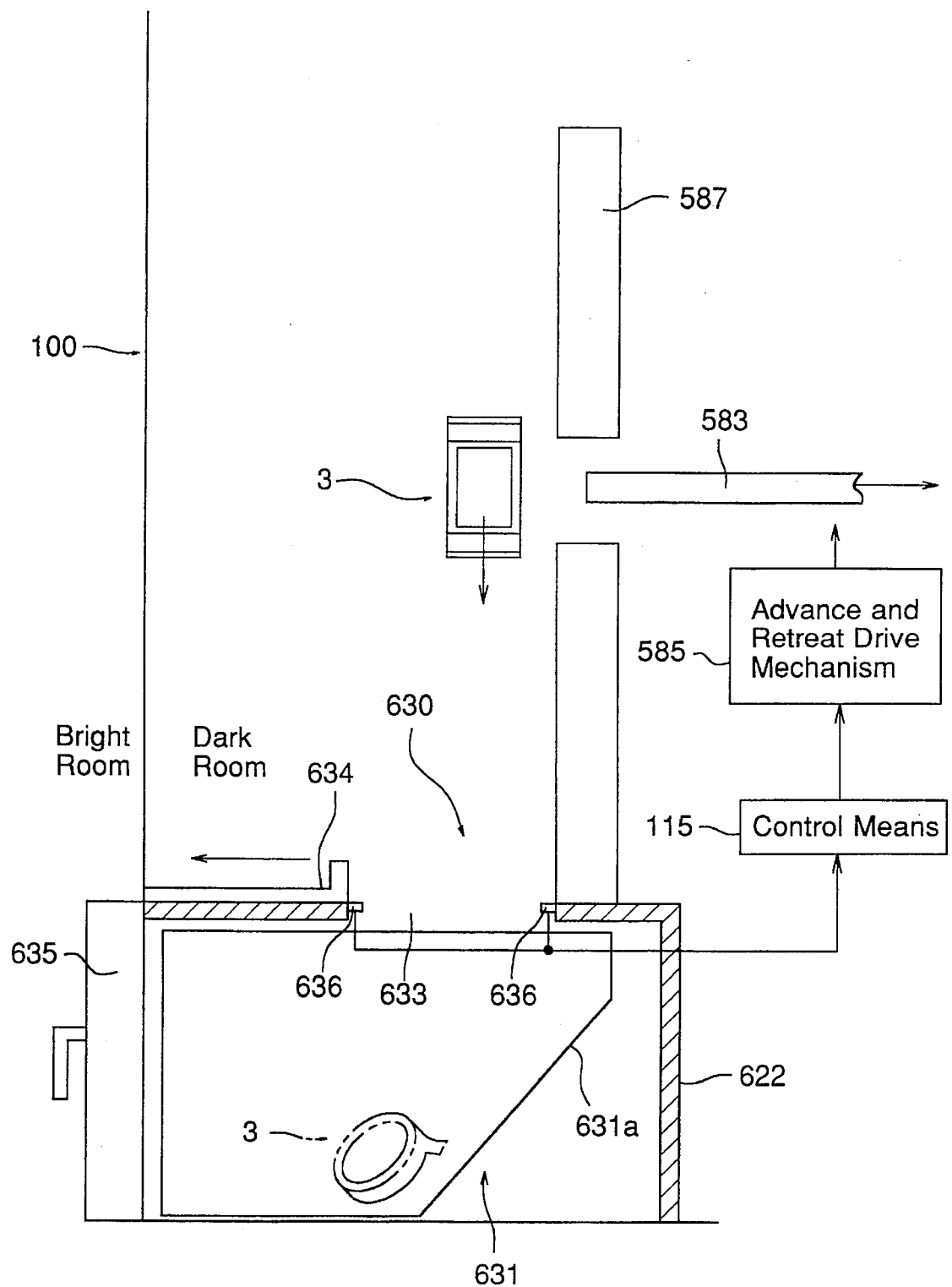
FIG. 42 is a sectional view of the core recovery mechanism showing a condition in which a master roll is discharged.

Next, the automatic switcher 101 of the film splicing section 100 will be explained as follows. FIG. 26 is a plan view showing an outline of the automatic switcher. FIG. 27 is a view taken in the direction D in FIG. 27. FIG. 28 is a partially sectional side view of the master roll taking and holding mechanism. FIG. 29 is a partial plan view of the master roll taking and holding mechanism. FIG. 30 is a partial front view of the master roll taking and holding mechanism. FIG. 31 is a front view of the chuck portion of the master roll holding mechanism. FIG. 32 is a perspective view of another example of the holding claw of the chuck portion. FIG. 33 is a perspective view of still another example of the holding claw of the chuck portion. FIG. 34 is a perspective view of still another example of the holding claw of the chuck portion. FIG. 35 is a sectional view of the master roll unwinding holding mechanism. FIG. 36 is a view showing an arrangement of the diameter detection means, wherein the view is taken from the direction of arrow E. FIG. 37 is a side view showing a portion of the master roll unwinding holding mechanism. FIG. 38 is a side view showing an operating condition of the chuck portion of the master roll unwinding holding mechanism. FIG. 39 is a front view of the holding claw of the master roll unwinding and holding mechanism. FIG. 40 is a schematic illustration showing a splicing operation of the master roll. FIG. 41 is a sectional view showing a condition of the core recovery mechanism before the core of a master roll is discharged. FIG. 42 is a sectional view showing a condition of the core recovery mechanism when the core of a master roll is discharged.

The automatic switcher 101 of the film splicing section 100 includes: the master roll taking and holding mechanism 530 that takes out and holds the master rolls 3 one by one under the condition that the cover 21 of the master roll container 2 is opened; the master roll unwinding and holding mechanism 580 in which the master roll 3 is held by the unwinding and holding means, and the photosensitive film is unwound to the film processing assembly portion; the core recovery mechanism 630 that recovers the residual core of the master roll 3 while the unwinding and holding means of the master roll unwinding and holding mechanism 580 is withdrawn; and the control means 115 that moves the taking and holding means of the master roll taking and holding mechanism 530 to a position of the unwinding and holding means of the master roll unwinding and holding means 580 so that the master roll 3 can be moved to the unwinding holding means.

The master roll taking and holding mechanism 530 includes: a taking and holding means 531 that takes out and holds the master roll 3 to be used next; a fixed type regulation means 532 to regulate the outer circumference of the master roll 3 so that it can not be loosened; and a movable type regulation means 533. This fixed type regulation means 532 regulates a surface in the direction opposite to the taking direction of the master roll 3. The movable type regulation means 533 is provided with a flanged roller 533a so that the surface on the taking side of the master roller 3 can be regulated. When the master roll 3 is replaced in the case of film splicing, the movable type regulation means 533 is moved so that the replacement operation can not be obstructed.

The master roll taking and holding mechanism 530 includes: a rotary mechanism 534 to rotate the taking and holding means 531; and a drive mechanism 535 that can move the taking and holding means 531 in a direction reverse to the taking direction of the master roll 3 with respect to the film pass line L. The rotary mechanism 534 is composed of a belt 537, pulley 538 and motor 539 that drives the rotary mechanism 534. The motor 539 is provided with a brake mechanism 540 to stop the rotation.

The support body 541 of the master roll taking and holding mechanism 530 is mounted on a base 543, and this base 543 is supported by a block 544. When a cylinder 542 composing the drive mechanism 535 is driven, the support body 541 is moved in a direction perpendicular to the film pass line L, and also moved in the reverse direction.

The block 544 is provided so that it can be slid on a frame 621 of the film splicing section 100. This frame 621 is disposed in parallel with the film pass line L. The block 544 is moved in parallel with the film pass line L when a rodless cylinder 545 is driven.

The taking and holding means 531 is provided with two rods 546, one is disposed in an upper position and the other is provided in a lower position, and an operation rod 547 is provided between the two rods 546. These rods are supported by a cylindrical body 548, and this cylindrical body is rotatably supported by a support body 541 through bearings 549. Fore end portions of the two rods 546 are connected by a plate 550, and rear end portions are connected by a plate 551. A chuck portion 552 is engaged with the plate 550. A pair of holding claws 553 are attached to the chuck portion 552 in such a manner that the holding claws 553 can be advanced and withdrawn in a direction perpendicular to the shaft of the chuck portion 552. These holding claws 553 are connected with the fore end portion 547a of the operation rod 547 through links 554. When the operation rod 547 is moved in the axial direction, the holding claws 553 are opened and closed. An air cylinder 555 is provided at the rear end portion of the operation rod 547. When this air cylinder 555 is operated, the operation rod 547 is moved in the axial direction.

When the operation rod 547 is moved in the axial direction by the air cylinder 555 as described above, the pair of holding claws 553 are advanced and withdrawn in the direction perpendicular to the axial direction, so that the master roll 3 can be held. The chuck portions 552 of the taking and holding means 531 are constructed in such a manner that they do not interfere with each other when the center of the master roll is positioned, and when the holding claws 553 are moved outside, the holding force can be generated.

As shown in FIG. 32, the surface of the holding claw 553 is subjected to knurling in such a manner that grooves 553a are diagonally formed on the surface so that the grooves cross with each other. Alternatively, resilient members 553b may be embedded onto the surface of the holding claw 553 as shown in FIG. 32 so as to increase the holding force by a frictional action. Further, as shown in FIG. 34, the radius of curvature of the surface of the holding claw 553 may be a little larger than that of the inner diameter of the core of the master roll 3. As illustrated in the drawing, when the core of the master roll 3 is held by the holding claw 553 at the two points "a" and "b", the master roll 3 can be positively held by the claws.

The upper rod 546 of the taking and holding means 531 is connected with a belt 557 through a cramp 556. This belt 557 is provided between a motor 558 and a pulley 559. When the motor 558 is driven, the belt 557 is rotated, and the taking and the holding means 531 is moved toward the master roll 3. This cramp 556 is provided with a pair of cam floors 560, and a stopper 561 supported by an air cylinder 555 is engaged with the cam floors 560 so that they can be integrally moved. When the master roll taking and holding mechanism 539 is moved from the waiting side to the unwinding side, this stopper 561 is disengaged from the cam floors 560.

As shown in FIG. 28, the support body 541 is provided with a rod 562, which is connected with the air cylinder 555. A master roll detection sensor 563 is provided at the fore end of the rod 562. The master roll detection sensor 563 outputs a detection signal when a detection pin 564 is contacted with and pushed by the master roll 3.

The cylindrical body 548 is provided with a pulley 538 of the rotary mechanism 534, and rotated by a belt 537 wound around this pulley 538. The plate 551 is provided with dogs 565, 566, and an angle detection sensor 536 is disposed being opposed to the dogs 565, 566. The angle of the taking and holding means 531 is detected by the angle detection sensor 536. In this way, the attitude of the chuck portion 552 can be detected.

The master roll taking and holding mechanism 530 includes: a film end holding means 567 to cut and hold the fore end of the next master roll 3; and a peeling arm 569 to peel an adhesive tape 568 that holds the outer circumference of the master roll 3. Therefore, from the master roll 3 held by the master roll taking and holding mechanism 530, the adhesive tape 568 on the outer circumference can be peeled off by the arm 569. The peeled adhesive tape 568 is supplied to the film end holding means 567 by the peeling arm 569 together with the film end.

The film end holding mechanism 567 includes: a roller 570 for feeding the fore end of a film; a drive mechanism 572 composed of a pulse motor 571; a cramp 573 to prevent the master roll taking and holding mechanism 530 from being disengaged from the film drive mechanism 572 while the master roll taking and holding mechanism 530 is moved; and a cutter 574 to separate the adhesive tape 568 from the fore end of a film.

In the film end holding means 567, an amount of film feeding can be set in accordance with the setting of a setting switch when the drive mechanism 572 is driven, using the pulse motor 571. Therefore, a predetermined length of film can be always fed by the drive mechanism. A surface of the film feeding roller 571 to feed the film end is covered with rubber so that the frictional force can be increased.

The film end holding means 567 can be laterally moved. While the film end holding means 567 is laterally moved, it is moved being linked with the master roll taking and holding mechanism 530 on the waiting side so that the film can be loosened between the master roll taking and holding mechanism 530 and the film end holding mechanism 567.

The master roll unwinding and holding mechanism 580 includes an unwinding and holding means 581 to unwind and hold the master roll 3. The master roll unwinding and holding mechanism 580 further includes: a diameter detection means 582 having a photoelectric sensor to continuously detect the diameter of the master roll 3, a film speed meter and a tachometer; a rotational mechanism 584 to give a rotational motion to the unwinding and holding means 581; an advance and retreat drive mechanism 585 to advance and retreat the unwinding and holding means 581 with respect to the film pass line L; a brake mechanism 586 to give a brake force to the master roll 3 held by the unwinding and holding means 581; and a fixing type regulation means 587 to prevent the master roll 3 from being loosened.

As shown in FIG. 36, in the case where an ultrasonic sensor is used for the diameter detection means 582, it is set in such a manner that the axis of the sensor coincides with the core center of the master roll 3 and the diameter of the master roll 3 can be continuously detected while it is being unwound. As shown in FIG. 38, the unwinding and holding means 581 is provided with a sliding shaft 588 in such a manner that it can be slid in the axial direction, and the fore end of the sliding shaft 588 is provided with a pair of links 589 through a connection pin 590. The pair of links 589 are supported by a sliding section 592 attached to the fore end of the unwinding and holding means 581 through support pins 591. A recessed portion 589a of each link 589 is engaged with a pin 593a of the holding claw 593. The holding claw 593 is slidably provided on a slider 594, and the holding claws 593 are inserted into the master roll 3 so that the master roll 3 can be held.

An end of the sliding shaft 588 protruding from the unwinding and holding means 581 is connected with a rod 597 of a claw opening and closing cylinder 596 through a coupling 595. When the sliding shaft 588 is moved by the claw opening and closing cylinder 596, the link 589 is extended and contracted, so that the holding claw 593 can be opened and closed. When the holding claws 593 are closed, the master roll 3 is released, and when the holding claws 593 are opened, the master roll 3 is held.

The unwinding and holding means 581 is provided with a stopper 599. When the coupling 595 comes into contact with the stopper 599, the position of the unwinding and holding means 581 can be regulated. The opening and closing stroke D1 of the holding claws 593 can be set in accordance with the distance between the retreated stopper 599 and the coupling 595.

As shown in FIG. 35, the rotational mechanism 584 to give a rotational motion to the unwinding and holding means 581 is constructed in the following manner:

A drive pulley 600 is fixed to a support sleeve 601. This support sleeve 601 is rotatably supported by a housing 603 through a bearing 602. This housing 603 is attached onto the plate 100 of the film splicing section 100. The support sleeve 601 is splined to the unwinding shaft 583. Accordingly, when the sleeve 601 is rotated, the unwinding shaft 583 is integrally rotated. A timing belt 605 is provided between the drive pulley 600 and a clutch 604. This clutch 604 is connected with an output shaft of a motor 606. When the motor 606 is driven, the drive pulley 600 is rotated through the timing belt 605.

The brake mechanism 586 to provide a brake force to the master roll 3 is constructed in the following manner: A brake pulley 607 is fixed to the support sleeve 601. A timing belt 609 is provided between the brake pulley 607 and a powder brake 608. A brake force is applied to the brake pulley 607 by the powder brake 608 through the timing belt 609.

As described above, while the master roll 3 is being unwound, the diameter of the roll is always detected, and a brake force corresponding to the diameter of the roll is transmitted from the brake mechanism 586 to the unwinding and holding means 581 while the master roll is being unwound. While the master roll is being unwound, the rotational mechanism 584 to rotate the unwinding and holding means 581 is disconnected from the unwinding and holding means 581 by the action of the clutch 604, so that the drive force is not transmitted.

As shown in FIG. 37, the advance and retreat mechanism 585 that advances and retreats the unwinding and holding means 581 with respect to the film pass line L, is constructed and operated in the following manner:

A connection plate 610 is fixed to the unwinding shaft 583. A rod 612 of a claw moving cylinder 611 is connected with this connection plate 160. When this claw moving cylinder 611 is activated, the rod 612 is extended or contracted. Due to the foregoing, the unwinding and holding means 581 is moved in the axial direction through the connection plate 610. Therefore, the holding claw 593 advances and retreats with respect to the film pass line L. Under the condition that the holding claw 593 has retreated, it is located at the rear of the fixing type regulation means 587. Therefore, the fixing type regulation means 587 works as a means to take the core and residual photosensitive film of the master roll 3.

This claw moving cylinder 611 is mounted on a bracket 613. This bracket 613 is fixed onto the plate 100a of the film splicing section 100. The bracket 613 is provided with a stopper 614. When the unwinding and holding means 581 advances, the connection plate 610 comes into contact with the stopper 614, so that the position of the unwinding and holding means 581 is regulated. The stroke D2 of the holding claw 593 is determined by a distance between the retreated connection plate 610 and the stopper 614.

Claw angle detection sensors 615 are mounted on the bracket 613, being disposed in the positions corresponding to angles 0° and 90°. Dogs 616 are mounted on the brake pulley 607, being opposed to the angle detection sensors 615 at the positions corresponding to angles 0° and 180°. The dogs 616 are provided so that the horizontal and vertical positions of the holding claw 593 can be detected by the claw angle detection sensor 615. The reason is that: when the master roll 3 is delivered, the positions of the holding claws 593 are matched. Accordingly, the angles are not necessarily 0° and 90°. Alternatively, a rotary encoder may be used for detecting the angle of the holding claw 593, and the position of the holding claw 593 may be matched at an arbitrary position. In this connection, not only a proximity sensor but also a photoelectric sensor or a magnetic sensor may be used for the claw angle detection sensor 615.

In order to prevent the outer circumference of the master roll 3 from fraying, two types of prevention mechanisms are provided, one is a movable type and the other is a fixing type. That is, the mechanism to prevent the outer circumference from fraying includes the fixing type regulation means 587 and the movable type regulation means 617. When the master roll 3 is replaced, this movable type regulation means 617 is moved so that it does not interfere with the master roll taking and holding mechanism 530.

The core recovery mechanism 630 is constructed in the following manner:

The unwinding and holding means 581 of the master roll unwinding and holding mechanism 580 is withdrawn, so that the core of the master roll 3 is disengaged from the holding claws 593, and the dropping residual photosensitive film and the core are recovered. A recovery container 631 of this core recovery mechanism 630 is disposed under the holding claws 593 of the unwinding and holding means 581, being accommodated in a light shielding box 632. A recovery opening 633 is formed in an upper portion of the light shielding box 632. This recovery opening 633 is opened and closed by a recovery door 634. When a contact surface 631a of the recovery container 631 is inclined, the dropping cores of the master rolls 3 can be widely scattered inside the recovery container 631, so that the accommodation efficiency can be improved.

A taking door 635 of the light shielding box 632 is provided on the front side of the film splicing section 100, and the recovered cores are taken out through the taking door 635. This taking door 635 can be opened only when the recovery door 634 is closed, and the recovery container 631 can be accommodated and taken out through the taking door 635. On the other hand, when the recovery door 634 is opened so as to recover the master roll 3, the taking door 635 can not be opened. The opening and closing motions of the recovery door 634 are detected by a door opening and closing detection sensor 636. In accordance with a signal sent from the door opening and closing detection sensor 636, the control means 115 activates the advance and retreat drive mechanism 585. Therefore, when the recovery door 634 is opened, the unwinding and holding means 581 is retreated and the master roll 3 is disengaged from the holding claws 593, and then the dropping master roll 3 is recovered into the recovery container 631.

A master roll supplying mechanism 650 includes: a frame 621 disposed in parallel with the film pass line L; a block 544 of the master roll taking and holding mechanism 530 slidably provided on the frame 621; a rodless cylinder 545 to move this block 544; and a cylinder 542 provided to the block 544, wherein the cylinder 542 moves a support member 541 of the master roll taking and holding mechanism 530.

As shown in FIG. 40, in the master roll supplying mechanism 650, under the condition that the holding claws 593 of the master roll unwinding and holding mechanism 580 is retreated, the rodless cylinder 545 is activated, so that the master roll taking and holding mechanism 530 is moved along the frame 621. The chuck portion 552 of the taking and holding means 531 of the master roll taking and holding means 530 is made to coincide with the holding claws 593 of the unwinding and holding means 581 of the master roll unwinding and holding mechanism 580. Under the aforementioned condition, the unwinding and holding means 581 of the master roll unwinding and holding mechanism 580 is advanced. Due to the foregoing, the holding claws are inserted between the core of the master roll 3 and the chuck portion 552. Then, the rod 588 is advanced, so that the holding claws 593 are opened and the master roll 3 can be held by the holding claws 593. On the other hand, in the master roll taking and holding mechanism 530, the operation rod 547 of the taking and holding means 531 is pulled, so that the holding claws 553 of the chuck portion 552 is closed, and the master roll 3 can be released.

After that, the cylinder 542 of the master roll taking and holding mechanism 530 is activated, and the master roll taking and holding mechanism 530 is moved in a direction so that the master roll taking and holding mechanism 530 can be separated from the master roll unwinding and holding mechanism 580. As a result of the foregoing, the chuck portion 552 of the master roll taking and holding mechanism 530 is disengaged from the master roll 3, and the master roll 3 is held by the holding claws 593 of the master roll unwinding and holding mechanism 580. Under this condition, the rodless cylinder 545 of the master roll taking and holding mechanism 530 is activated so that the master roll taking and holding mechanism 530 is moved along the frame 621. In the middle of the movement, the cylinder 542 of the master roll taking and holding mechanism 530 is activated, so that the master roll taking and holding mechanism 530 is returned to the waiting position, and the apparatus waits for the next operation.

A splicing machine 661, feed roller 662 and accumulating section 663 are disposed in a splicing chamber 660 of the film splicing section 100. A shutter 664 is provided on the front side of the splicing machine 661, and the splicing chamber 660 is shielded by this shutter 664. The splicing machine 661 has a splicing section 665. This splicing section 665 is provided with a cutter 666, heater block 667 and center punch 668. When approximately all the photosensitive film of the master roll 3 is consumed, the cutter 666 cuts the rear end of the photosensitive film. The center punch 668 forms a center hole on the photosensitive film so that the photosensitive film can be positioned. Then, a rear end of the photosensitive film and a front end of the next photosensitive film are put together and joined with pressure by an adhesive tape heated by the heater block 667. This splicing section 665 includes: a splicing tape detection sensor 669 that detects the length and existence of the splicing tape; an abnormal splicing detection sensor 670 to detect an abnormal condition of the splicing tape; a clearness detection sensor 671 to detect the clearness of the photosensitive film; and a center punch hole detection sensor 672 to detect a center punch hole.

Figure 43:
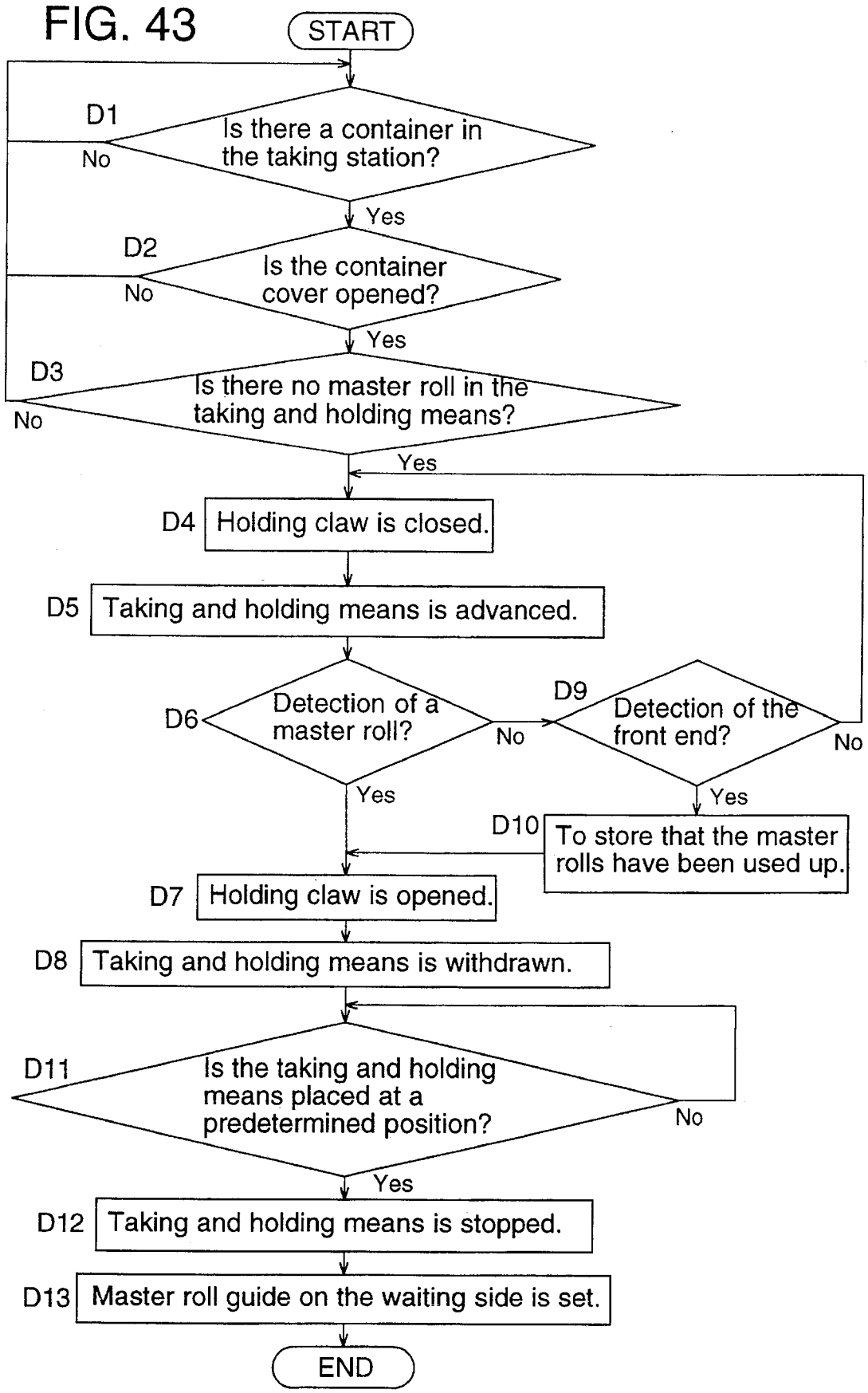
FIG. 43 is a flow chart showing an operation of taking a master roll.
Figure 44:
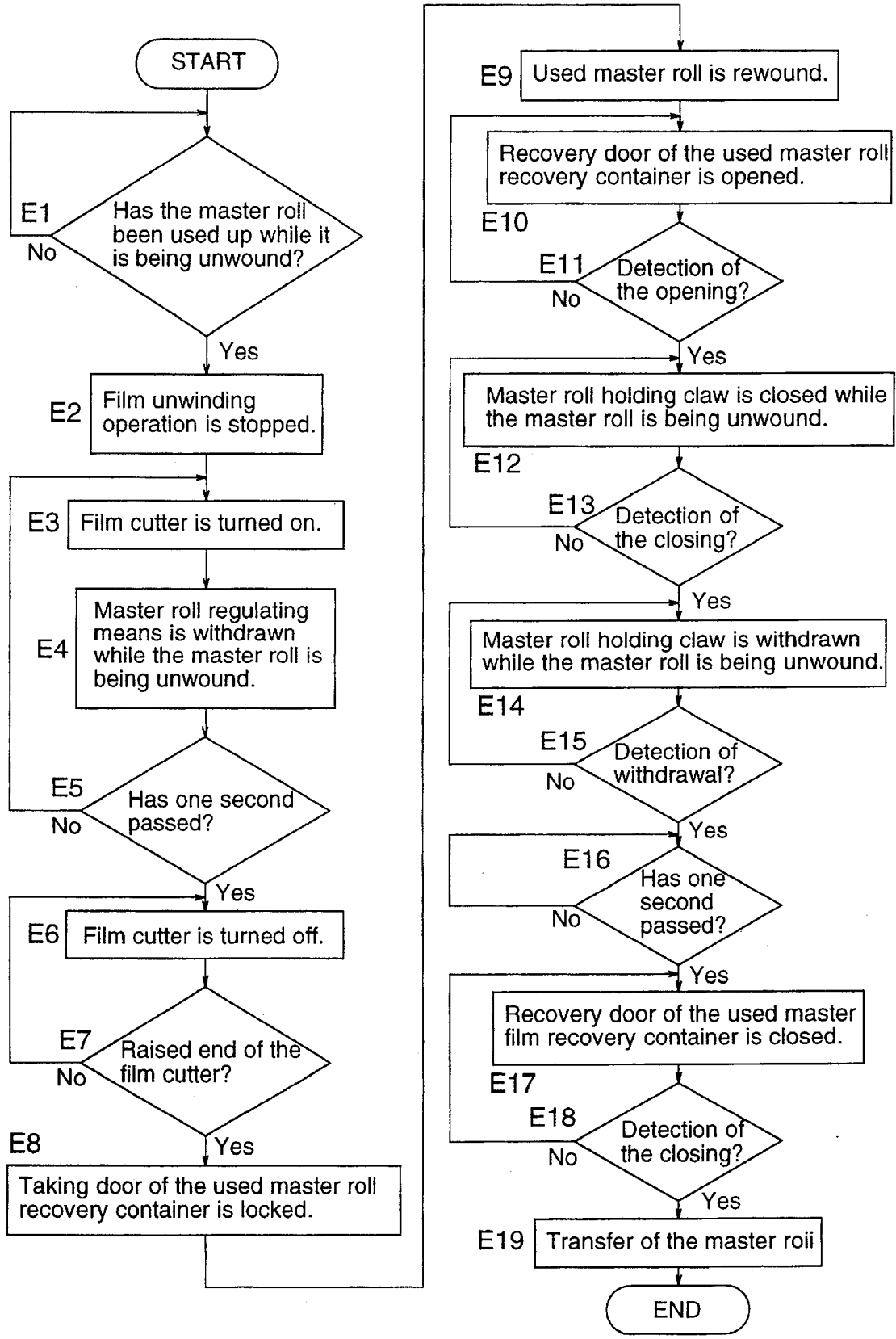
FIG. 44 is a flow chart showing a film splicing operation conducted by the master roll taking and holding mechanism, and the master roll unwinding and holding mechanism.

Next, a taking operation of the master roll 3 conducted by the master roll taking and holding mechanism 530 will be explained as follows. FIG. 43 is a flow chart showing a flow of the taking operation of the master roll 3. When the master roll container 2 exists in the taking station 110 in step D1, it is judged in step D2 whether or not the cover 21 of the master roll container 2 is opened. In the case where the cover 21 is opened, it is judged in step D3 whether or not the master roll 3 exists in the taking and holding means 531 of the master roll taking and holding mechanism 530. In the case where the master roll 3 does not exist, the holding claws 553 are closed in step D4. In step D5, the taking and holding means 531 of the master roll taking and holding mechanism 530 is advanced. In step D6, the master roll 3 is detected by the master roll detection sensor 563 provided in the taking and holding means 531.

In the case where the master roll 3 exists in step D6, the holding claws 553 are opened in step D7 so that the master roll 3 is held. In step D8, the master roll 3 is held and retreated by the taking and holding means 531. In the case where the master roll 3 does not exist in step D6, an advancing end portion of the taking and holding means 531 is detected in step D9. In the case where the advancing end portion has been detected, it is stored in step D10 that the master roll 3 has been used up, and the program advances to step D7. The master roll 3 is held and retreated by the taking and holding means 531. When a predetermined position of the taking and holding means 531 is detected in step D11 by a predetermined position detecting proximity sensor not shown in the drawings, the retreating motion of the taking and holding means 531 is stopped in step D12, and in step D13, the master roll 3 is held by a guide. In this way, the program is completed.

Next, with reference to FIGS. 44, 45 and 46a–46ca film splicing operation conducted by the master roll taking and holding mechanism 530 and the master roll unwinding and holding mechanism 580 will be explained as follows. First, referring to the flow chart shown in FIG. 44, it is judged in step E1 whether the residual film of the master roll 3 exists or not. In the case where the residual film of the master roll 3 does not exist, the unwinding operation of the master roll 3 is stopped in step E2. Next, in step E3, the film cutter 666 is operated so that the master roll 3 is cut. In step E4, the movable type regulating means 617 of the unwinding master roll 3 is moved. In step E5, a counting operation is conducted by a timer of the control means 115, and after one second has been counted, the operation of the film cutter 666 is stopped in step E6. In step E7, an end portion of the film cutter 666 is detected by a lead switch not shown which is mounted on a cylinder to drive the film cutter. In step E8, the taking door 635 of the recovery container 631 of the used master roll 3 is locked by the cylinder so that the lever can not be rotated. In step E9, the used photosensitive film is rewound.

In steps E10 and E11, in order to accommodate the residual master roll 3 into the recovery container 631, the recovery door 634 is opened, and the opening condition of the recovery door 634 is detected by the door opening and closing sensor 636. In step E12, the holding claw 593 of the master roll unwinding holding mechanism 580 is closed. In step E13, the lead switch mounted on the claw opening and closing cylinder detects the condition. In steps E14 and E15, the holding claws 593 of the master roll unwinding and holding mechanism 580 are retreated, and then in step E16, the timer of the control means 115 counts that one second has passed. Then, in step E17, the used master roll 3 is disengaged from the holding claws 593 and drops into the recovery container 631 so that the used master roll 3 is accommodated, and then the recovery door 634 is closed. In step E18, the closing motion of the recovery door 634 is detected by the door opening and closing detection sensor 636. In step E19, the master roll 3 is delivered.

Figure 45:
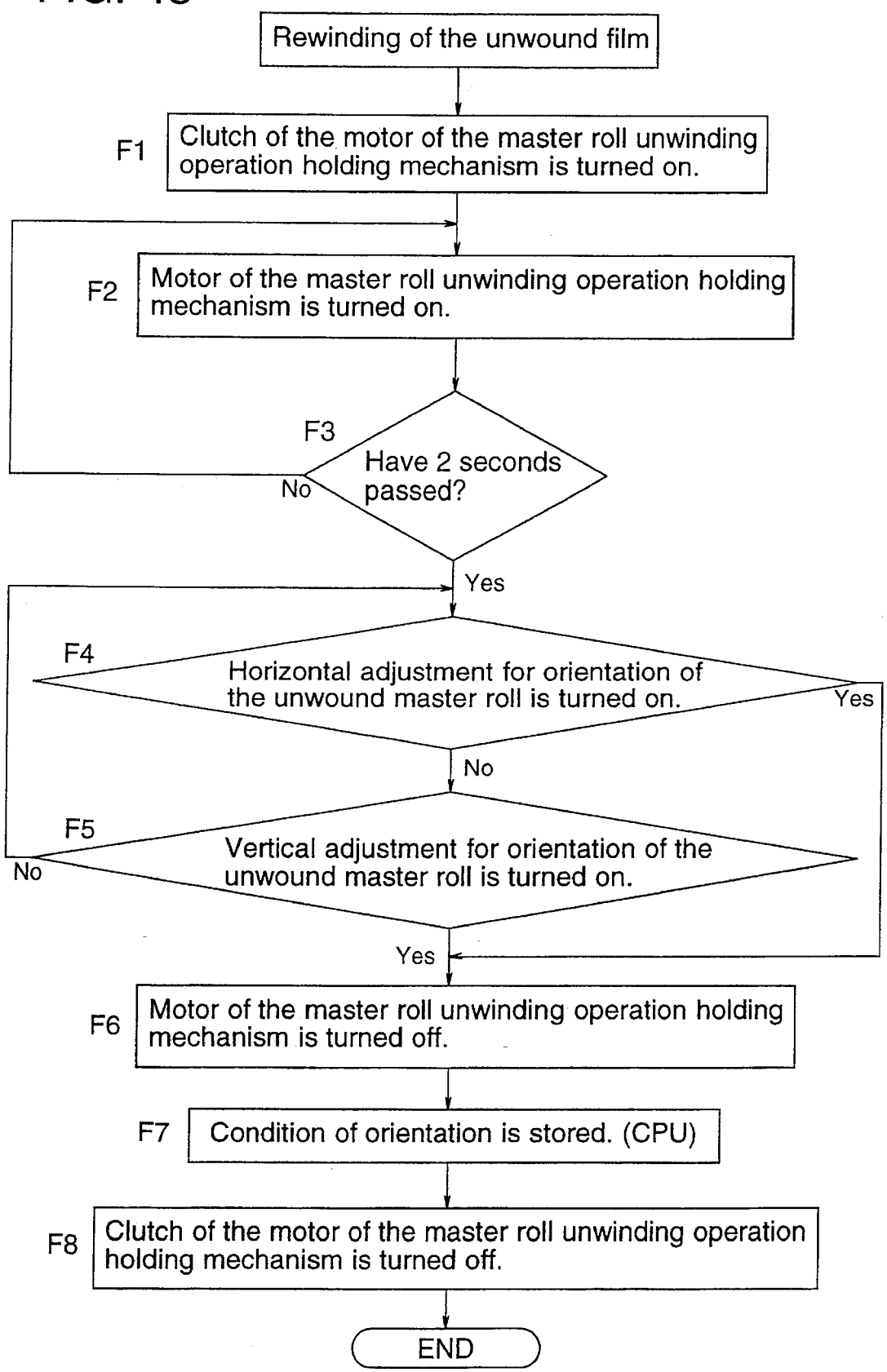
FIG. 45 is a flow chart showing a rewinding operation of an unwound film.

With reference to a flow chart shown in FIG. 45, a rewinding operation of the residual used master roll 3 will be explained as follows. In step F1, the clutch 604 of the motor 606 of the master roll unwinding and holding mechanism 580 which is being unwound, is connected. In step F2, the motor 606 of the master roll unwinding and holding mechanism 580 is driven so that the unwinding and holding means 581 is rotated. In step F3, the timer of the control means 115 counts that two seconds have passed, and then in steps F4 and F5, while the dog 616 is attached to the holding claw 593 of the unwinding and holding mechanism 580, the orientation position is detected by the claw angle detection sensor 615, and horizontal and vertical orienting operations of the master roll 3 are conducted. In step F6, the motor 606 of the master roll unwinding and holding mechanism 580 is stopped. In step F7, this orienting condition is stored in the control means 115. In step F8, the clutch 604 of the motor 606 of the master roll unwinding and holding mechanism 580 is disconnected. Concerning this unwinding operation, depending on the construction of the machine, it is not necessary to unwind the film, because the photosensitive film enters the recovery container 631 when it drops in a natural condition.

Figure 46A:
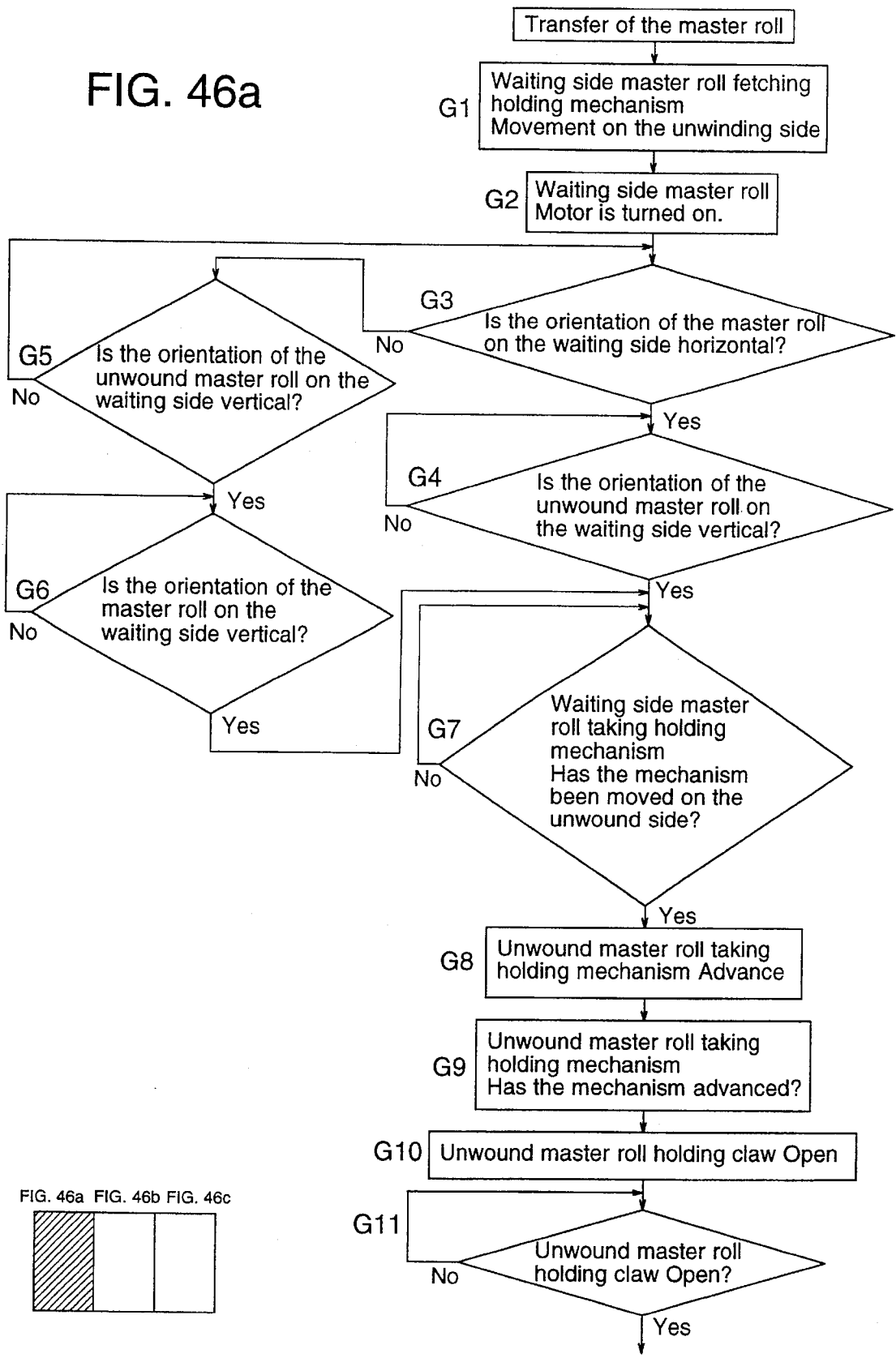
Figure 46C:
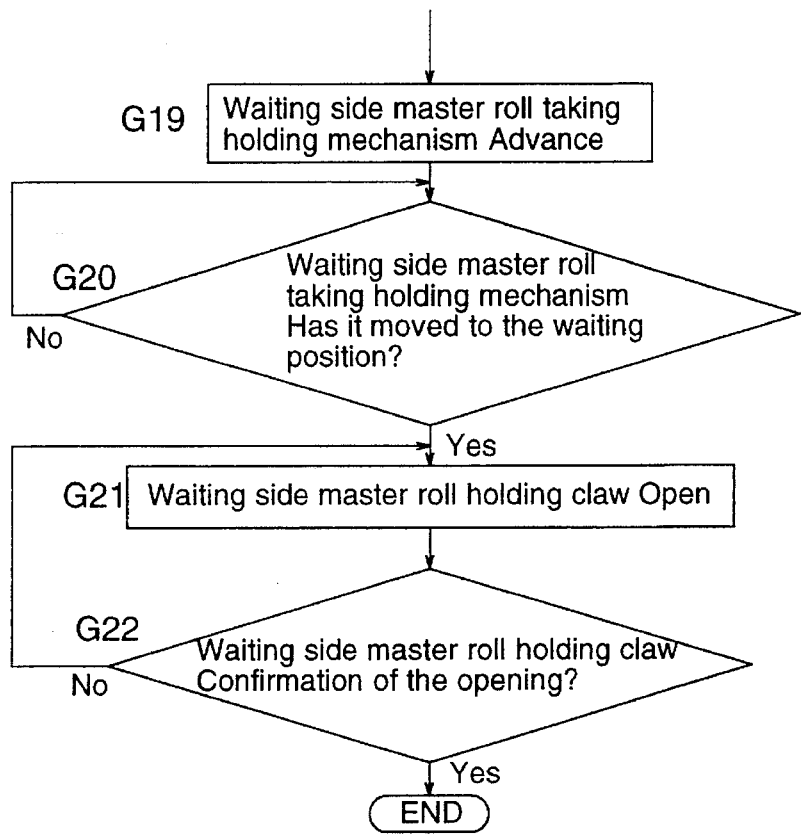

Next, with reference to the flow chart shown in FIGS. 46a–46c, the delivery of the master Toll 3 will be explained as follows. In step G1, the master roll taking and holding mechanism 530 on the waiting side is moved to the unwinding side. In step G2, the motor 539 of the rotary mechanism 534 is driven so that the taking and holding means 531 is rotated. In the case where the orientation of the master roll 3 being unwound is horizontal in steps G3 to G6, the orientation on the waiting side is made to be horizontal, and in the case where the orientation of the master roll 3 being unwound is vertical in steps G3 to G6, the orientation on the waiting side is made to be vertical. In step G7, the master roll taking and holding mechanism 530 on the waiting side is moved to the unwinding side.

In step G8, the unwinding and holding means 581 of the master roll unwinding and holding mechanism 580 on the unwinding side is advanced. In step G9, the lead switch mounted on the claw moving cylinder 611 detects that the movement of the unwinding and holding means 581 has been completed. In steps G10 and G11, the holding claws 593 are opened so that the master roll 3 can be held by the holding claws. In step G12, the movable regulation means 533 of the master roll taking and holding mechanism 530 on the waiting side is withdrawn, and in steps G13 and G14, the holding claws 553 of the master roll taking and holding mechanism 530 is closed, and the condition of this closed holding claws 553 is detected by the lead switch mounted on the claw opening and closing cylinder.

Then, in steps G15 and G16, the taking and holding means 531 of the master roll taking and holding mechanism 530 on the waiting side is withdrawn, and this withdrawal is detected by the lead switch mounted on the forward driving cylinder. Further, in steps G17 and G18, the master roll taking and holding mechanism 530 on the waiting side is moved to the waiting position. Then, in step G19, the taking and holding means 531 of the master roll taking and holding mechanism 530 on the waiting side is advanced. In step G20, a returning motion of the master roll taking and holding mechanism 530 on the waiting side is detected. In steps G21 and G22, an opening condition of the holding claws 553 of the master roll taking and holding mechanism 530 on the waiting side is made certain. In this way, the delivery of the master roll 3 is completed.

As described above, when the master roll container 2 is set in the taking station 110 in the film splicing section 100 under the dark room condition and the master roll 3 is automatically unwound, the operator's labor can be saved and the master roll 3 can be taken out one by one while the operator is out of the dark room, and further the apparatus can be made compact.

Then the master roll 3 is taken out from the master roll container 2 one by one, and held by the taking and holding means 531 waiting for the next operation. When the unwinding of the photosensitive film has been completed in the unwinding and holding means 581, the unwinding and holding means 581 is retreated and the residual core is recovered. Then the taking and holding means 531 waiting in the unwinding and holding means 581 is moved and positioned, and under this condition, the taking and holding means 531 is moved to and set in the unwinding and holding means 581. Accordingly, it is possible to always unwind the photosensitive film at a predetermined position, and the unwinding structure is simple and further the cost can be reduced and the residual core can be easily recovered after the master roll 3 has been spliced.

Figure 47:
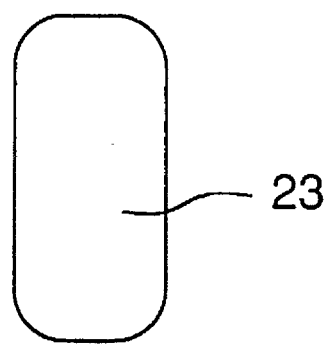
FIG. 47 is a front view of a master roll container support shaft of another example.
Figure 48:
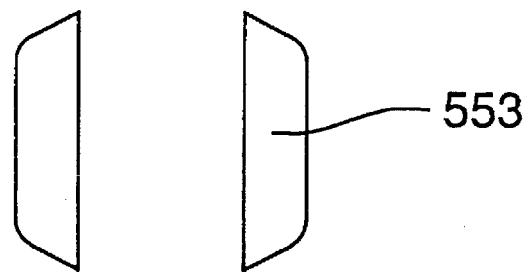
FIG. 48 is a front view of a holding claw of the taking and holding means of another example.
Figure 49:
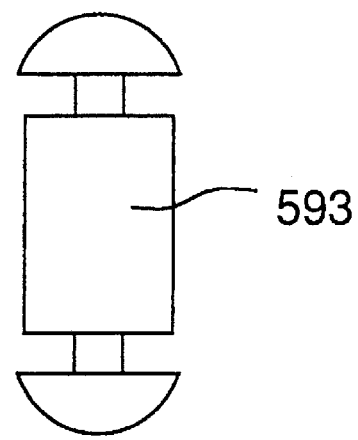
FIG. 49 is a front view of a holding claw of the unwinding and holding means of another example.

In this connection, the following construction may be adopted:

The support shaft 23 of the master roll container 2 is constructed as shown in FIG. 47. The holding claw 553 of the taking and holding means 531 is constructed as shown in FIG. 48. The holding claw 593 of the unwinding and holding means 581 is formed as shown in FIG. 49. The holding claw 553 is engaged with the support shaft 23, so that the master roll 3 is received by the holding claw 553. Further the holding claw 593 is engaged with the holding claw 553, so that the master roll 3 is received by the holding claw 593.

Figure 50:
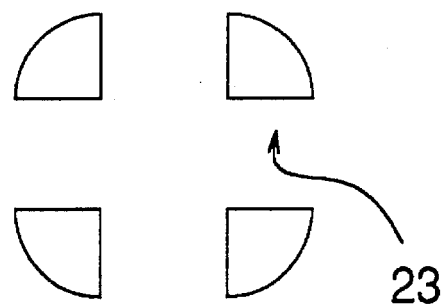
FIG. 50 is a front view of a master roll container support shaft of still another example.
Figure 51:
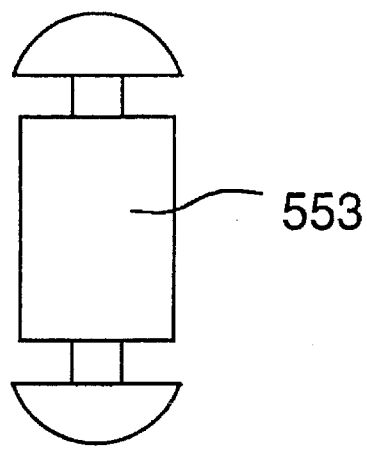
FIG. 51 is a front view of a holding claw of the taking and holding means of still another example.
Figure 52:
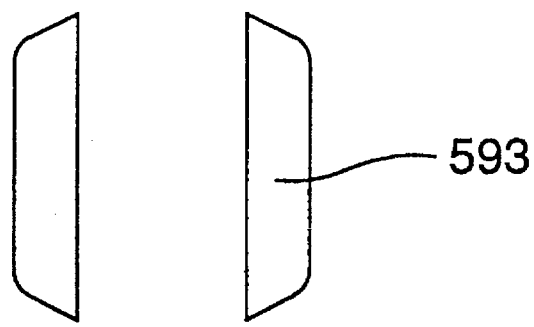
FIG. 52 is a front view of a holding claw of the unwinding and holding means of still another example.

Further the following construction may be adopted: The support shaft 23 of the master roll container 2 is constructed as shown in FIG. 50. The holding claw 553 of the taking and holding means 531 is constructed as shown in FIG. 51. The holding claw 593 of the unwinding and holding means 581 is constructed as shown in FIG. 52. The holding claw 553 is engaged with the support shaft 23, so that the master roll 3 is received by the holding claw 553. Further the holding claw 593 is engaged with the holding claw 553, so that the master roll 3 is received by the holding claw 593.

Next, the one side calking cartridge processing device 220 will be explained in detail as follows. FIG. 3 is a plan view of the one side calking cartridge processing device 220. The one side calking cartridge processing device 220 is provided with the U-shaped parts automatic supplying section 221. This U-shaped parts automatic supplying section 221 has an exclusive tray 224. For example, this exclusive tray 224 accommodates 750 U-shaped parts 4. A row of U-shaped parts 4, for example, about 125 U-shaped parts 4 are taken out from this exclusive tray 224 with the taking arm 225, and then the U-shaped parts 4 are put on the conveyor 226 and pushed in the direction of the cartridge capping calking section 223 by the belt 226. At the end of the conveyor 226, the U-shaped parts are taken out one by one and put on the feeding rod 228. Then, it is checked whether or not the U-shaped parts coincide with the bar codes. After that, the U-shaped member is formed to be round by a metallic die. In this forming, for example, a cartridge body forming apparatus disclosed in Japanese Patent Application Open to Public Inspection No. 7546/1992 may be employed.

This U-shaped member 5 is conveyed to the cartridge cap calking section 223 where the cartridge cap 11 is attached and calked onto one side of the U-shaped member 5, so that the one-side calked cartridge 6 is formed. Height of the calked portion of this one-side calked cartridge 6 is checked. After that, the one-side calked cartridge 6 is supplied to the film processing assembly section 300. Defective one-side calked cartridge 6 is automatically rejected.

Figure 53:
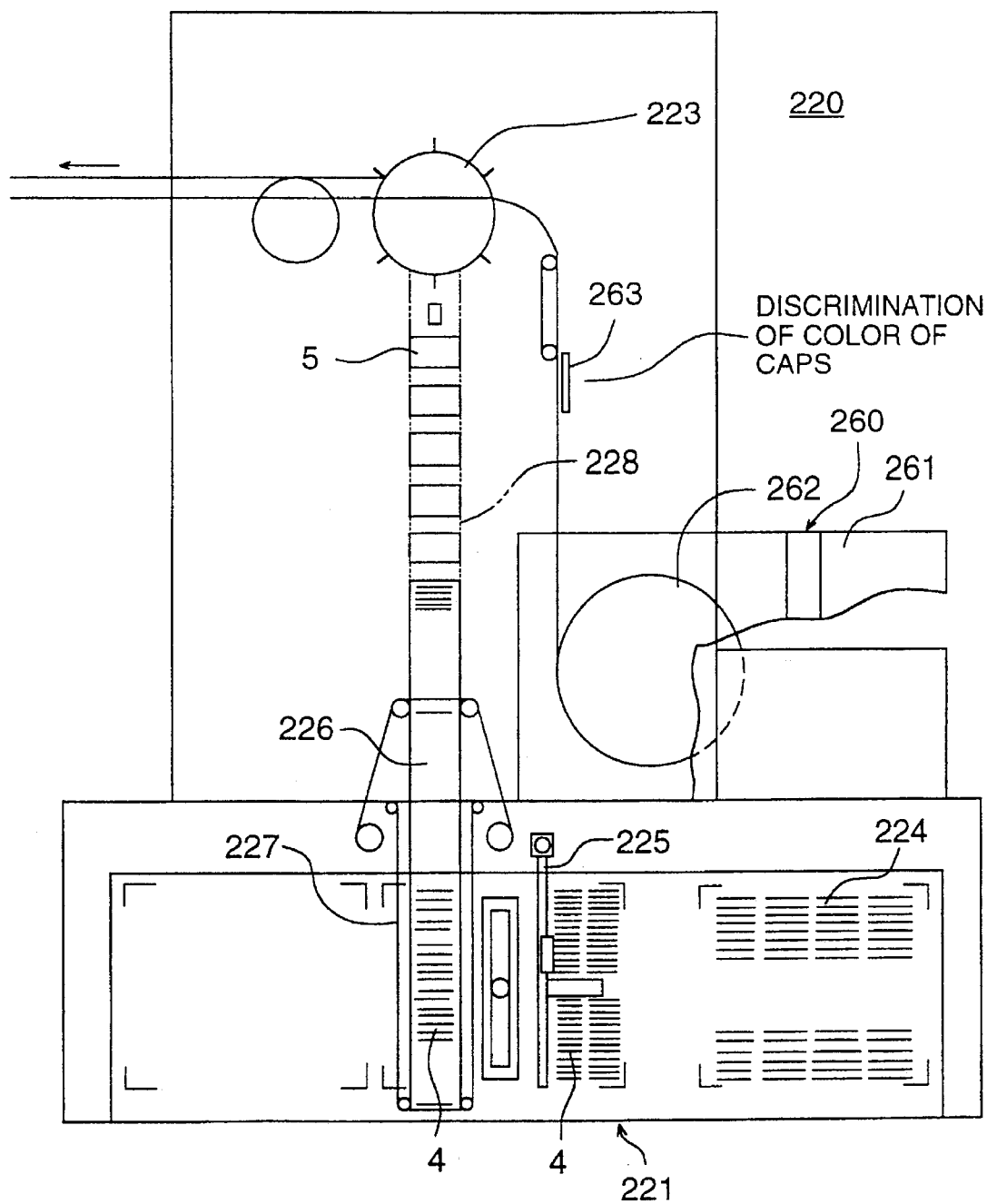
FIG. 53 is a plan view of a one-side calked cartridge processing device.

Next, the cartridge cap supplying section 260 will be explained as follows. As shown in FIG. 53, the cartridge cap supplying section 260 is operated in the following manner: The cartridge cap 11 is supplied to the cap feeder 262 from the cap hopper 261. Color the cartridge cap 11 is discriminated by the sensor 263, and then the cartridge cap 11 is conveyed to the cartridge cap calking section 223.

Figure 54:
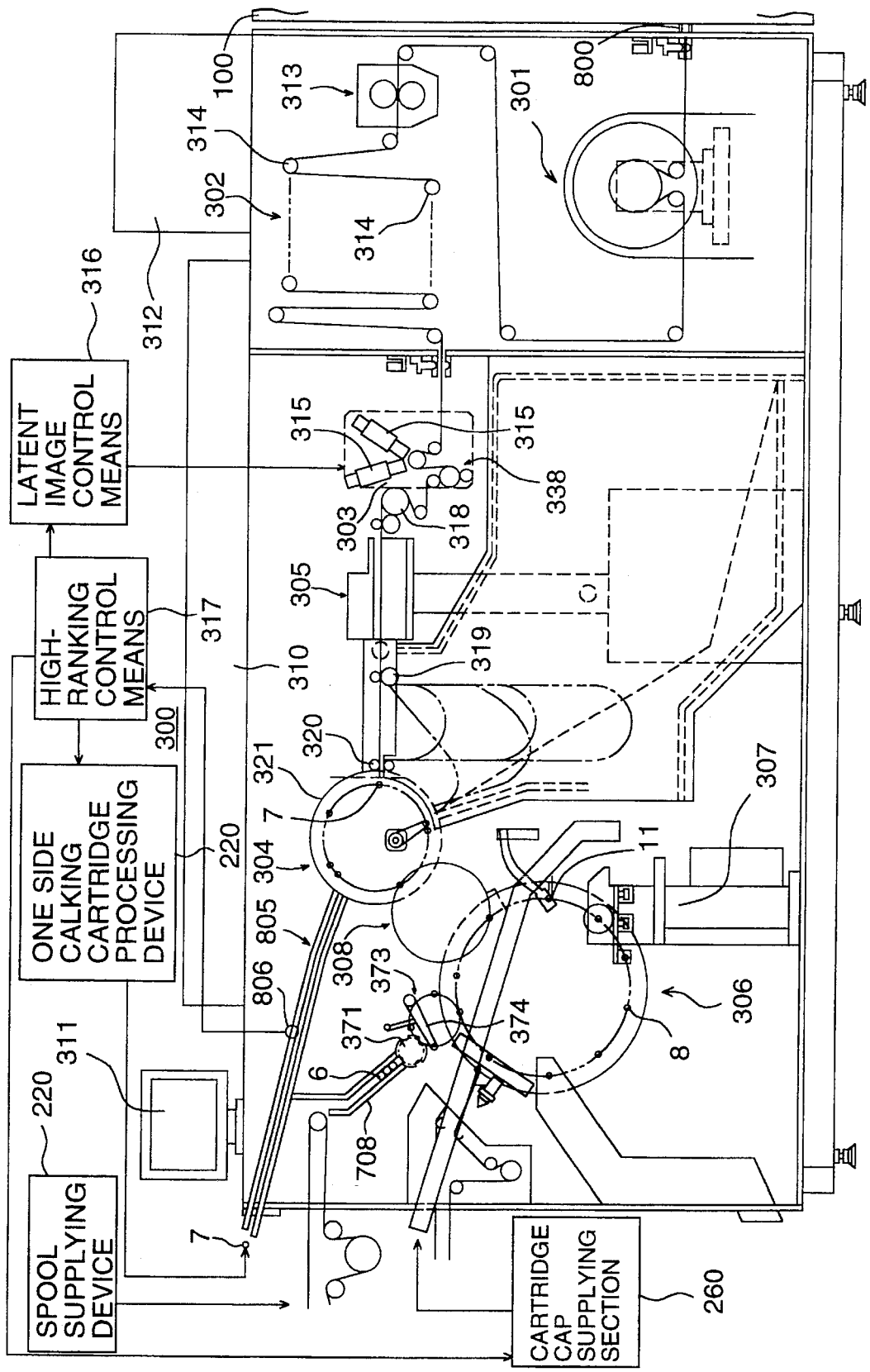
FIG. 54 is a front view of a film processing assembly section.
Figure 55:
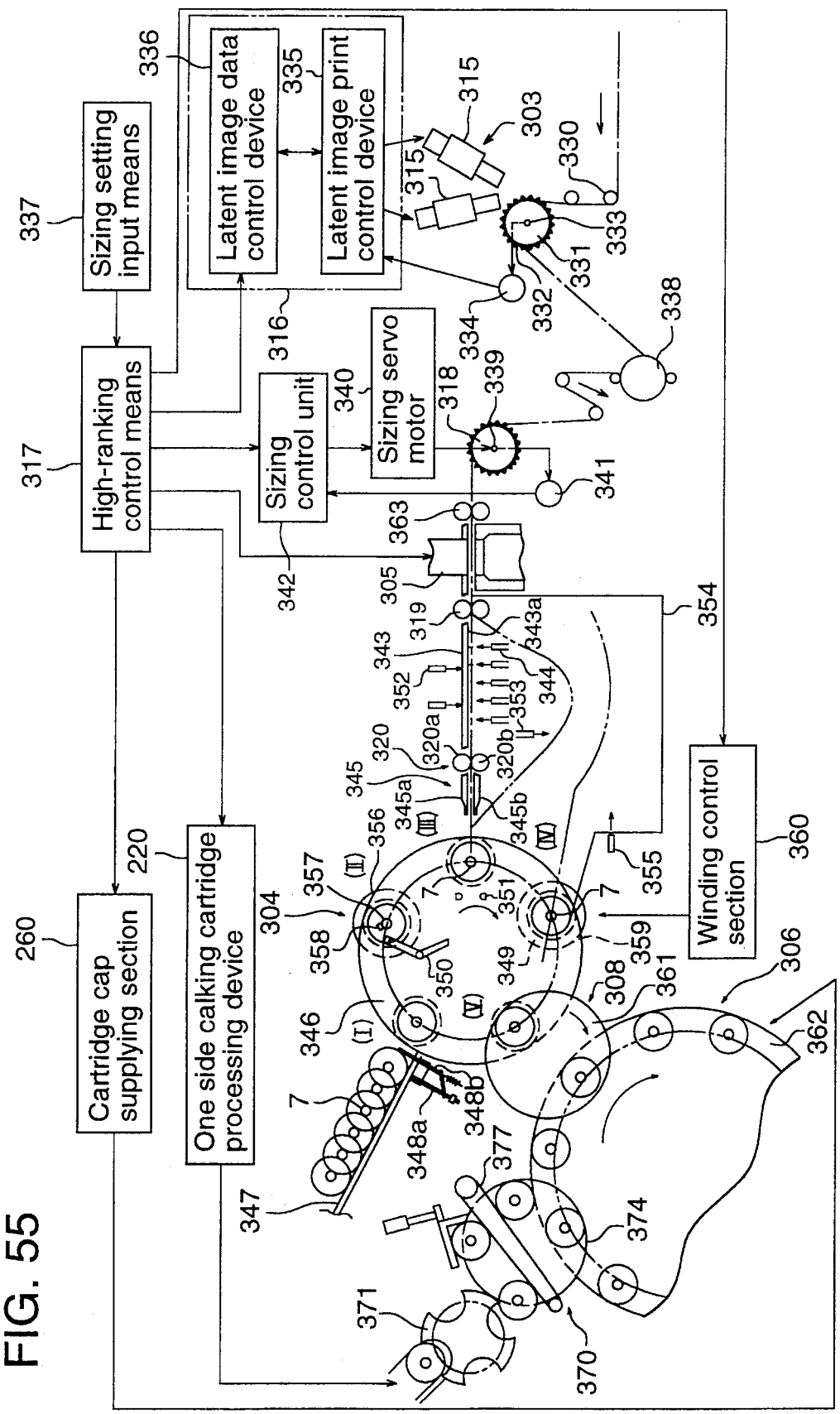
FIG. 55 is a view showing the detail of the film processing assembly section.
Figure 56:
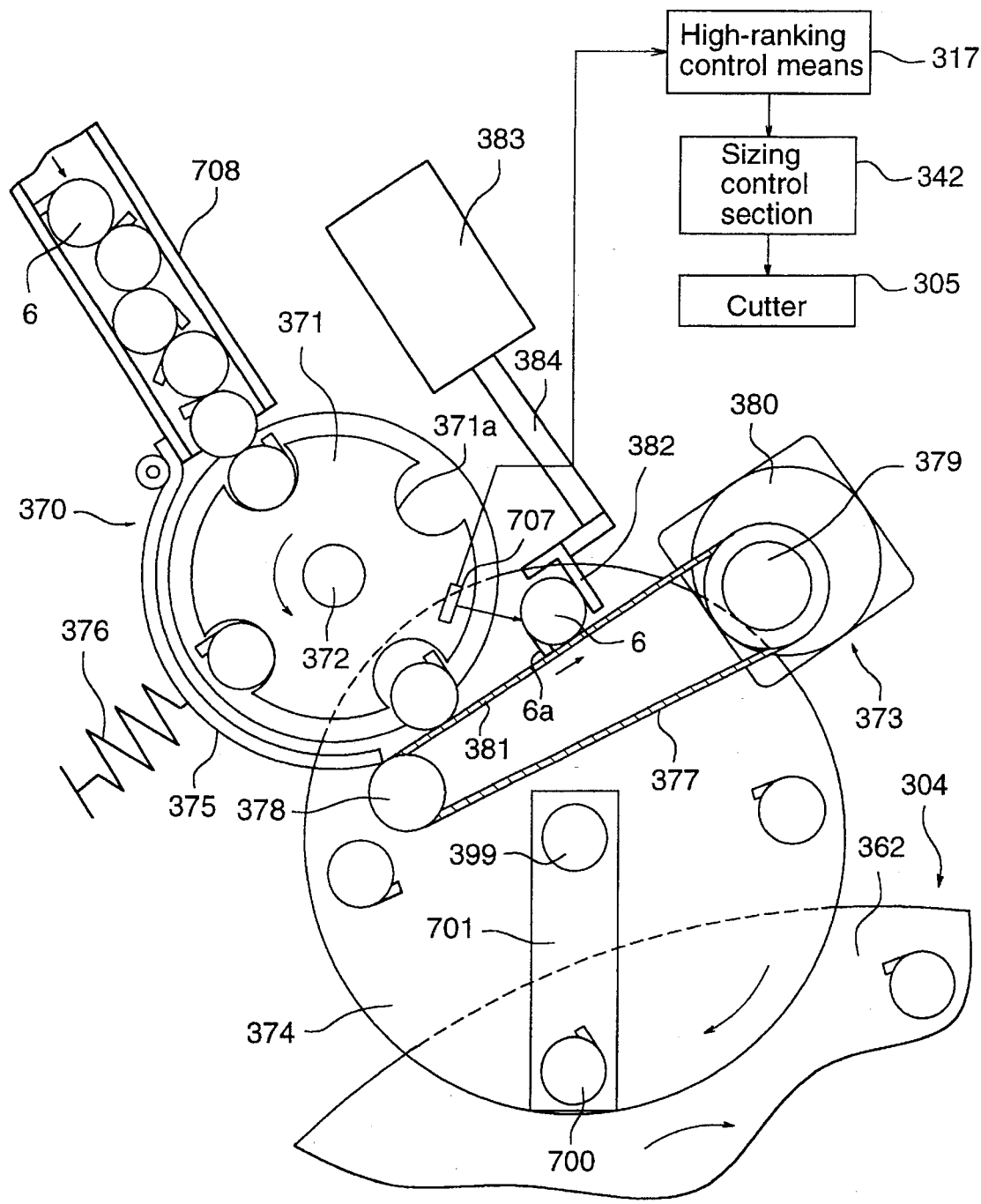
FIG. 56 is a front view of a one-side calked cartridge setting section.
Figure 57:
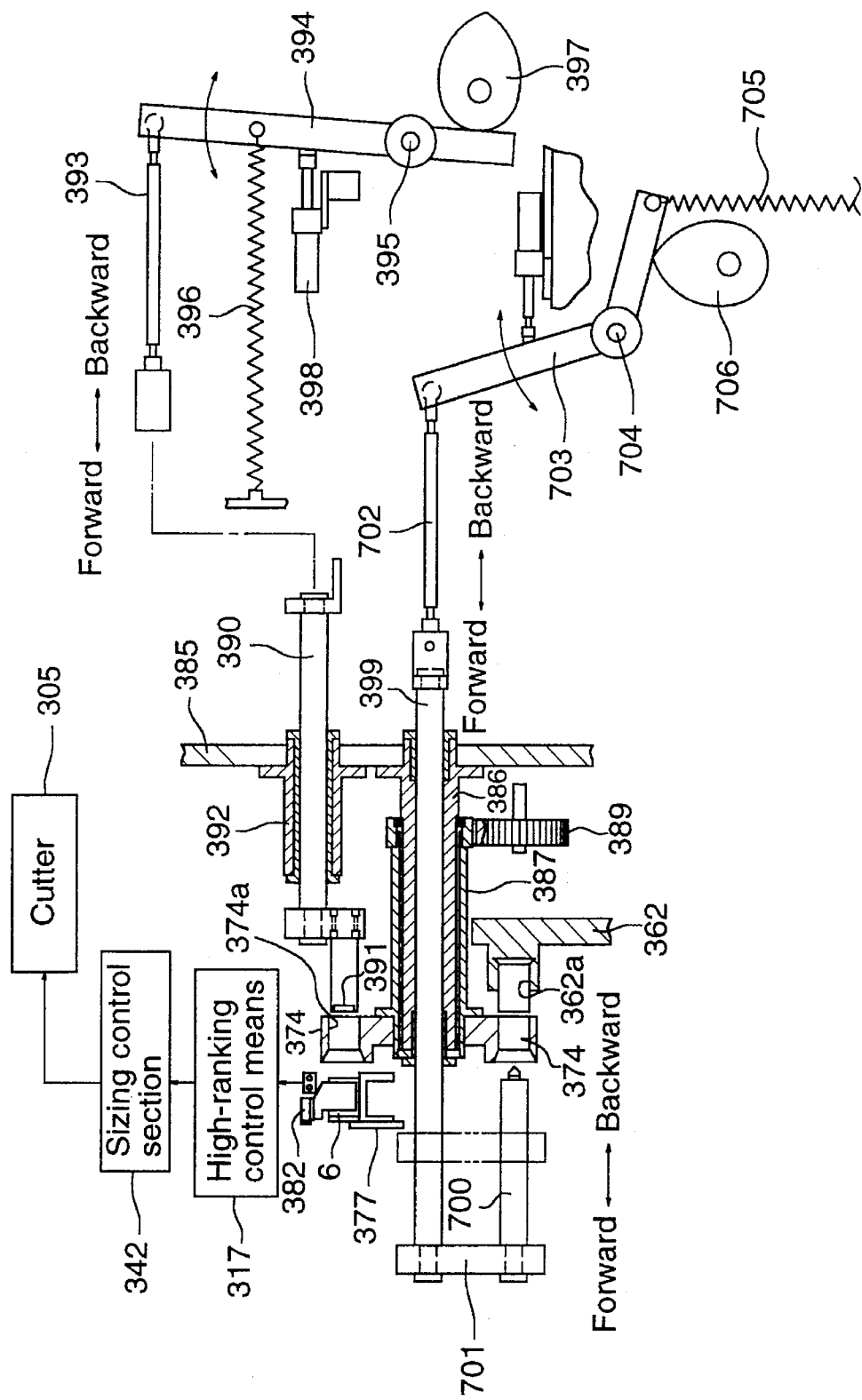
FIG. 57 is a side view of the one-side calked cartridge setting section, wherein a portion is shown in a sectional view.
Figure 58:
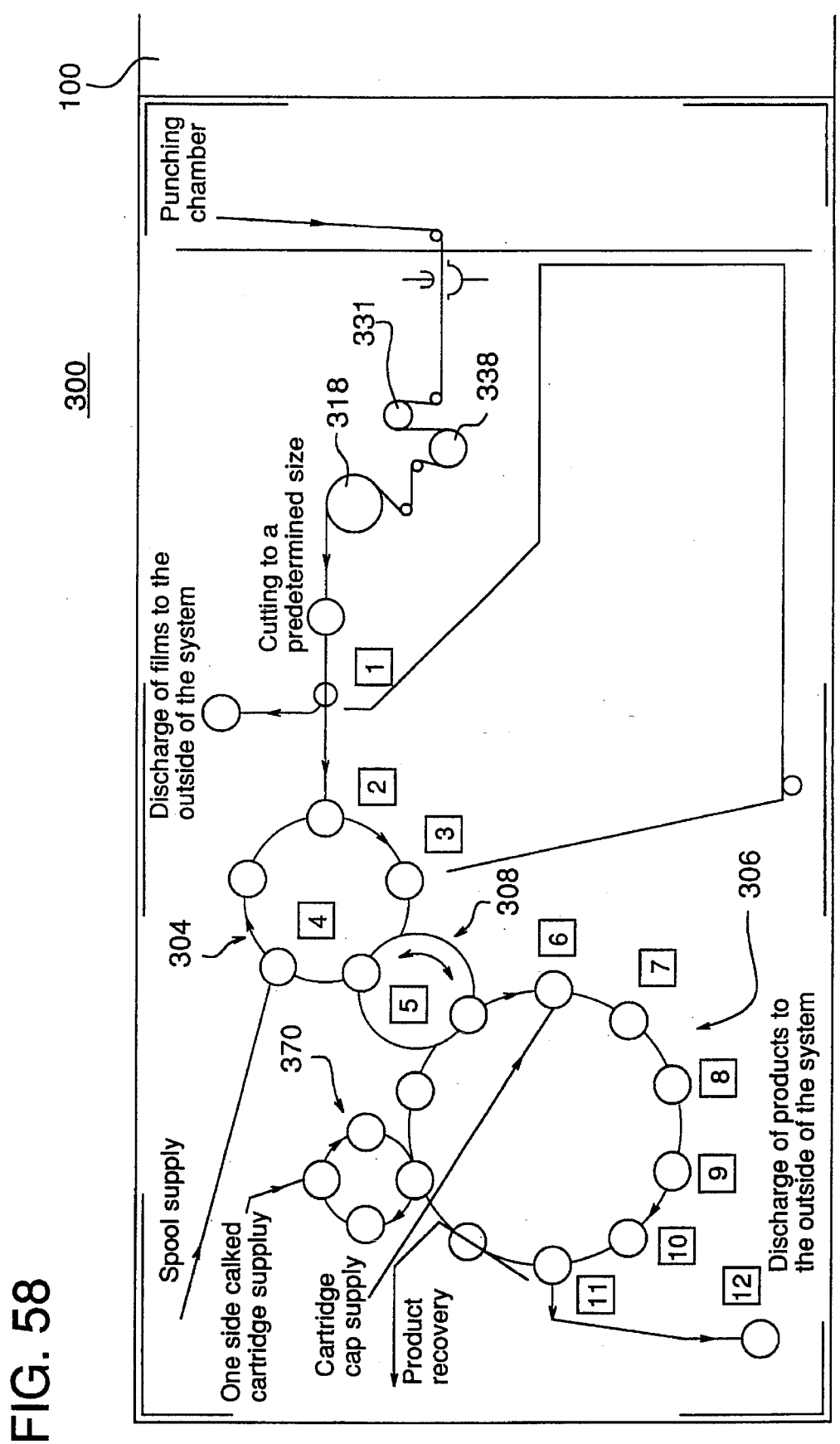
FIG. 58 is a view showing a detailed arrangement of a conveyance passage of a film processing assembly section.

Next, the film processing and assembling section will be described in detail. FIG. 54 is a front view of the film processing and assembling section. FIG. 55 is a detailed arrangement view of the film processing and assembling section. FIG. 56 is a front view of the one-side calking cartridge setting section. FIG. 57 is a side view of the one-side calking cartridge setting section, wherein a portion is illustrated in a cross sectional view. FIG. 58 is a detailed arrangement view of the conveyance passage of the film processing and assembling section.

First, with reference to FIG. 54, an overall arrangement of the film processing and assembling section will be explained as follows. This film processing and assembling section 300 includes an operation box 310, CRT display section 311, and control box 312. The inside of this film processing and assembling section 300 is maintained in a dark room condition. Perforations are formed by a punch 301 on the photosensitive film conveyed from the film splicing section 100. In order to form the perforations, a continuous punch or a reciprocating punch disclosed in Japanese Utility Model Open to Public Inspection No. 98597/1981 may be employed. In the case where the reciprocating punch is used, a vibration isolator such as a rubber vibration isolator and an air spring is preferably provided.

Dust on the photosensitive film is collected by a brush cleaner 313, and the photosensitive film is conveyed to the accumulating section 302. This accumulating section 302 is composed of dancer rollers 314. Then the photosensitive film is conveyed to a latent image print section 303 through the accumulating section 302. In this latent image print section 303, a latent image is printed on the photosensitive film through an optical fiber 315, wherein the printing operation is conducted being linked with the conveyance of the photosensitive film. This latent image is previously formed by a latent image control means 316, that is, various latent images such as side lines, side marks, bar codes and frame numbers are previously formed and stored on a floppy in a setting section. In accordance with a command of a high-ranking control means 317, necessary signals of latent images are transmitted to a control section of the latent image printing section 303 provided in the film processing and assembling section 300, from the setting section. In the control section, the content of the latent image is electrically stored.

The photosensitive film is conveyed to the spool assembly section 304 through a sizing sprocket 318, draw roller 319, and insertion roller 320. Then, the photosensitive film is cut down to a predetermined length with a cutter 305. The photosensitive film is continuously processed to this stage, and then the photosensitive film is cut down to the predetermined length determined by a sizing sprocket 318 driven by a servo motor. At this time, a hole to be engaged with the spool and a tong-shaped end portion are also formed. For example, a film cutting device disclosed in Japanese Patent Application Open to Public Inspection No. 183398/1989 may be used for the device to cut the photosensitive film to a predetermined length.

Spools 7 are successively supplied to a spool turret 321 of the spool assembly section 304 from the spool supplying device 240. Then, a fore end of the photosensitive film is inserted into a slit of the spool 7 so that the photosensitive film is wound around the spool 7. The photosensitive film wound around the spool 7 is supplied to the cartridge assembling section 306 by the carrier 308. One-side calked cartridge 6 is supplied to the cartridge assembling section 306 from the one-side calking cartridge processing device 220. Further, a cartridge cap 11 is supplied from the cartridge cap supplying section 260. Then the spool 7 around which the photosensitive film is wound is accommodated in the one-side calked cartridge 6, and the cartridge cap 11 is assembled to the one-side calked cartridge 6, and then the cartridge cap 11 is calked by the calking machine 307. In this way, the film cassette 8 is produced. After the total height of the film cassette 8 has been checked, it is conveyed to an inspection device 420.

Next, with reference to FIG. 55, operations will be explained in detail with respect to the process from the printing of a latent image to the supply of the spool 7.

An unexposed long photosensitive film pulled out from the master roll 3 in the film splicing section 100 is guided by the guide roller 330, and wound around a printing sprocket 331 composing the latent image print section 303. Teeth 332 of the printing sprocket 331 are in mesh with the perforations on the photosensitive film si that the film conveyance can be synchronized with the rotation of the printing sprocket 331. A rotational shaft 333 of the printing sprocket 331 is directly connected with a rotary encoder 334 so that a signal synchronized with the rotation of the rotational shaft 333 of the printing sprocket 331 can be sent to a latent image printing control section 335. This latent image printing control section 335 is connected with a latent image data control section 336 that controls the latent image data in accordance with the size and type of the photosensitive film so that the data can be made edited and further a printing command can be controlled. This latent image data control device 336 is connected with a high-ranking control means 317 that outputs a control signal for switching the size and type of the photosensitive film. A size setting input means 337 is connected with this high-ranking control means 317. Types of photosensitive films are inputted into the high-ranking control means 317 by an operator in accordance with the production schedule.

This film size setting means 337 is composed of a change-over switch. When the operator designates a film size, the high-ranking control means 317 controls the latent image data control section 336 in accordance with the size setting. Then, a latent image printing command fit for the designated film size is inputted into the latent image printing control section 335. This latent image printing control section 335 is operated as follows:

In accordance with the inputted latent image printing command and also in accordance with a signal outputted by the rotary encoder 334, the signal being synchronized with the rotation of the rotational shaft 333 of the printing sprocket 331, a predetermined position of the photosensitive film where each latent image is to be printed is judged. In accordance with the result of the judgment, a latent image printing command is sent to the optical fiber 315 mounted on the printing sprocket 331. By the light beams emitted from the optical fiber 315, a predetermined latent image is printed at a predetermined position on the photosensitive film.

The photosensitive film on which the latent image has been printed passes through the dancer roller section 338 that absorbs a speed difference caused in the conveyance passage. Then the photosensitive film is conveyed to the sizing sprocket 318. A rotational shaft 339 of this sizing sprocket 318 is directly connected with a sizing servo motor 340 and a sizing rotary encoder 341, so that the rotational shaft 339 is rotated and stopped by this sizing servo motor 341. The sizing servo motor 340 and the sizing rotary encoder 341 are connected with a sizing control section 342, and further this sizing control section 342 is connected with the high-ranking control means 317. The sizing control section 342 is controlled by a control signal of this high-ranking control means 317. Then a signal representing the number of revolution of the sizing sprocket 318 corresponding to the film cut size designated by the sizing control section 342, is sent to the sizing servo motor 340. According to this signal, the sizing sprocket 318 is rotated by a predetermined number of revolution, so that the photosensitive film is supplied to a feeding roller 363.

This feeding roller 363 inserts the photosensitive film sent from the sizing sprocket 318, between upper and lower blades of the cutter 305. Further, this feeding roller 363 conveys the photosensitive film to a draw roller 319 disposed next to the cutter 305. This cutter 305 is also connected with the sizing control section 342. Concurrently when the cutter 305 cuts the photosensitive film to a predetermined size, it also punches an engaging hole to engage the photosensitive film with the spool 7. This cutter 305 may be driven either by a mechanical section or an individual motor.

The photosensitive film is inserted into the draw roller 319, and the draw roller 319 guides the photosensitive film to an insertion roller 320 through a guide rail 343. A plurality of nozzles 344 from which compressed air is jetted are disposed under the guide rail 343 in a photosensitive film conveyance direction. By the action of the compressed air jetted from these nozzles 344, the photosensitive film is conveyed under the condition that the photosensitive film is pressed against the lower surface 343a of the slippery guide rail 343.

The photosensitive film is guided by the guide rail 343 and conveyed to the insertion roller 320. Then, the photosensitive film is inserted between a pair of insertion guides 345. The insertion roller 320 includes an upper insertion roller 320a and a lower insertion roller 320b. In accordance with the conveyance condition of the photosensitive film, the lower insertion roller 320b is capable of being pressed against and withdrawn from the upper insertion roller 320a. In this connection, the insertion guide 345 includes an upper insertion guide 345a and a lower insertion guide 345b. In the same manner, the lower insertion guide 345b is capable of being positioned at an appropriate distance and withdrawn with respect to the upper insertion guide 345a.

The photosensitive film is conveyed while it is held by the insertion guide 345. Then the photosensitive film is conveyed to a spool turret 346 of the spool assembly section 304. In the first station (I), spools 7 aligned in a predetermined direction are continuously supplied to this spool turret 346 from a spool supplying chute 347. Two shutter sections 348a, 348b are provided at the fore end portion of this spool supplying chute 347. When these shutter sections 348a, 348b are alternately operated, the spools 7 can be supplied to the spool turret 346 one by one.

In the first station (I) of the spool turret 346, the supplied spool 7 is held by a spool chuck 349 that is operated being linked with the spool turret 346. Then the spool 7 is conveyed to the second station (II) when the spool turret 346 is rotated.

In this second station (II), the spool 7 is rotated being engaged with a servo motor 356. A protruding portion 358 formed on a winding shaft 357 of the spool 7 is engaged with a claw 350 for orientation, so that the rotation of the spool 7 is stopped. In this way, the direction of the slit is determined. After the direction of the slit has been controlled in the manner described above, the spool 7 is successively moved to the third station (III). In this third station (III), the fore end of the photosensitive film sent from the insertion guide 345 is inserted into the slit of the spool 7, and at the same time the engaging hole formed at the fore end of the photosensitive film is engaged with a hook provided in the slit. When the engagement of the fore end of the film is detected by a sensor 351, the lower insertion roller 320b and the lower insertion guide 345b start withdrawing.

On the other hand, the sizing sprocket 318, the feed roller 363 and the draw roller 319 are successively rotated until the length of the photosensitive film becomes a predetermined value. When the length of the photosensitive film is coincident with the predetermined value, the rotation is stopped, and the cutter 305 is driven to cut the photosensitive film. Therefore, the photosensitive film is bent between the draw roller 319 and the spool 7 into which the fore end of the film has been inserted. In this case, air is jetted downward against the film surface from the nozzles 352 disposed at the upper position of the guide rail 343, so that the film is forcibly bent downward. Due to the foregoing, the film is located at a position lower than the nozzles 344, and the film is greatly bent downward by its own weight. When nozzles 353 are provided in the lower portion of this guide rail 343 so that air can be jetted downward against the bent photosensitive film, the photosensitive films are prevented from coming into contact with each other.

When the rear end of the bent film is conveyed onto the guide rail 343 side by the rotation of the draw roller 319, the film becomes free under the condition that the fore end of the film is inserted into and engaged with the slit of the spool 7. Under this condition, the spool turret 346 is rotated, so that the spool 7 is conveyed to the fourth station (IV). At this time, air is jetted upward against the photosensitive film from nozzles 355 provided at the fore lower position of a conveyance loop chamber 354 so that the free photosensitive film is not contacted with the bottom portion of the conveyance loop chamber 354.

In the fourth station (IV), a spool chuck 349 is engaged with a winding servo motor 359 so as to wind the photosensitive film. This winding servo motor 359 is connected with a winding control section 360 to control the winding operation. When a control signal is inputted into the winding control section 360 from the high-rank control means 17, a control signal to drive or stop is sent to the servo motor 359 in accordance with the designated film length. This film winding operation is conducted so that the length of the tong of the rear end of the film can be made constant.

After the winding operation of the photosensitive film has been completed in the fourth station (IV), the spool 7 is conveyed to the fifth station (V), and the film winding condition and the film tong length are inspected. In the fifth station (V), the carrier 308 is provided connecting with the spool turret 346. Two receiving holders 361 are provided in this carrier 308. The spool 7 around which the film has been wound is held by this receiving holders 361. Then the spool 7 is conveyed to a cartridge turret 362 in the cartridge assembly section 306.

One-side calked cartridges 6 are continuously supplied to the cartridge turret 362 from the one-side calked cartridge processing device 220 through the one-side calked cartridge setting section 370. Also, the cartridge caps 11 are supplied from the cartridge cap supplying section 260, and this one-side calked cartridge processing device 220 and the cartridge cap supplying section 260 are controlled by the high-rank control means 317.

Next, with reference to FIGS. 56 to 57, the one-side calked cartridge setting section 370 will be explained in detail as follows.

The one-side calked cartridge setting section 370 is provided with a star wheel 371 for separation. This star wheel 371 for separation is rotated counterclockwise around a rotary shaft 372. Four receiving portions 371*a* in which the one-side calked cartridge 6 can be set are formed on the outer circumference of the star wheel 371 for separation at regular intervals. A supply chute 708 is disposed being opposed to the circumference of the star wheel 371 for separation. The one-side calked cartridge 6 conveyed by the supplying chute 708 always comes into contact with the circumference of the star wheel 371 by its own weight. Therefore, when the star wheel 371 for separation is rotated, the one-side calked cartridge 6 enters the receiving portion 371*a* by its own weight. Accordingly, the one-side calked cartridges 6 are separated and conveyed one by one by the star wheel 371. An alignment conveyance mechanism 373 is disposed in a lower position of the star wheel 371 for separation. The one-side calked cartridges 6 are aligned by this alignment conveyance mechanism 373 and conveyed to a preturret 374.

A holding cover 375 is disposed between the alignment conveyance mechanism and the supplying chute 708 along the outer circumference of the star wheel 371 for separation. This holding cover 375 is held by a holding spring 376 so that the one-side calked cartridge 6 inserted into the receiving portion 371*a* of the star wheel 371 for separation can be smoothly conveyed, thereby the cartridge 6 does not drop. The alignment conveyance mechanism 373 is provided with a conveyor 377. This conveyor 377 is provided between a support roller 378 and a drive roller 379, and when the drive roller 379 is driven by a motor 380 in the arrowed direction. This conveyor 377 is composed of a resin belt containing powder magnet. Alternatively, a permanent magnet 381 is provided on the reverse side of an inclined conveyance passage of the one-side calked cartridge. Therefore, the one-side calked cartridge 6 supplied onto the conveyor 377 is attracted by a magnetic force and conveyed diagonally upward. In the upper portion of the conveyor 377, there is provided a movable stopper 382, which is mounted on a rod 384 of a stopper drive cylinder 383.

In the case where the rod 384 of the stopper drive cylinder 383 is extended, the movable stopper 382 is located close to the conveyor 377. The one-side calked cartridge 6 supplied to the conveyor 377 under the aforementioned condition, is attracted by a magnetic force of the permanent magnet 381 and conveyed diagonally upward. Since the one-side calked cartridge 6 is provided with a lip portion 6*a*, the gravity center of the one-side calked cartridge 6 is shifted to the lip portion 6*a* side when the cartridge 6 is conveyed by the conveyor 377 diagonally upward. Accordingly, the one-side calked cartridge 6 is rotated on the conveyor 377 while the lip portion 6*a* is maintained backward, and when the lip portion 6*a* comes into contact with the stopper, the rotation of the cartridge 6 is stopped. Under this condition, the one-side calked cartridge 6 is conveyed. When the one-side calked cartridge 6 is contacted with a movable stopper 382, the one-side calked cartridge 6 is positioned.

Receiving holes 374*a*, in which the one-side calked cartridge 6 is accommodated, are formed at four portions on the periphery of the preturret 374 in equal intervals. The preturret 374 is fixed to a rotational body 387 which is rotatably supported by a supporting cylinder 386 supported by the frame 385. A gear 388 is provided to the rotational body 387, and intermittently rotated by a drive gear 389 which is meshed with the gear 388. A leading edge portion of a first activation rod 390 is positioned at a position corresponding to receiving holes 374a of the preturret 374, and a permanent magnet 391 is provided on the leading edge portion. The first activation rod 390 is slidably provided to a supporting cylinder 392 supported by the frame 385. The first activation rod 390 is connected with an arm 394 through a connecting rod 393, and the arm 394 is rotatably supported on the fulcrum of supporting pin 395. The arm 394 is urged to always contact with a drive cam 397 by a spring 396. The arm 394 is activated by the rotation of the drive cam 397, and thereby, the first activation rod 390 is reciprocated through the connecting rod 393.

The one-side calked cartridge 6 is positioned corresponding to the receiving hole 374*a* of the preturret 374. At the time, the first activation rod 390 is moved forward by the drive cam 397, and penetrates the receiving hole 374*a* of the preturret 374. Then, the permanent magnet 391 attracts the one-side calked cartridge 6 and retreats, and delivers the one-side calked cartridge 6 to the receiving hole 374*a*. An interlocking cylinder 398 is provided on the arm 394, and when the interlocking cylinder 398 is operated, the first activation rod 390 is withdrawn through the arm 394, so that the one-side calked cartridge 6 can not be delivered from a conveyor 377 to the preturret 374.

A second activation rod 399 is slidably inserted into the supporting cylinder 386 of the preturret 374, and a push rod 700 is provided to the leading edge of the second activation rod 399 through a plate 701. The second activation rod 399 is connected with an arm 703 through a connecting rod 702, and the arm 703 is rotatably supported by a supporting pin 704. The arm 704 is urged to always contact with a drive cam 706 by a spring 705. When the drive cam 706 is rotated, the arm 703 is activated, and thereby, the second activation rod 399 is reciprocated through the connecting rod 702.

When the one-side calked cartridge 6, which is located in the receiving hole 374*a* of the preturret 374, is positioned in the receiving hole 362 of the cartridge turret 362, the second activation rod 399 is withdrawn by the drive cam 706, and thereby, the push rod 700 is withdrawn. Thereby, the one-side calked cartridge 6 located in the receiving hole 374*a* of the preturret 374 is delivered into the receiving hole 362*a* of the cartridge turret 362.

When the second activation rod 399 is withdrawn, the push rod 700 is withdrawn, and the one-side calked cartridge 6 is delivered from the preturret 374 to the cartridge turret 362, the first activation rod 390 is moved forward and attracts the one-side calked cartridge 6 on the conveyor 377. Then, when the second activation rod 399 is moved forward, and the push rod 700 is moved forward and returns to the initial position, the first activation rod 390 is withdrawn, and delivers the one-side calked cartridge 6 on the conveyor 377 to the preturret 374, and returns to the initial position.

As described above, the first activation rod 390 is operated synchronously with the second activation rod 399, and the following operations are carried out: the one-side calked cartridge 6 on the conveyor 377 is delivered to the preturret 374; the one-side calked cartridge 6 is delivered from the preturret 374 to the cartridge turret 362 at the same time as the above described operation; and the one-side calked cartridges 6 are delivered to the cartridge turret 362 in aligned condition. A film assembling means, by which the photosensitive films processed by a film processing means are assembled into parts synchronously conveyed by the parts conveyance means, comprises the cartridge turret 362.

In this one-side calked cartridge setting section 370, a one-side calked cartridge detection sensor 707 is provided above the conveyor 377. The one-side calked cartridge is detected by the one-side calked cartridge detection sensor 707, and the detection signal is outputted to a high-ranking control means. It is discriminated in the high-ranking control means 317 according to the detection information of the one-side calked cartridge 6 whether the corresponding one-side calked cartridge 6 exists at a point of time when the photosensitive film is cut to a predetermined size. In this example, the existence of the cartridge is discriminated at the fifth cartridge in advance of the last cartridge. After that, the cartridge is synchronously conveyed by the preturret 371 and the cartridge turret 362.

As the one-side calked cartridge detection sensor 707, a reflection type photoelectric sensor, a transmission type photoelectric sensor, or a magnetic proximity sensor is used. A mounting position of the one-side calked cartridge detection sensor 707 is not specifically limited as long as it is mounted in front of the position in which the one-side calked cartridge is assembled.

As described above, in the high-ranking control means 317, existence of the corresponding one-side calked cartridge 6 is discriminated at a point of time when the photosensitive film is cut to a predetermined size, a cutter 305 is controlled through a sizing control section 342, and the photosensitive film is cut to a predetermined size only when the one-side calked cartridge 6 exists. The film processing means, by which existence of parts is detected and the photosensitive film is processed only when parts exist, is composed of the cutter 305.

In the high-ranking control means 317, the photosensitive film is stopped to be cut when the one-side calked film 6 does not exist, and at the same time, controls before the cutting operation are stopped. Then, the photosensitive film, which has been cut to a predetermined size, is engaged and wound, and after that, the spool 7 is provided in the detected one-side calked cartridge 6. Then, after capping, calking, and inspection are sequentially conducted, the product is obtained.

As described above, since the photosensitive film and the spool 7 are supplied after supply of the one-side calked cartridge 6 has been checked, a conveyance line is not necessary, by which the photosensitive film and the spool 7, which are carried while the one-side calked cartridge 6 does not exist, are returned to the initial position. Accordingly, the apparatus can be made simple, its size becomes small, and its cost is low. Further, since the one-side calked cartridge 6 is checked at first, supply of expensive film can be stopped when the one-side calked cartridge 6 does not exist, so that film loss can be reduced to the minimum.

Further, the film length to be handled can be reduced to the minimum under the condition that the photosensitive film is easy to come loose (the condition of a scroll), so that the apparatus can be stable in its quality and its operation. Further, since unstable operation can be reduced, the apparatus can have high performance.

Further, when the winding operation of the photosensitive film and the supply and assembling operation of the one-side calked cartridge 6 are combined, long distance tool conveyance under the unstable scroll conditions can be eliminated, so that maintenance can be easily carried out.

In this example, although the photosensitive film is cut to a predetermined size only when the one-side calked cartridge 6 exists, the photosensitive film may be cut to a predetermined size only when the spool 7 or the cartridge cap 11 exists, and further only when all of the one-side calked cartridge 6, the spool 7, and the cartridge cap 11 exist. Further, a point of time when the photosensitive film is processed is not limited to the time when the film is cut to a predetermined size, but it may be the time when the film is processed at a punch 301, or at a latent image print section 303.

Further, with respect to a defective film discriminated in advance (a splicing section defective film, a print defective film, a fogged film caused by the leak of light when a door is opened, or the like), when rotation of a star wheel for separation 371 is stopped, and the appropriately positioned one-side calked cartridge 6 is pulled into the preturret 374 and the first activation rod 390 is stopped by a defective film signal (a shift signal) outputted from the high-ranking control means 317, supply of the one-side calked cartridge 6 is temporarily stopped, so that loss of the one-side calked cartridge 6 does not occur when the expected defective film is delivered.

Here, the star wheel 371 is intermittently rotated by a Geneva drive mechanism or a roller gear. A one-point clutch, which is not shown in the drawings, is mounted in a rotational shaft 372, and when the intermittent movement is stopped, the clutch is disconnected, and the device is interlocked.

As described above, not only the photosensitive film but also the one-side calked cartridge 6 can reduce the occurrence of losses to the minimum.

Figure 59:
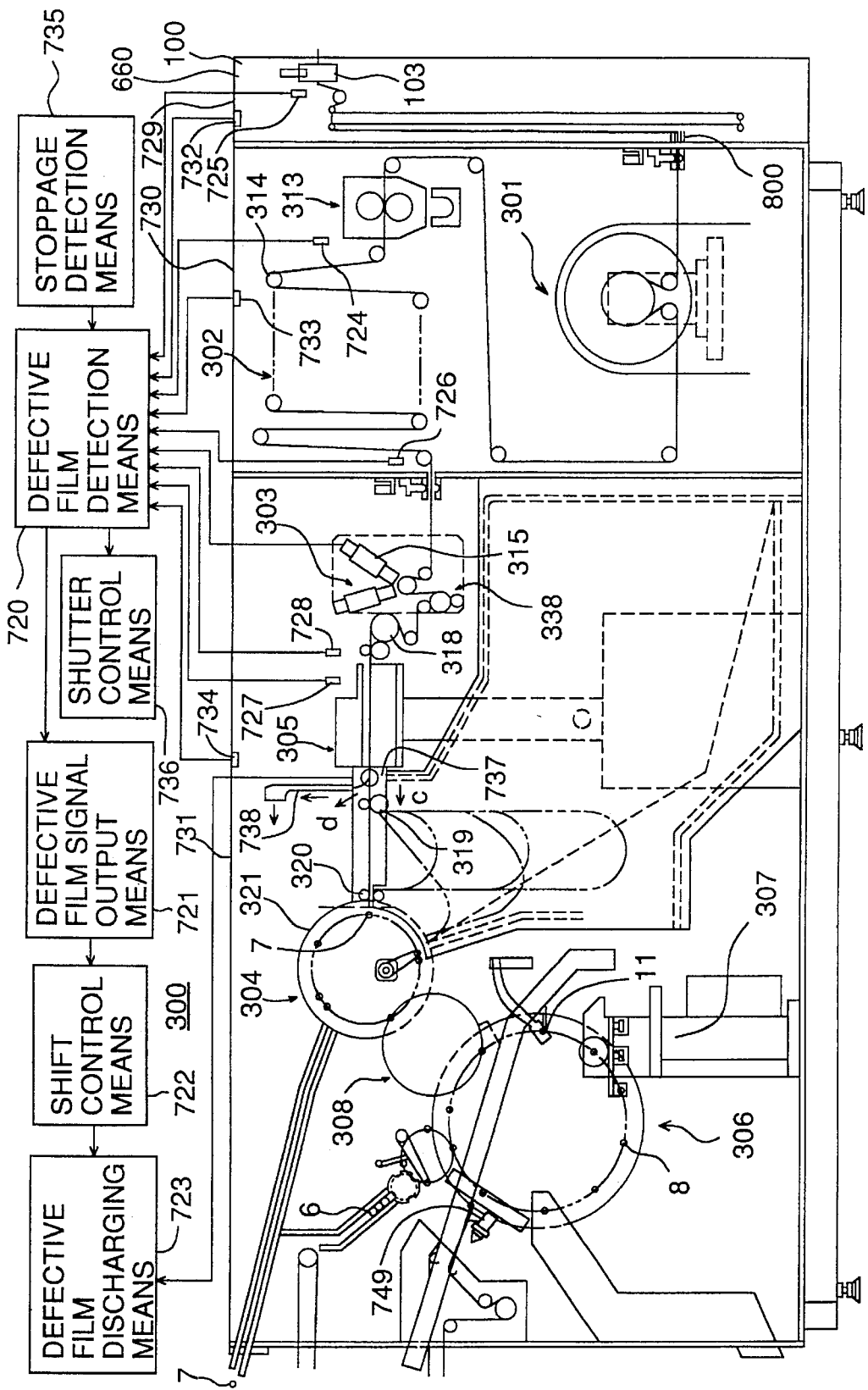
FIG. 59 is an arrangement view showing an outline of a defective film discharging section.
Figure 60:
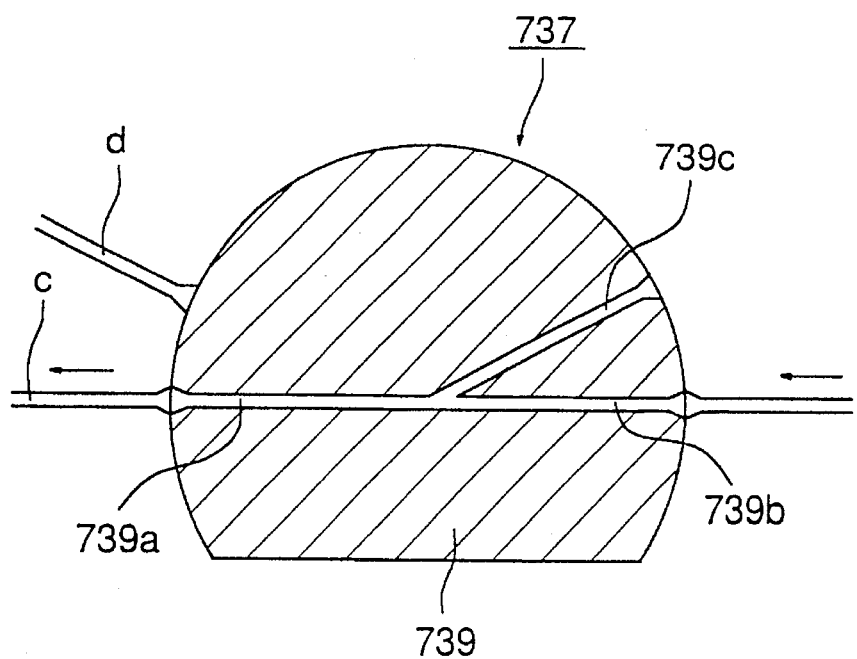
FIG. 60 is a view showing a normal operating condition of a changeover gate of a conveyance passage.
Figure 61:
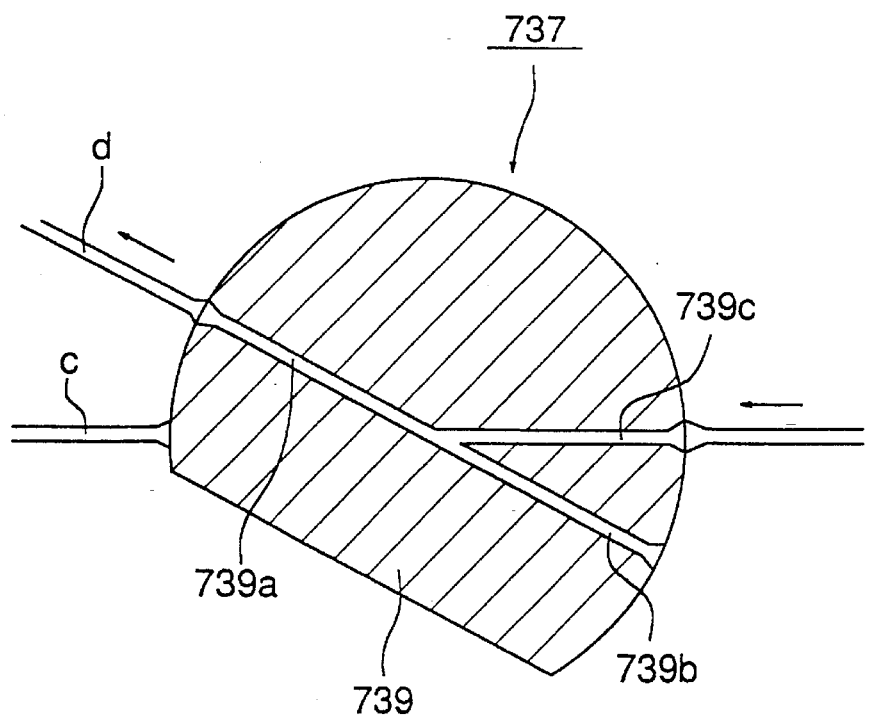
FIG. 61 is a view showing an operating condition of the changeover gate of the conveyance passage in the case of discharge.
Figure 66:
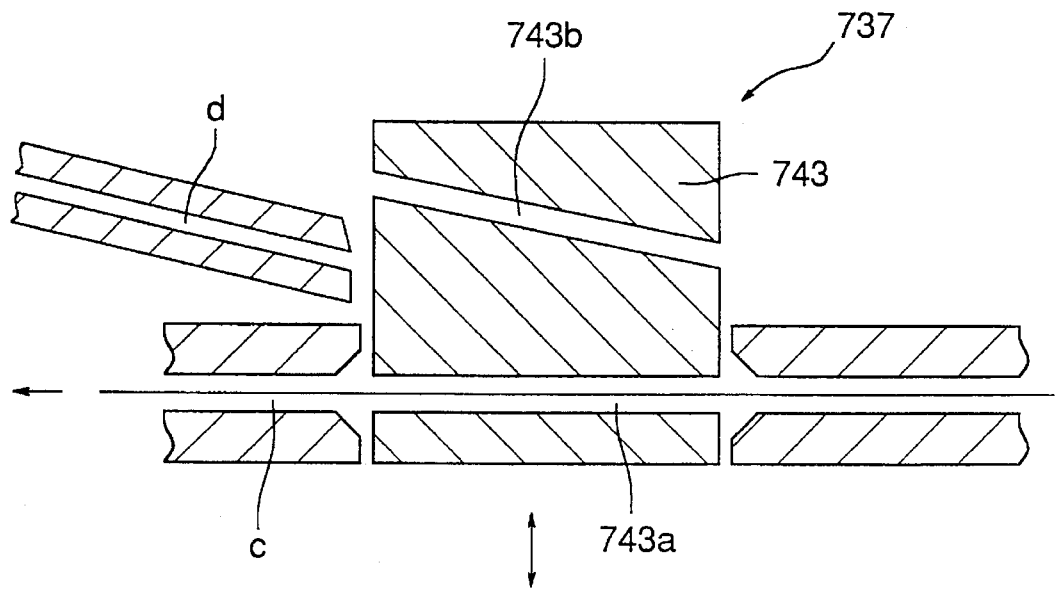
FIG. 66 is a view showing a changeover gate of a conveyance passage of another example.
Figure 67:
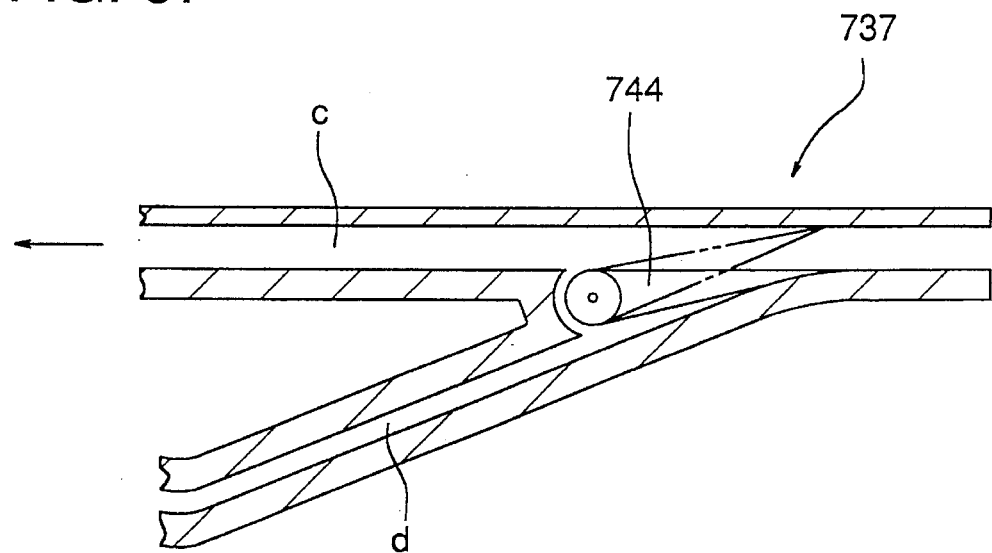
FIG. 67 is a view showing a changeover gate of a conveyance passage of another example.
Figure 68:
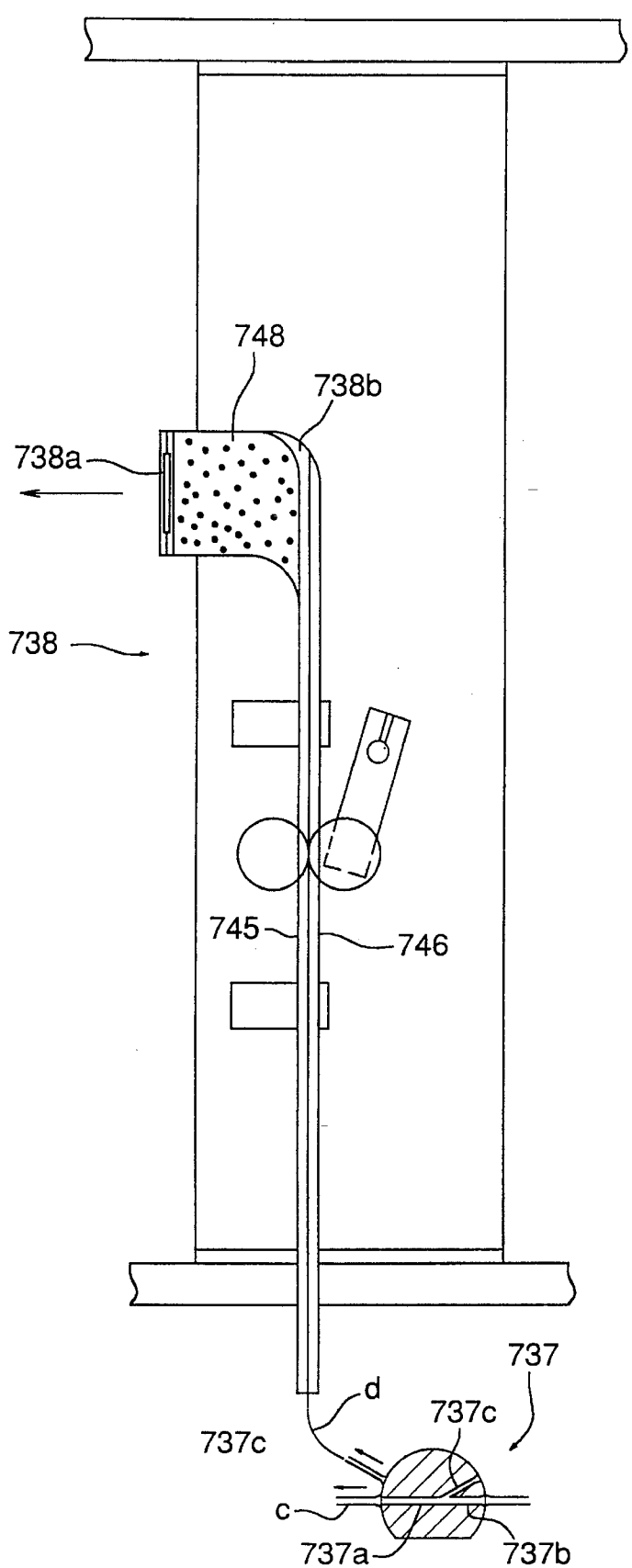
FIG. 68 is a side view of a discharging chute; s
Figure 69:
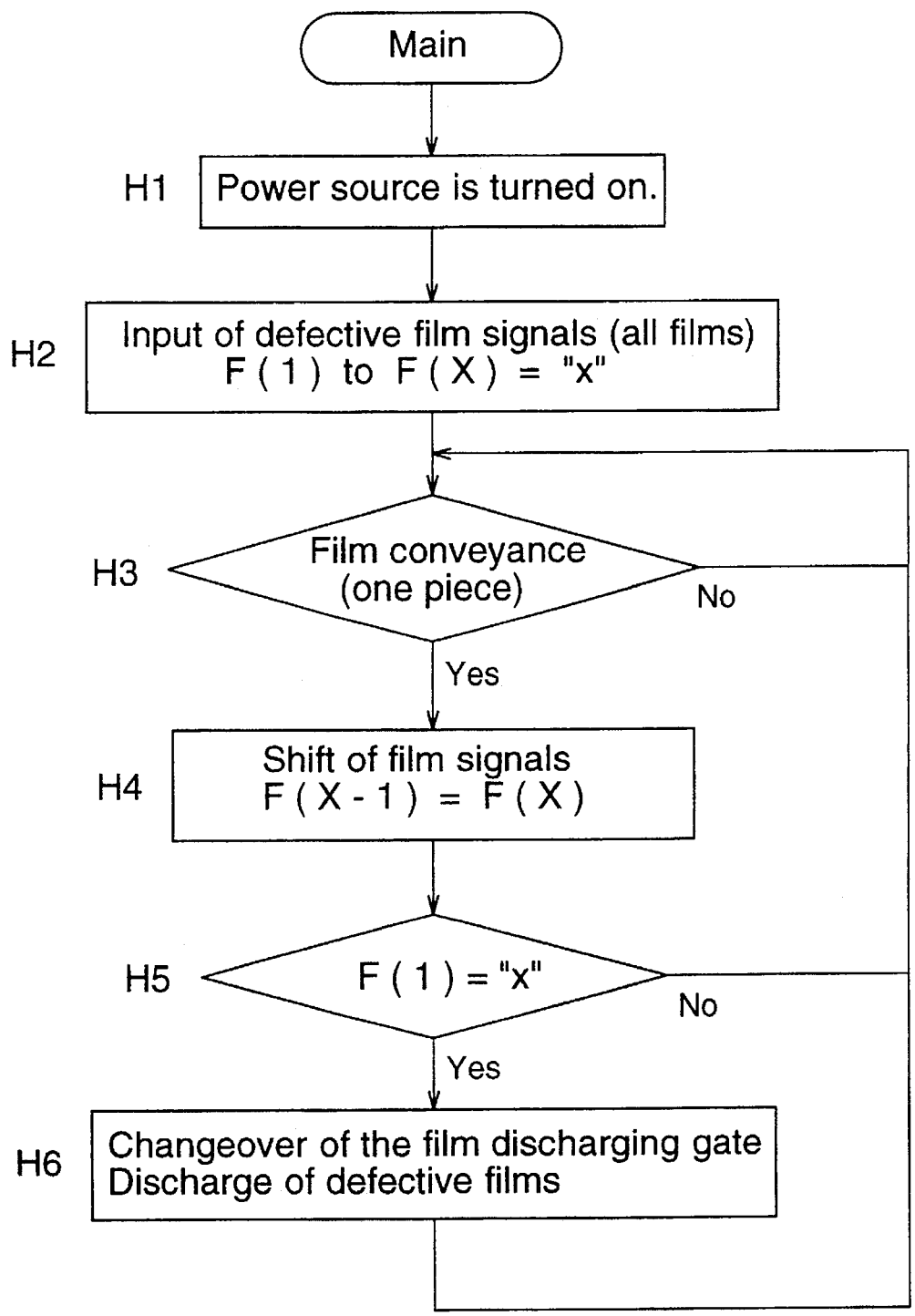
FIG. 69 is a flow chart showing a film discharging operation.
Figure 70:
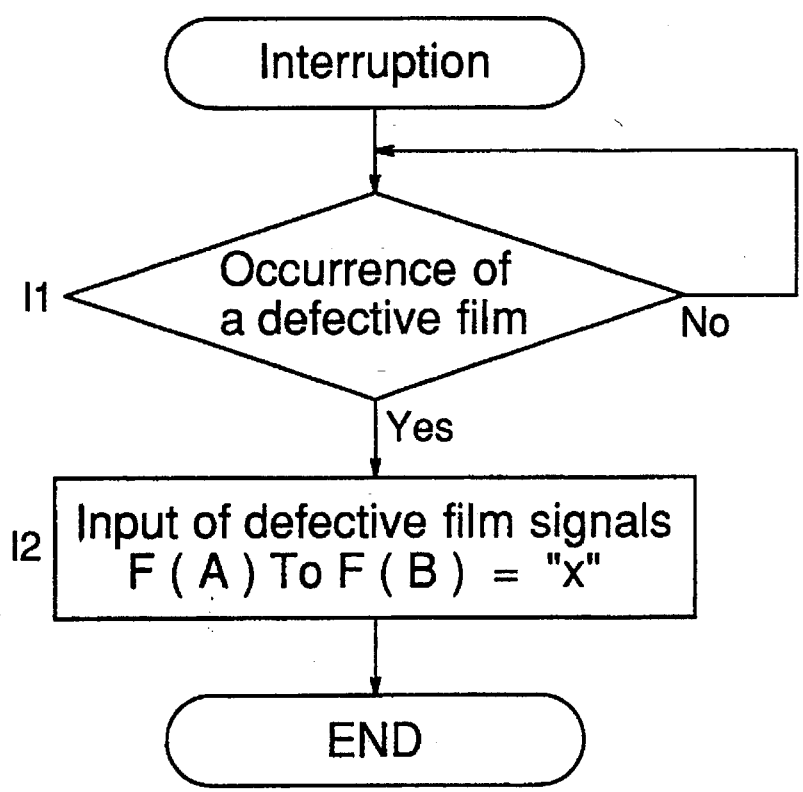
FIG. 70 is a flow chart showing an interrupting operation of film discharge.

Next, referring to FIG. 59 through FIG. 70, a defective film discharging device, by which a defective film is discharged on the occurrence of defects, will be described as follows. FIG. 59 is a view showing the general structure of the defective film discharging device, and FIG. 60 is a view showing the operational condition in which a switching gate of the conveyance path is normally operated. FIG. 61 is a view showing the operational condition in which the switching gate of the conveyance path discharges the defective films. FIG. 62 to FIG. 67 are views showing other examples of the switching gate of the conveyance path. FIG. 68 is a side view of a discharging chute. FIG. 69 and FIG. 70 are film discharge flow charts.

The defective film discharge device has the following means: a defective film detection means 720 by which the defective photosensitive film is detected in a film cassette 8 producing process; a defective film signal output means 721 by which a defective film signal is outputted with respect to the defective photosensitive film which is discharged according to a defective detection signal outputted from the defective film detection means 720; a shift control means 722 by which the defective film signal is shifted synchronously with the movement of the defective photosensitive film; and a defective film discharging means 723 by which the conveyance path of the photosensitive film is switched according to the shifted defective film signal, and the defective photosensitive film is discharged outside of the device.

The defective film, which is detected by the defective film detection means 720, is generated in the case where defects are generated in the photosensitive film itself, or in the case where the leak of light is generated in a room of the device when a door is opened, or in the case where the device is stopped for a long period of time.

In the foregoing, when defects are generated in the photosensitive film itself, the defects of the photosensitive film are detected by a sensor 724. When the film is spliced, a punching hole is opened in the spliced portion by a splicer 103, and the hole is detected by a sensor 725. Further, in the defective photosensitive film, a notch is opened in an end of the film at the time of cutting according to the defect information of a master roll, and the notch is detected by a sensor 726. A latent image print section 303 is used, in which a latent image pattern such as a frame number is exposed on the photosensitive film by light passing through an optical fiber, and is printed in a dot-shape, and an abnormal signal is outputted from the latent image print section 303 when printing fails. Further, an abnormal signal is outputted from a driver, which is not shown in the drawings, of a servo motor for winding. A sensor 727 observes a film cutting position according to the position of a perforation, and detects the case where the cutting position is not appropriate. Further, a sensor 728 observes a conveyance position of the photosensitive film, and detects the case where the film is floated higher than a predetermined distance from a sizing sprocket 318.

Although a transmission type photoelectric sensor is used for sensors 725 to 728, other types of sensors can be used.

Other defects of the photosensitive film are caused when a door is opened. The device is divided into three blocks, and a door is provided to each block. Sensors 732, 733 and 734, by which a locked condition is detected, are provided respectively to a connection door 729 of the splicer 103, a right door 730 of the winder, and a left door 731 of the winder.

A stoppage detection means 735, by which stopping time of a film processing assembly section 300 is observed, is provided for a long stopping time.

In sensors 732 to 734 which detect opening of the door, a proximity switch, by which a fixed portion of the door is observed, is actuated when, for example, a knob of the door is turned, and fixed portions such as claws provided to upper and lower portions of the door are disconnected, and opening of the door is judged. At this time, the door is not opened yet. A shutter is closed by the control of a shutter control means 736 according to the detection signal, and the door can be opened after the shutter has been closed. Accordingly, since a bright room portion, which is obtained when the door, dividing the block to be opened from other blocks, is opened, is divided from a dark room portion, the space of the bright room portion in which a film is exposed is limited to the minimum.

Further, when the film processing assembly section 300 is stopped for a long period of time, the film is detected as a defective photosensitive film, and discharged. When a main power switch is turned ON, it is judged that the section 300 is stopped for a long period of time. When the section is stopped for a long period of time, the photosensitive film is accustomed to be curled always, and it interferes with the discharging operation. Accordingly, the photosensitive film close to the right door 730 of the winder in the splicing chamber is discharged. Further, when the film processing assembly section 300 is stopped for a longer period of time than a predetermined time and is started again, since the photosensitive film is accustomed to be curled, the photosensitive film close to the left door 731 of the winder is discharged.

Next, the defective film signal output means 721 controls, for example, the continuous photosensitive film before cutting by the length corresponding to one photosensitive film. When each sensor detects defects, a portion of the software corresponding to the photosensitive film to be discharged (XX–X0-th) is marked by a symbol of the defective film.

The defective film detection means 721 has, for example, one frame with respect to one film, and when defects are detected in the position corresponding to X-th film, X-th frame is marked by a symbol of the defective film also with respect to the continuous photosensitive film before cutting.

Of course, the foregoing differs with the length corresponding to a film size.

For example, in the frames of the film which are set in the software, a symbol of the defective film is marked in the frame of the exposed portion (for example, XX-th–X0-th).

The foregoing setting is changed depending on a film size and a position of a dancer roller of each accumulating section, and an amount of discharge is reduced to be as small as possible as long as the under action is not caused.

For example, when the right door of the winder is opened, the following table is obtained.

TABLE 1

| Film size | position of the dancer roller | defective film |
| --- | --- | --- |
| 12 EX | middle | 5-th - 30-th |
|  | lower | 5-th - 50-th |
| 24 EX | middle | 3-th - 20-th |
|  | lower | 3-th - 40-th |

That is, the larger the film size is, the longer the film length is. Therefore, the number of films is reduced. Further, the higher the position of the dancer roll is, the smaller the amount of film is. Therefore, the number of films is reduced.

In an accumulation method or an air loop method in which a dancer roller is not used, an amount of film may be directly judged by a photoelectric sensor or the like, and a discharging amount of the film may be controlled.

The defective film signal is shifted by one synchronously with one photosensitive film which is intermittently moved. In the shift control means 722, a mark of the defective film is shifted in the software accompanied by the movement of the photosensitive film. For example, when one photosensitive film is conveyed, a signal in the software is shifted in advance by one. At this time, the mark of the defective film is shifted from X-th to (X–1)-th.

The defective film discharging means 723 controls a switching gate 737 which is located just after a position in which the photosensitive film is cut to a predetermined length, and when the defective film is moved to a position just before the discharge chute, a film path is switched from a conveyance path 'c' of the photosensitive film to a discharging path 'd' by the shifted defective film signal. Then, the defective photosensitive film is discharged from the discharging chute 738 to the outside of the device. The discharging chute 738 has the light shading function so that the defective photosensitive film is discharged from the dark room to the bright room.

Although, in some cases, the discharge from the switching gate 737 is not in time depending on the type and the occurrence of a defect, in this case, the defective film mark is shifted to a later process, and the defective film is positively discharged from another discharging hole 749. In this case, material supply operations are interlocked so that material is saved as much as possible. The method of interlocking is as follows: for example, a cam is disconnected by an air cylinder, which is not shown in the drawings, or the air cylinder is not actuated.

The switching gate 737 is formed of a cylindrical block 739, in which branch passages 739a, 739b, and 739c are formed, as shown in FIG. 60 and FIG. 61. When the block 739 is rotated, a passage, by which the photosensitive film is conveyed is changed, and one of passages is a normal assembling passage 'a' and the other is a discharging passage 'b'.

Figure 62:
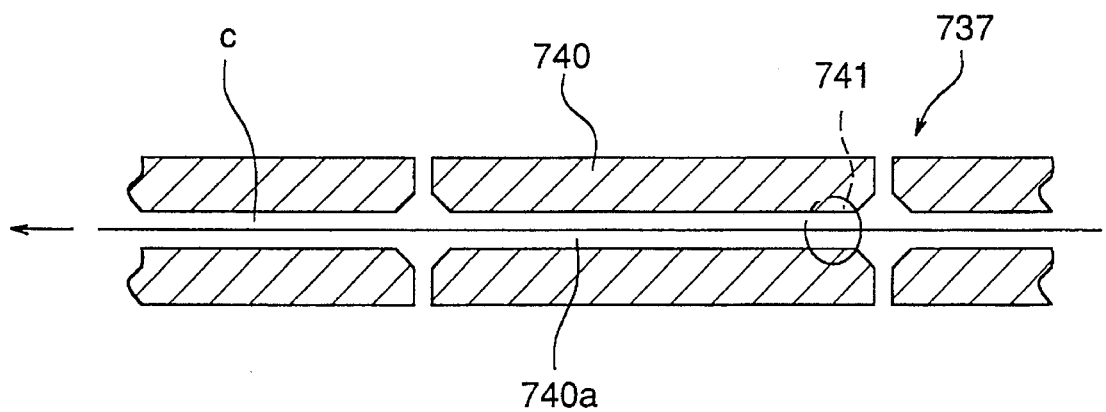
FIG. 62 is a view showing a changeover gate of a conveyance passage of another example.
Figure 63:
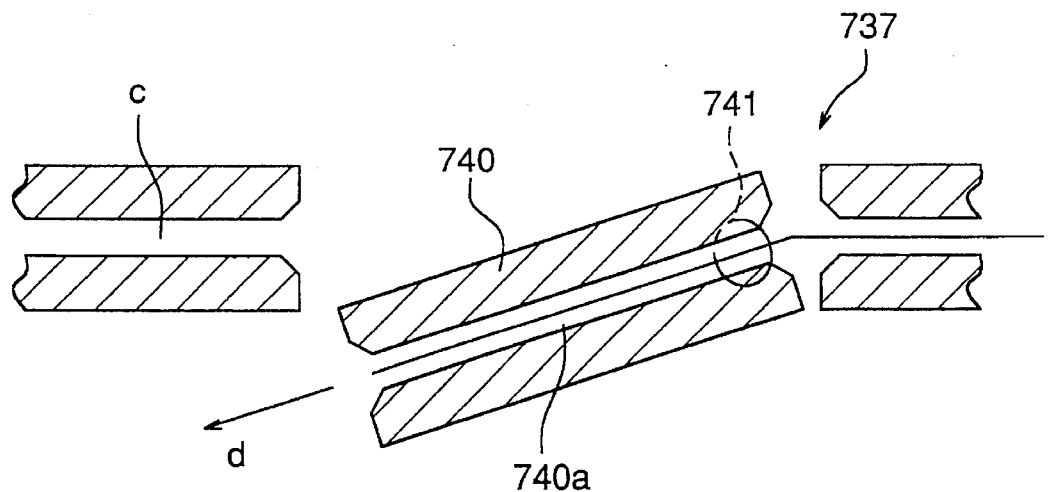
FIG. 63 is a view showing an operating condition of the changeover gate of the conveyance passage shown in FIG. 62.
Figure 64:
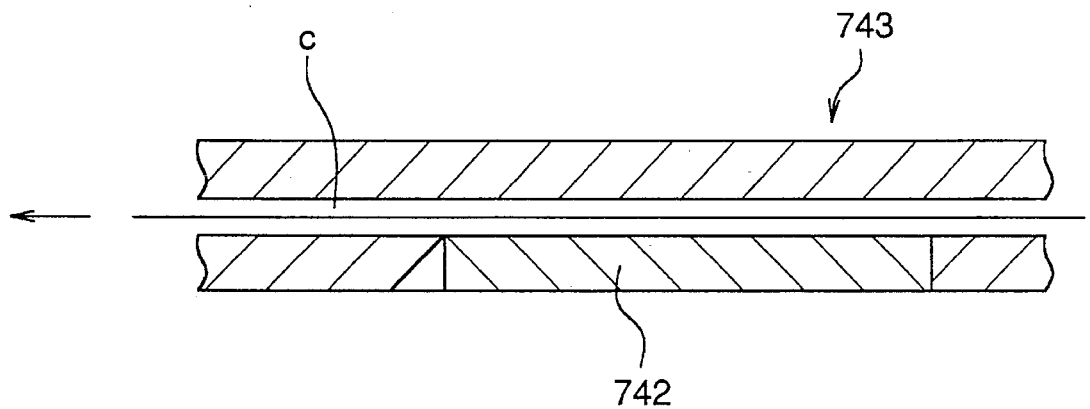
FIG. 64 is a view showing a changeover gate of a conveyance passage of another example.
Figure 65:
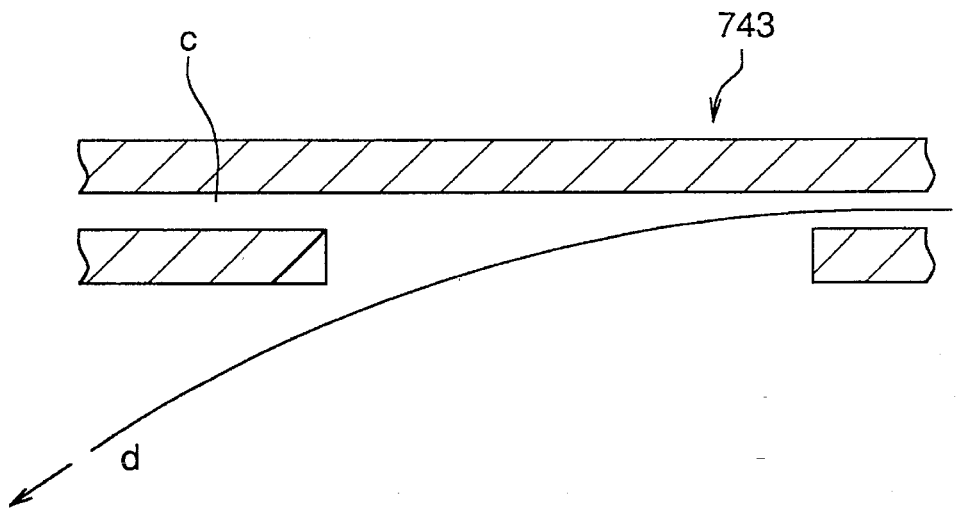
FIG. 65 is a view showing an operating condition of the changeover gate of the conveyance passage shown in FIG. 64.

Further, in FIG. 62 and FIG. 63, the switching gate 737 is formed of a plate-shaped block 740 having a passage 740a, and the block 740 is rotated around a supporting shaft 741, so that the passage is switched. Further, in FIG. 64 and FIG. 65, the switching gate 737 is formed of a plate-shaped block 742, and when the block 742 is slid so as to be withdrawn, the passage is switched. Further, in FIG. 66, the switching gate 737 is formed of a block 743 having two passages 743a and 743b, and when the block 743 is slid, the passage is switched so that a passage 743a of the block 743 is communicated with a passage 'c' and a passage 743b of the block 743 is communicated with a passage 'd'. In FIG. 67, the switching gate 737 is formed of a switching claw 744, which is provided at a branch portion of the passage 'c' and the passage 'd', and the passages 'c' and 'd' are switched with each other when the claw 744 is actuated.

Further, the discharging chute 738 is formed by connecting plates 745 and 746, the end portions of which are bent by an angle of 90°, as shown in FIG. 68, and a shading means is provided so that light does not leak into the dark room side which is used for production because a film discharging hole 738a is a bright room.

As the shading means, at first, a black chute 748, for example painted or colored, is used so that reflected light is not sent from the film discharging hole 738a to a bent portion 738b. In this example, a black-colored resin chute is used, and light from the outside is absorbed on the way.

Secondly, in the shading structure, the discharging chute 738 is shielded so that light is not leaked. A chute entrance 738c is small and its length is so long that an amount of light which enters from the chute entrance 738c is small, and the light is gradually absorbed and does not enter into the innermost portion. Further, gaps are light-tightly shielded by a black caulking agent.

Thirdly, in the shading structure, since the discharging chute 738 is bent halfway by an angle of 90° and its leading edge is curved, light can not enter into the innermost portion, and is absorbed on the way.

In practice, the discharging chute 738 is composed of a combination of two black parts, which are fitted to each other, so that light is not leaked outside. Further, the chute 738 is bent halfway by an angle of 90°, and further its leading edge is curved.

Next, the film conveyance chute and the discharging chute will be described in more detail as follows. In the film conveyance chute, it is preferable that the width of the chute is +0.1 to 2.0 mm with respect to the width of film, and more preferably that it is +0.1 to 0.3 mm with respect to the width of film. This is because accuracy at the time of engagement and cutting is required for the film conveyance chute. Further, it is preferable that the thickness of the conveyance chute is +0.1 to 2.0 mm with respect to the thickness of film, and more preferably that it is approximately +1 mm with respect to the thickness of film. This is because the film conveyance chute is flapped during conveyance in the case of large thickness, so that the film surface is damaged, or in the case of lesser thickness, the film surface is rubbed.

In the discharging chute, since the film to be discharged is not a product of good quality, film damage is not a problem, and therefore, conveyance properties are important. Accordingly, it is preferable that the width of the discharging chute is +0.1 to 10 mm with respect to the width of film, and more preferably that it is approximately +5 mm with respect to the width of film.

Next, referring to flow charts in FIG. 69 and FIG. 70, the film discharging operation will be described as follows. At first, in a main flow chart, when a power supply is switched on in step H1, a defective film signal is inputted in step H2, and one film is conveyed in step H3. Then, a film signal is shifted in step H4, and existence of the defective film signal is judged in step H5. When the defective film signal is inputted, the film discharging gate is switched in step H6, and the defective film is discharged.

When the defective film is generated in step I1 of an interrupt flow chart while a main flow is in operation, the defective film signal is inputted in step I2. In the main flow, existence of the defective film signal is judged in step H5 by the interrupt flow, and when the defective film signal is inputted, the film discharging gate is switched in step H6 and the defective film is discharged.

As described above, defective films corresponding to defective film detection, door opening, breakdown and long stoppage are automatically discharged. Accordingly, defective films due to human errors are not mixed. Therefore, discharge of defective films due to breakdown and long stoppage, which has been conventionally difficult, can be automatically conducted. Further, since quality of the photosensitive film becomes stable, it can contribute to stability of product quality and a stable operation of the apparatus. Further, since operations of operators are decreased, manpower saving is possible.

Figure 71:
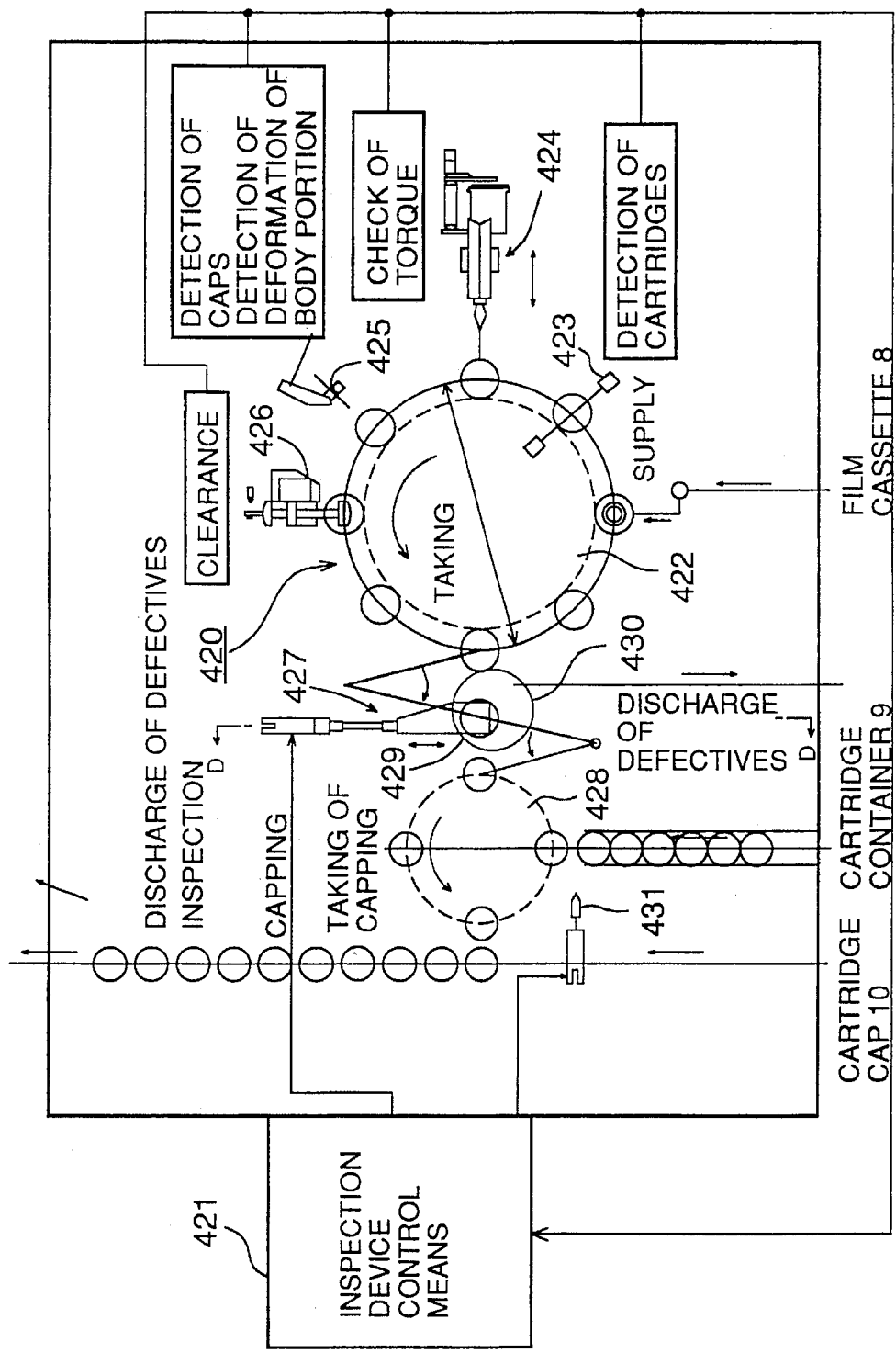
FIG. 71 is a plan view showing an inspection device.
Figure 72:
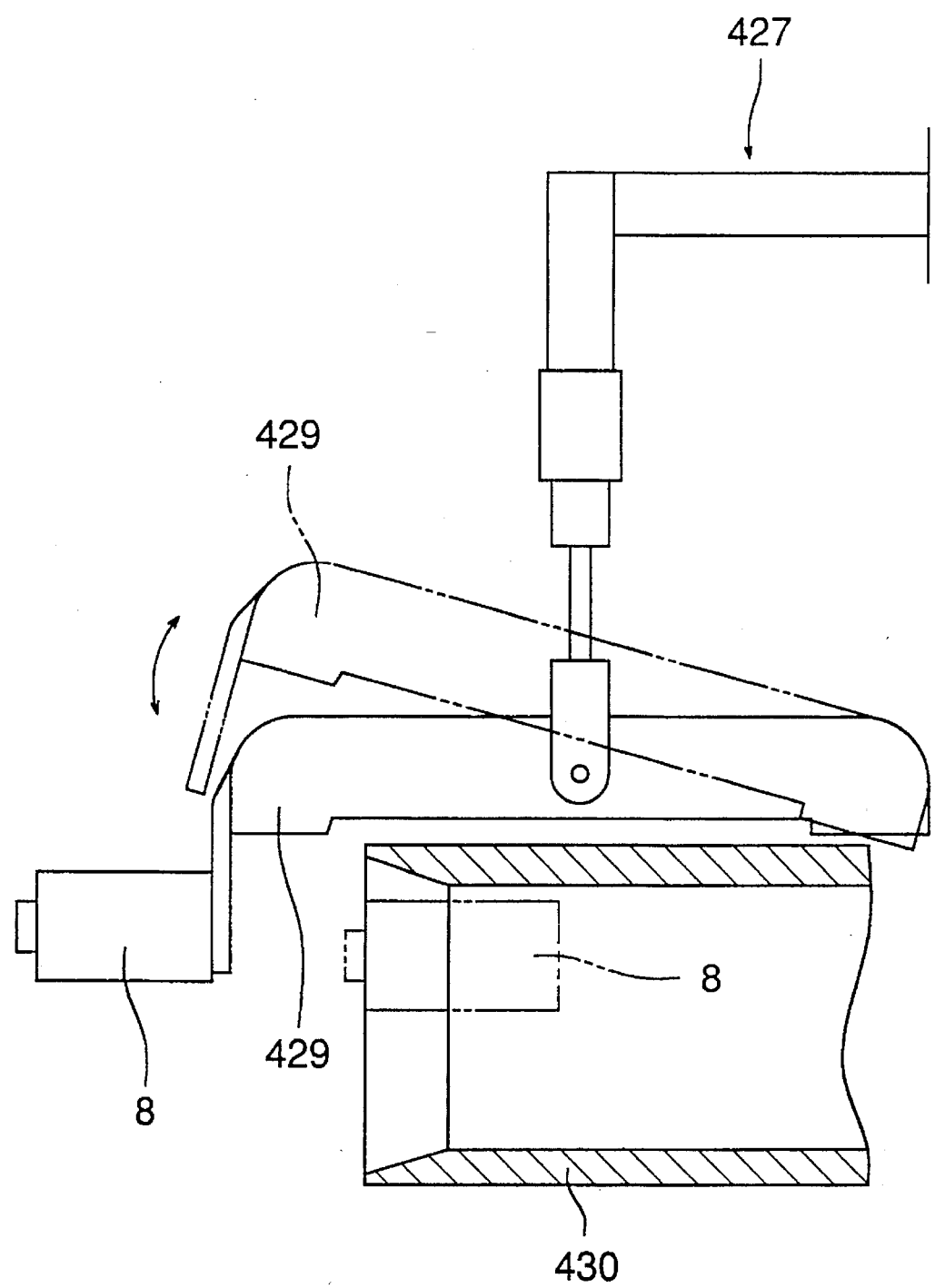
FIG. 72 is a sectional view taken on line D—D in FIG. 71.

Next, an inspection device 420 will be described in detail according to FIG. 71 and FIG. 72. FIG. 71 is a plan view of the inspection device, and FIG. 72 is a sectional view taken on line D—D in FIG. 71. The inspection device 420 is provided with an inspection device control means 421. In the inspection device 420, after the film cassette 8 sent from the film processing assembly section 300 is moved to an inspection turret 422, existence of the cartridge, pulling torque, tongue length, cap damage, cartridge deformation, and a clearance between the cap and the spool are checked, and then, the detection signal is inputted into the inspection device control means 421.

The inspection device 420 has the structure by which the film cassette 8 is conveyed and continuously inspected while it is being held, and for example, a continuous inspection device disclosed in Japanese Patent Publication Open to Public Inspection No. 36664/1987, and a continuous inspection device disclosed in Japanese Patent Publication Open to Public Inspection No. 39708/1987, can be used for the inspection device 420.

In the detection of cartridge existence, it is detected by a cartridge detection sensor 423 whether the film cassette 8 is chucked. For the cartridge detection sensor 423, a non-contact sensor such as a reflection type photoelectric sensor, a transmission type photoelectric sensor, or a magnetic proximity sensor is used. For a negative film, a photoelectric sensor is preferable.

The film cassette 8 is detected by the cartridge detection sensor 423, and a subsequent inspection is carried out.

In a check of the pulling torque, a portion of the photosensitive film pulled out of the film cassette 8 is clamped, and a pulling load is measured. For a check of the pulling torque and tongue length, for example, a film pulling load detection device disclosed in Japanese Utility Model Publication Open to Public Inspection No. 71737/1983 and a film pulling resistance measuring device disclosed in Japanese Patent Publication Open to Public Inspection No. 40451/1987 can be used.

In the check of the tongue length, the photoelectric sensor detects whether the length of the film pulled out by a film drawing section 424, after the pulling torque has been measured, is a predetermined value. For the check of the tongue length, for example, a film leader portion length detection device disclosed in Japanese Utility Model Publication Open to Public Inspection No. 71739/1983 can be used.

In the check of the cap damage, the film cassette 8 is rotated by one turn, and the cap damage is detected by an optical displacement sensor 425. In the check of the cartridge deformation, the film cassette 8 is rotated by one turn, light is sent to the film cassette 8, the reflected light is received by a photocoupler, and the cartridge deformation is detected by the voltage of the photocoupler. As another checking method for cartridge deformation, for example, a cartridge peripheral surface detection device disclosed in Japanese Patent Publication Open to Public Inspection No. 39710/1987 can be used, to detect deformation on the peripheral surface of the cartridge by an eddy current displacement gage.

In the check of clearance between the cap and the spool, an amount of play in the direction of a spool shaft in the cartridge is detected by voltage of a differential transformer in a clearance measurement device 426. For the check of the clearance between the cap and the spool, for example, a cartridge clearance measurement device disclosed in Japanese Patent Publication Open to Public Inspection No. 40452/1987 is used.

The film cassette 8 having been checked by the inspection turret 422 is delivered from the inspection turret 422 to a rotary turret 428 by an absorption mechanism 427. The absorption mechanism 427 is controlled by the inspection device control means 421, and when the defective product is moved according to inspection information, an absorption mount 429 of the absorption mechanism 427 is moved in the arrowed direction and the defective product is dropped. Then, the defective film cassette 8 is discharged from a defective discharging chute 430 to the outside of the apparatus.

The cartridge container 9 is supplied to the rotary turret 428, and the film cassette 8 is housed into the cartridge container 9. In the rotary turret 428, a container stopper 431 is operated synchronously with the defective film cassette 8 discharged to the outside of the apparatus, and the supply of the cartridge container 9 is stopped, so that the cartridge container 9 is not wasted. The cartridge container 9, in which a good film cassette 8 is housed, is capped by the cartridge cap. Then, the capped condition is inspected, the good product is discharged and collected in a container for the next process, and the defective product is collected in another box.

Next, control in the inspection device control means 421 will be described in detail as follows. At first, the shift conditions of the good product and that of the defective product are shown in Table 2.

TABLE 2

| Inspection station | Cartridge existence Origin 1 | Torque check Origin 2 | Body deformation Origin 3 | Clearance Origin 4 | Origin 5 | Take-out Origin 6 |
|---|---|---|---|---|---|---|
| Good product-shift | M110 | M111 | M112 | M113 | M114 | M115 |
| Defective product-shift | M133 | M134 | M135 | M136 | M137 | M138 |

The case of the good product will be described as follows. When the film cassette 8 is detected at the cartridge detection station, a good product-shift M110 is turned on. When an angle detection means judges that the inspection turret 422 is moved by one cycle, information of M110 is shifted to M111. When M111 is ON, it is judged that the product has been moved to the next station, and the torque is inspected. At the time when the foregoing operations are repeated and finally, information is moved to M115 corresponding to the take-out station, if a defect-flag is OFF, the product is judged to be good.

The case of defective products will be described as follows. When a product is judged to be defective in the torque detection station, the defective flag is ON in the defective product-shift. The information is moved at every cycle, and when the information is moved to the take-out station, the product is judged to be defective because information in M134 is moved to M138.

Figure 73:
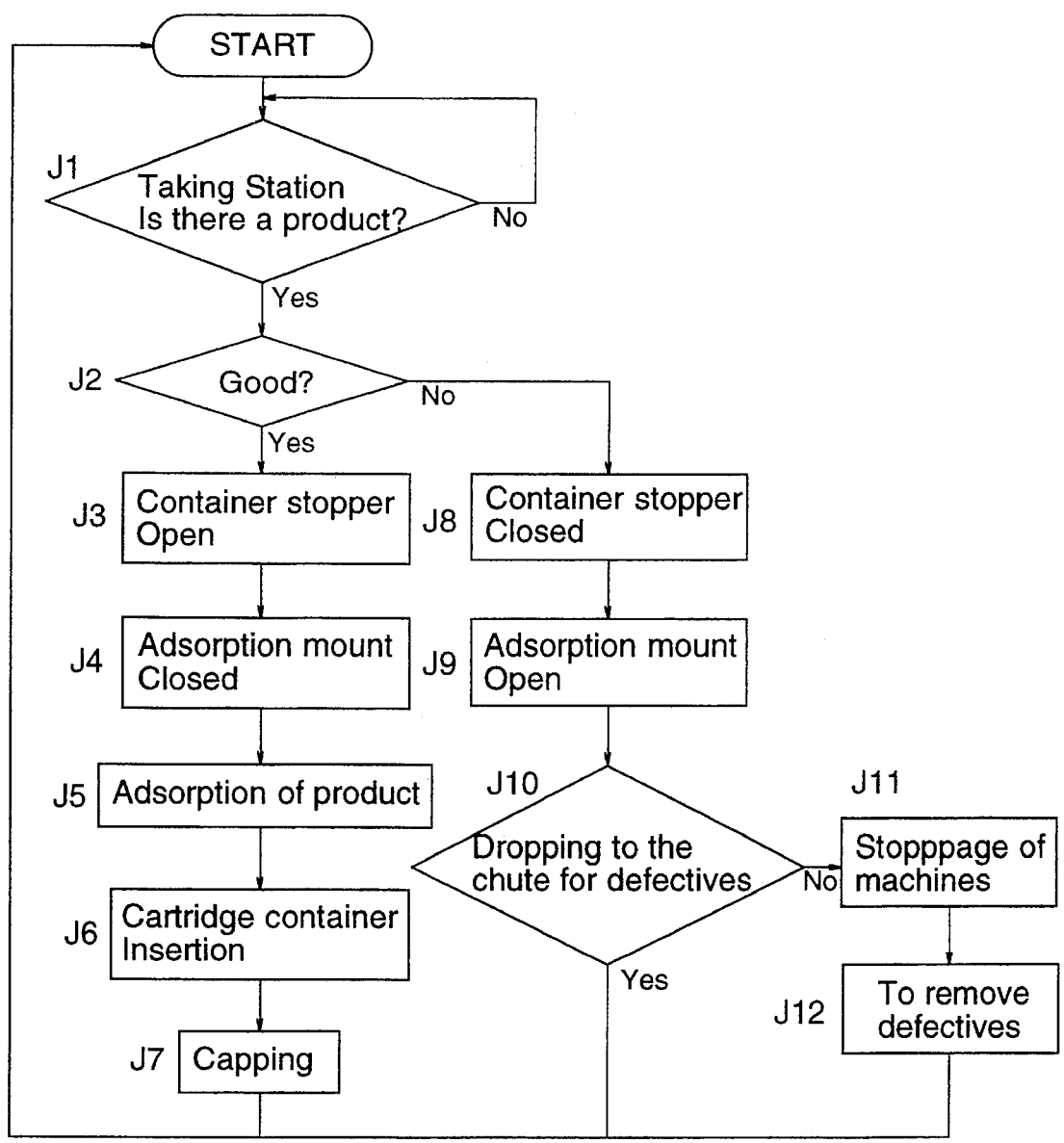
FIG. 73 is a flow chart showing a defective product discharging operation.

Next, a discharge flow chart of a defective product discharge process is shown in FIG. 73. In step J1, it is judged whether a product exists when the sequence comes to the take-out station, and when the product exists, it is judged in step J2 whether the product is good. When the product is good, a container stopper 431 is opened in step J3. Then, an absorption mount 429 of an absorption mechanism 427 is closed in step J4, the product is absorbed in step J5, the product is inserted into the cartridge container 9 in step J6, and capping is carried out in step J7.

When the product is judged to be defective in step J2, the sequence is shifted to step J8, a container stopper 431 is closed, the absorption mount 429 of the absorption mechanism 427 is opened in step J9, and the product is dropped into a defective product chute in step J10. When the defective product is not dropped in step J10, the machine is stopped in step J11, and the defective product is removed in step J12.

Next, the connection of the film processing assembly section 300 with the film splicing section 100, the one-side calked cartridge processing device 220, the spool supplying device 240, the cartridge cap supplying section 260, and the inspection device 420 will be described as follows.

The connection of the film processing assembly section 300 with the film splicing section 100 is shown in FIG. 54. A light shielding tunnel 800 is connected with the film processing assembly section 300 and the film splicing section 100, and the photosensitive film is passed through the light shielding tunnel 800. Although the light shielding tunnel 800 is integrally formed with light shielding material, it may be formed with translucent material, and the material is covered with a light shielding cover, or a light shielding agent is coated on the material.

Figure 74:
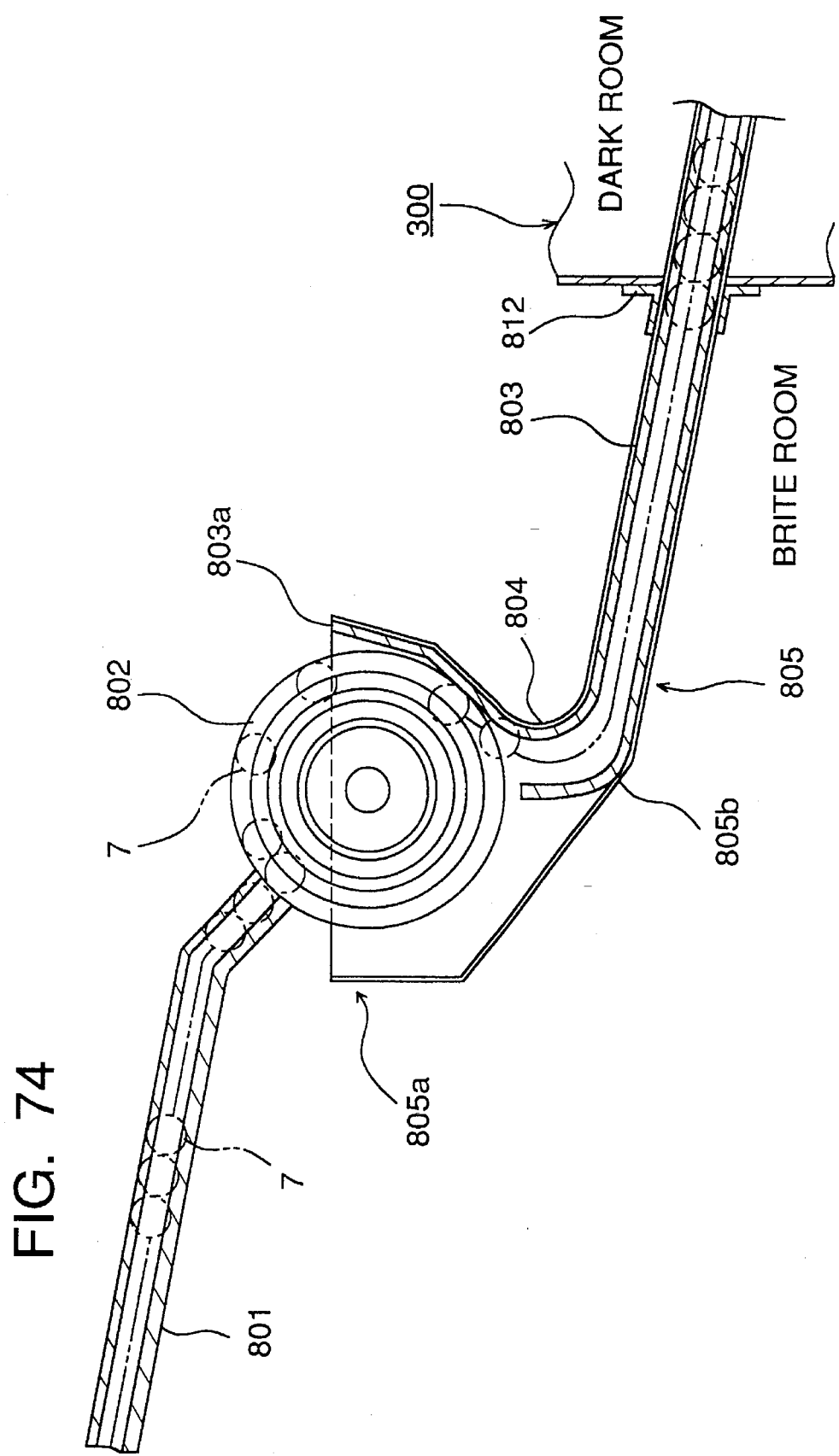
FIG. 74 is a side view showing a state of connection of the film processing assembly section and the spool supply section.
Figure 75:
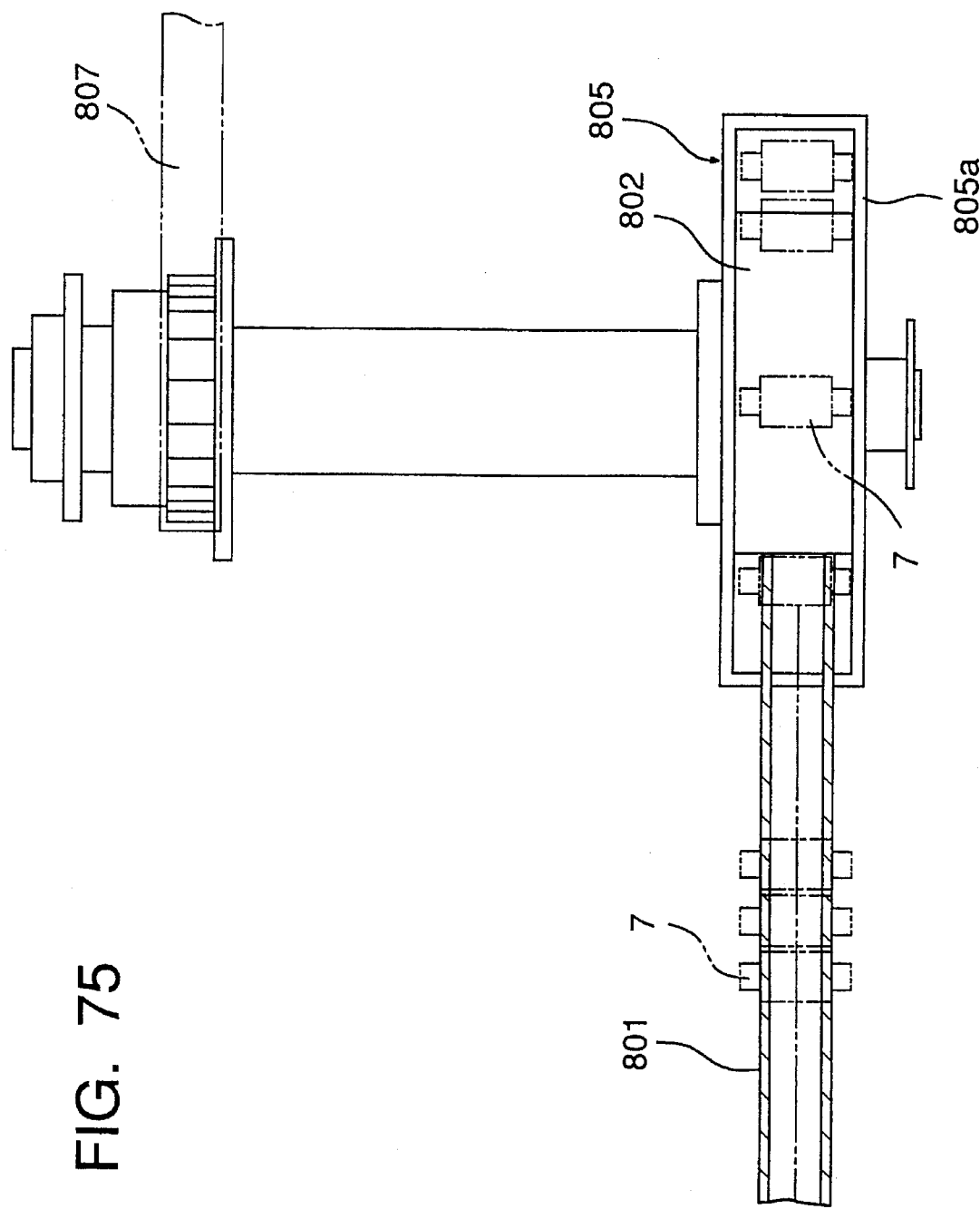
FIG. 75 is a plan view showing a state of connection of the film processing assembly section and the spool supply section.

Next, the connection of the film processing assembly section 300 with the spool supplying device 240 is shown in FIG. 54, FIG. 74, and FIG. 75. FIG. 74 is a side view showing the connection of the film processing assembly section with the spool supplying device, and FIG. 75 is a plan view showing the connection of the film processing assembly section with the spool supplying device.

A conveyance guide 801 is connected with a concentrated accommodation section 242 of the spool supplying device 240. The spool 7 is conveyed being laterally aligned by the conveyance guide 801, and successively supplied to a rotary turret 802. The rotary turret 802 is connected with a motor, which is not shown in the drawings, by a belt 807. While the shape of the spool 7 is being checked by the rotary turret 802, the spool is supplied to an opening portion 803a of the chute 803 in a predetermined timed relation. A parts supplying means comprises the chute 803.

A light shielding tunnel 805 is formed in the manner that the entire chute to convey the spool 7 is covered with a light shielding cover 804. The spool 7 is conveyed to the spool assembly section 304 of the film processing assembly section 300 through the light shielding tunnel 805, and the spool 7 is entered into the film processing assembly section 300, which is maintained under the condition of the dark room, from the bright room. The light shielding tunnel 805 is mounted to the film processing assembly section 300 in the manner that light is shielded with a light shielding member 812.

Further, in order to prevent light from entering from a place where the spool 7 is entered into the light shielding tunnel 805, a portion 805b near the opening portion 805a is bent so that light can be prevented from entering from the opening portion 805a. It is preferable that substantially no gap is provided between the spool 7 and an inner wall of the light shielding tunnel 805, and that the gap is narrower than 3 mm. More preferably, the gap is narrower than 2 mm, and more preferably, the gap in the vertical direction is narrower than 1 mm. The length of the light shielding tunnel for the spool is preferably more than 50 cm, and more preferably, more than 1 m. The spool 7 itself also can shield light.

A parts detection means 806 is provided in the light shielding tunnel 805, and the spool 7 located in the light shielding tunnel 805 is detected by the parts detection means 806. The detection signal of the parts detection means 806 is sent to the high-ranking control means 317, and when the spool 7 is located in the light shielding tunnel 805, drive of the rotary turret 802 is stopped. For example, since light is entered into the light shielding tunnel 805 from the place corresponding to the spool 7 when there is no spool in the light shielding tunnel 805, the number of spools 7 is controlled so that all of the spools are not perfectly conveyed from the light shielding tunnel 805.

Figure 76:
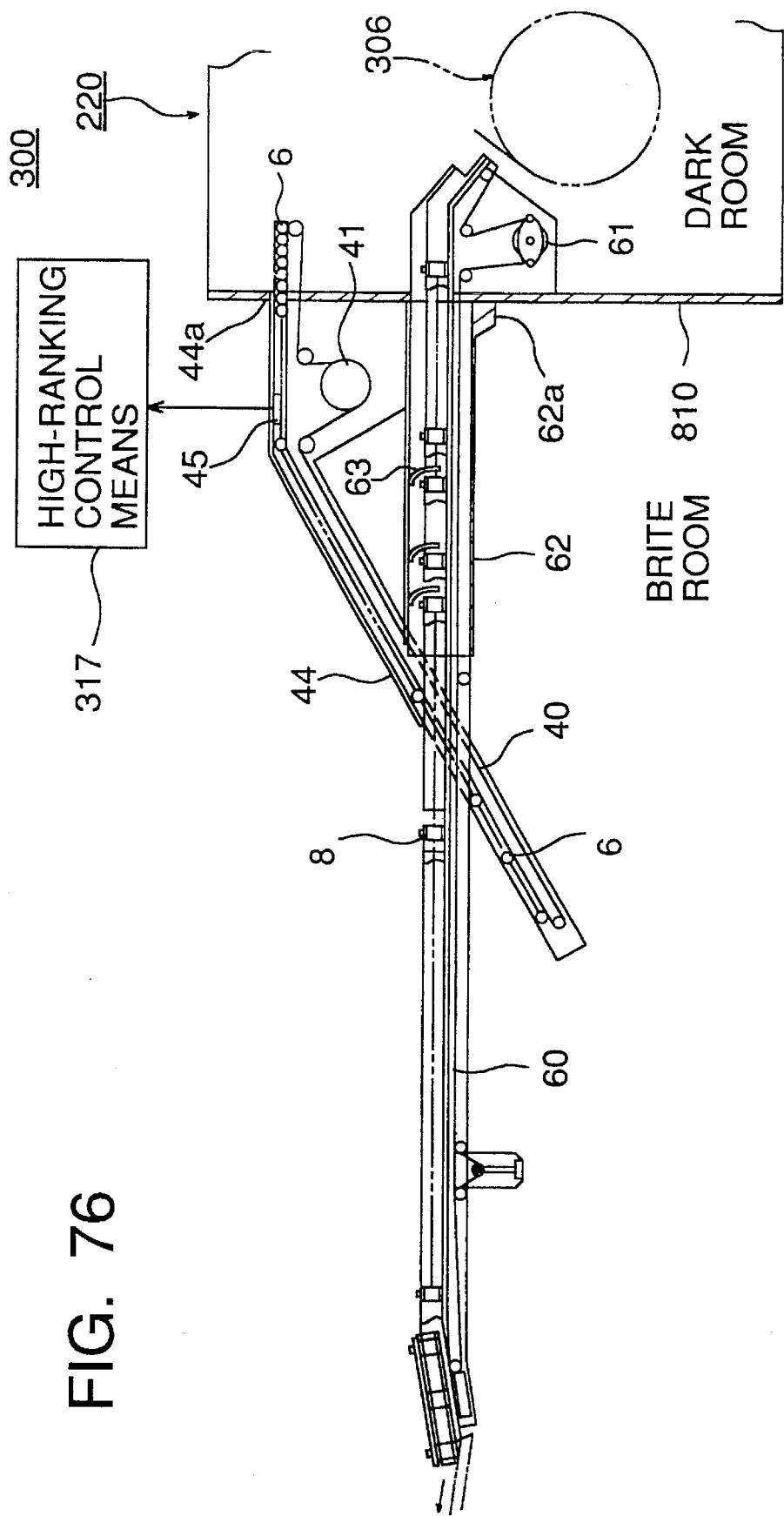
FIG. 76 is a side view showing a state of connection of the film processing assembly section, the one-side calked cartridge processing device, and the inspection device.
Figure 77:
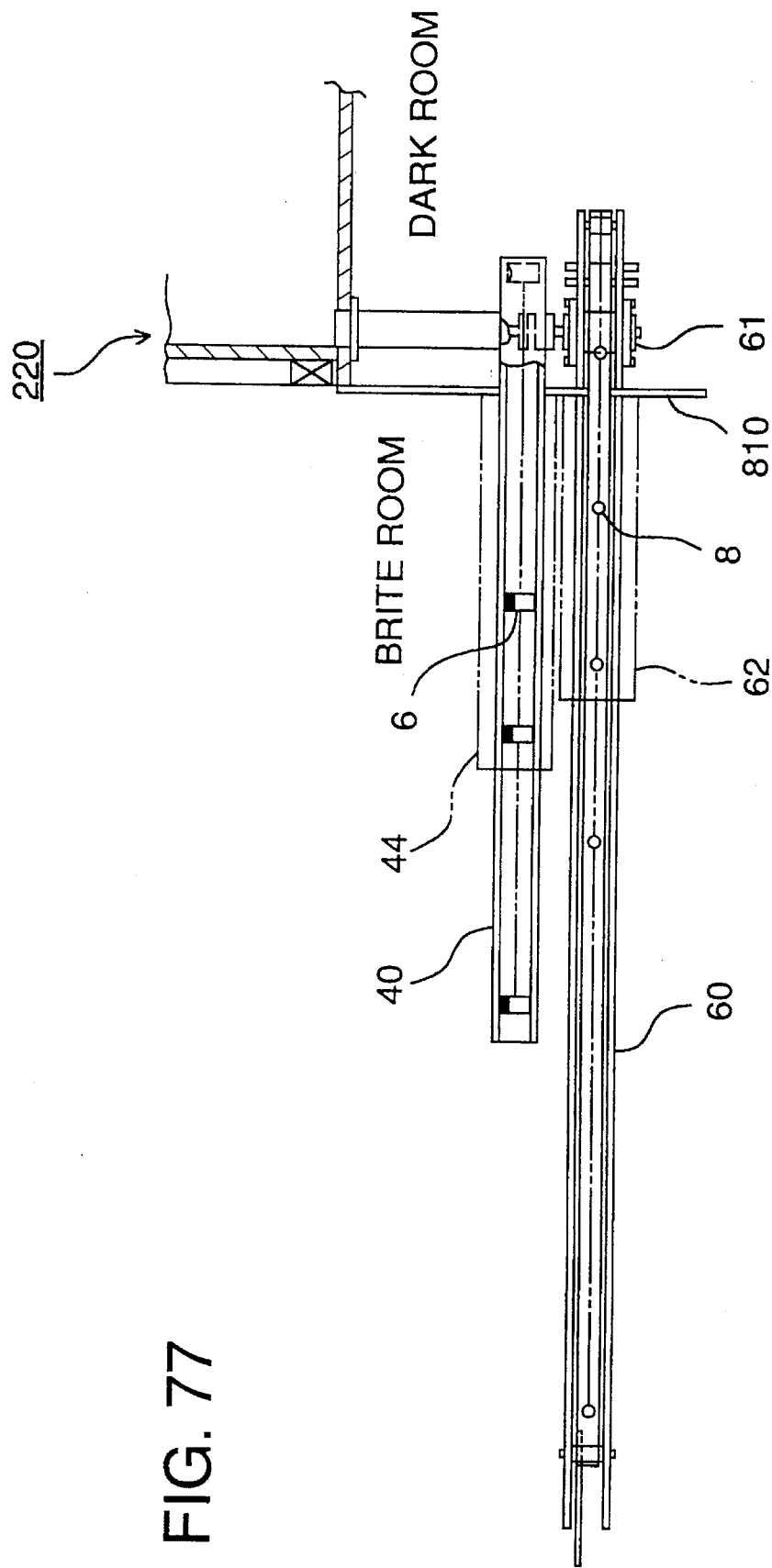
FIG. 77 is plan view showing a state of connection of the film processing assembly section, the one-side calked cartridge processing device, and the inspection device.
Figure 78:
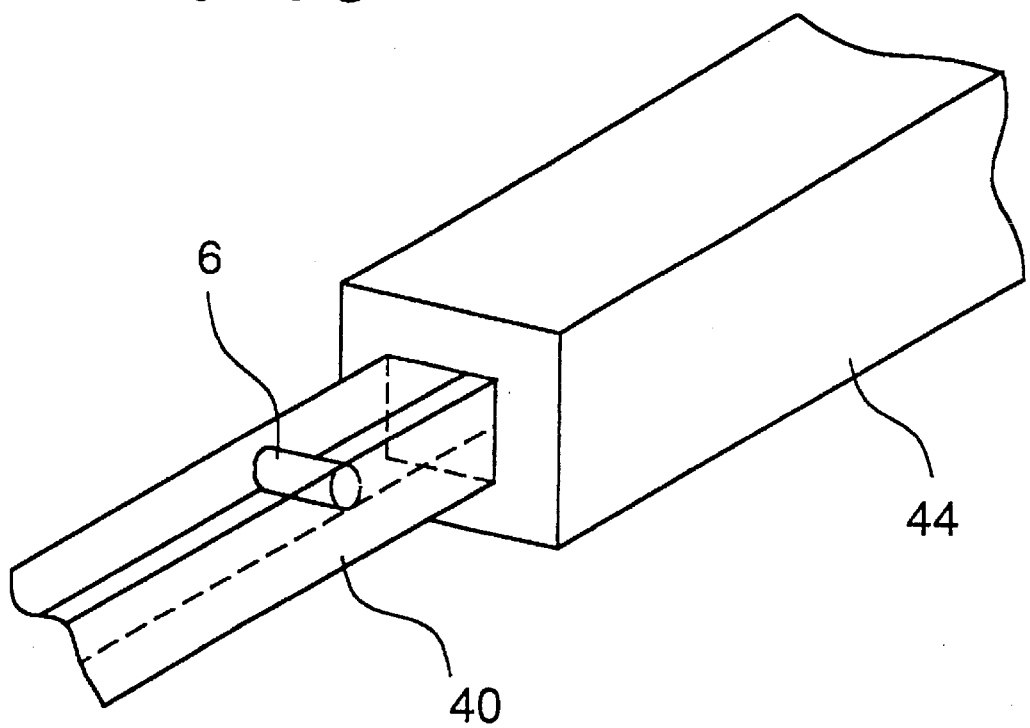
FIG. 78 is a perspective view showing a state of connection of the film processing assembly section and the one-side calked cartridge processing device.
Figure 79:
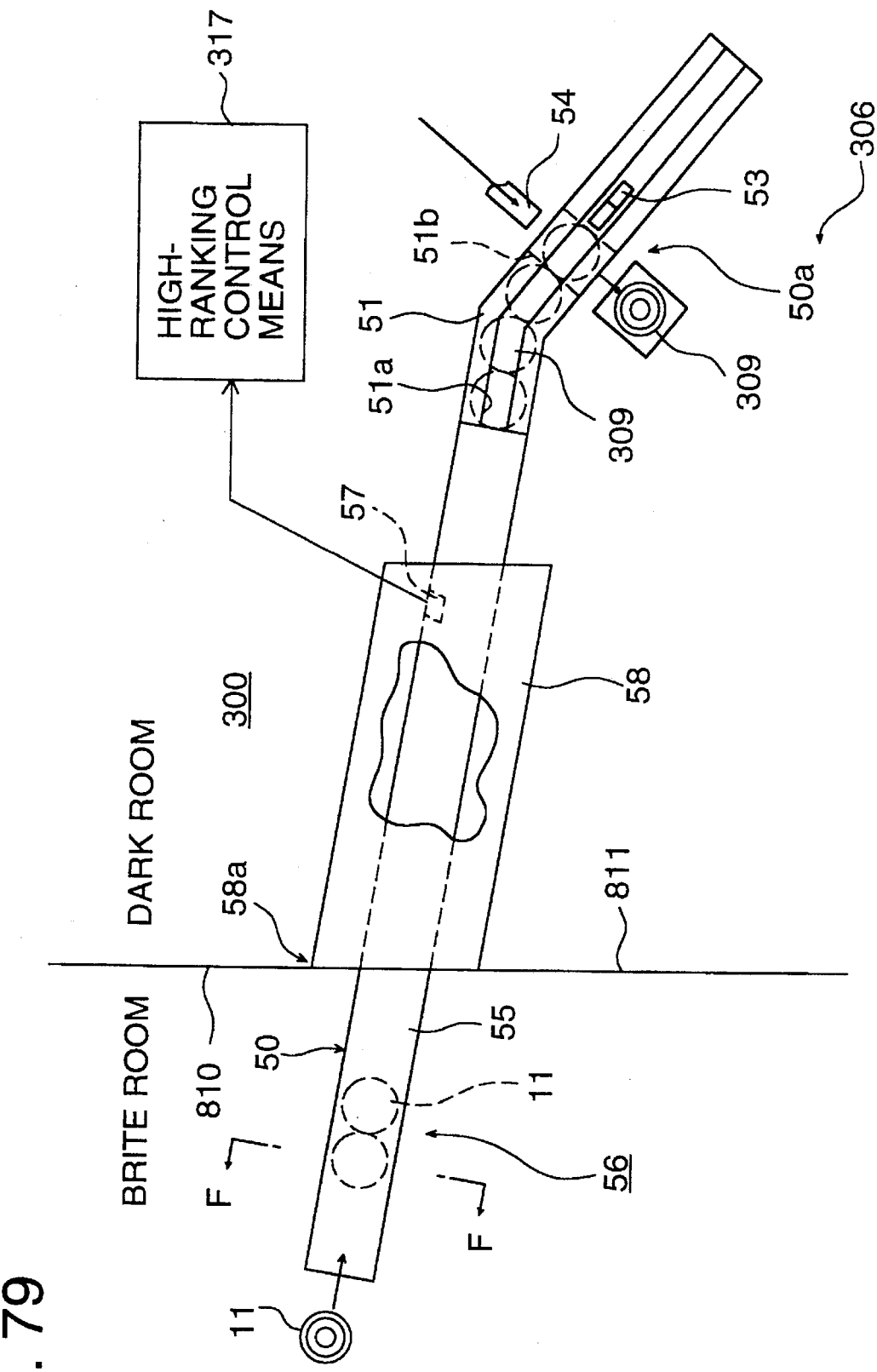
FIG. 79 is a side view showing a state of connection of the film processing assembly section and the cartridge cap supply device.
Figure 80:
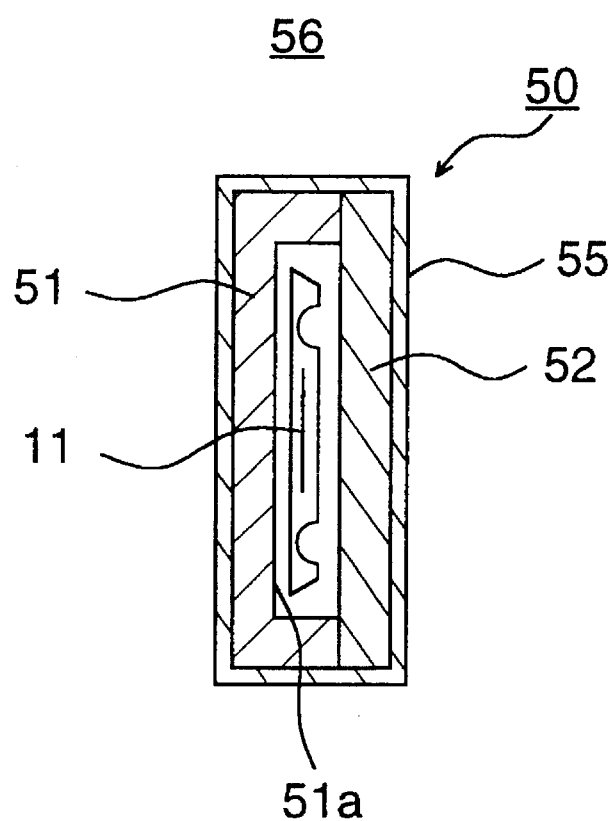
FIG. 80 is a sectional view taken on line F—F in FIG. 79.

Next, the connection of the film processing assembly section 300 with the one-side calked cartridge processing device 220, the cartridge cap supplying section 260 and inspection device 420 is shown in FIG. 54, FIG. 76, and FIG. 80. FIG. 76 is a side view showing the connection of the film processing assembly section with the one-side calked cartridge processing device and the inspection device. FIG. 77 is a plan view showing the connection of the film processing assembly section with the one-side calked cartridge processing device and the inspection device. FIG. 78 is a perspective view showing the connection of the film processing assembly section with the one-side calked cartridge processing device. FIG. 79 is a side view showing the connection of the film processing assembly section with the cartridge cap supplying section. FIG. 80 is a sectional view taken on line F—F of FIG. 79.

A magnet conveyor 40 is provided inside the film processing assembly section 300 from the one-side calking cartridge processing section 220, and is driven by a motor 41. The magnet conveyor 40 attracts and conveys the one-side calked cartridge 6 made by the one-side calked cartridge processing device 220, and supplies the cartridge 6 to a supplying chute 708 provided inside the film processing assembly section 300. The one-side calked cartridge 6 is supplied as follows: it is supplied from the supplying chute 708 to a star wheel for separation 371; it is aligned by an alignment conveyance mechanism 373 and is sent to the preturret 374 in a predetermined timed relation; and it is supplied from the preturret 374 to a cartridge assembling section 306. A parts conveyance means comprises the magnet conveyor 40, and the magnet conveyor 40 is preferably covered with the light shielding tunnel 44 of more than 50 cm in length, which is necessary for maintaining light shielding properties of a predetermined path, and more preferably more than 1 m. The light shielding tunnel 44 is mounted on an outside portion 810 of the film processing assembly section 300, and the mounting portion 44a has a light shielding structure.

It is preferable for light shielding that the space between the internal wall of the light shielding tunnel 44 and the one-side calked cartridge 6 is preferably narrow to such a degree that the space does not interfere with the conveyance of the one-side calked cartridge 6. It is preferable that there is substantially no gap between the one-side calked cartridge 6 and the internal wall of the tunnel, and that the gap is smaller than 3 mm, and more preferably that it is smaller than 2 mm. Further, it is more preferable that the gap in the vertical direction is smaller than 1 mm, and thereby, the one-side calked cartridge 6 itself also can shield light.

The magnet conveyor 40 and the light shielding tunnel 44 are bent on their way, and therefore, they can effectively shield the light by simple structures.

A parts detection means 45 is provided in the light shielding tunnel 44, the one-side calked cartridge 6 located in the light shielding tunnel 44 is detected by the parts detection means 45, and the detection signal of the parts detection means 45 is sent to the high-ranking control means 317. When the number of the one-side calked cartridges 6 in the light shielding tunnel 44 is more than a predetermined number, drive of the magnet conveyor 40 and the one-side calked cartridge processing device 220 is stopped. When there is no one-side calked cartridge 6 in the light shielding tunnel 44, light enters into the tunnel from the location where the cartridge was located, and therefore, the number of cartridges 6 is controlled so that not all of the cartridges 6 are completely removed from the location.

A cap chute 50 to supply the cartridge cap 11 from the cartridge cap supplying section 260 is provided in the film processing assembly section 300. The cartridge cap 11 is supplied to the cartridge assembling section 306 positioned inside the film processing assembly section 300 by the cap chute 50. The cap chute 50 is composed of the light shielding member 51 having a cut-out groove 51a and the plate-shaped member 52, by which the cut-out groove 51a is covered, as shown in FIG. 66. A take-out hole 51b is provided in the supplying portion 50a of the cap chute 50. When the cartridge cap 11 positioned by a stopper 53 is pushed by an operating member 54, the cartridge cap 11 is discharged from the take-out hole 51b and supplied to a predetermined position.

The light shielding tunnel 56 is structured in the manner that the cap chute 50 is entirely covered with the light shielding cover 55, and preferably more than 50 cm in length, which is necessary for maintaining light shielding properties of a predetermined path, and more preferably more than 1 m. The light shielding tunnel 56 is covered with the light shielding box 58 in the film processing assembly section 300, and the light shielding box 58 is provided in the internal portion 811 of the tunnel 56. A mounting portion 58a of the light shielding box 58 has a light shielding structure. It is preferable for light shielding that the space between the internal wall of the light shielding tunnel 56 and the cartridge cap 11 is preferably narrow to such a degree that the space does not interfere with the conveyance of the cartridge cap 11. For example, it is preferable that the gap between a peripheral portion of the cartridge cap and the internal wall of the tunnel 56 is smaller than 3 mm, and more preferably that it is smaller than 2 mm. Further, it is more preferable that the gap in the vertical direction is smaller than 0.5 mm.

A parts detection means 57 is provided in the light shielding tunnel 56, the cartridge cap 11 located in the light shielding tunnel 56 is detected by the parts detection means 57, and the detection signal of the parts detection means 57 is sent to the high-ranking control means 317. When the number of the cartridge caps 11 in the light shielding tunnel 56 is more than a predetermined number, supply of the cartridge caps 11 is stopped. When there is no cartridge cap in the light shielding tunnel 56, light enters into the tunnel from the location where the cartridge was located, and therefore, the number of cartridge caps 11 is controlled so that the cartridge caps 11 are not completely removed from the tunnel 56.

Referring to FIG. 54, FIG. 76 and FIG. 77, connection of the film processing assembly section 300 with the inspection device 420 will be described as follows. A magnet conveyor 60 is provided from the inside of the film processing assembly section 300 to the inspection device 420, and the magnet conveyor 60 is driven by a motor 61. The magnet conveyor 60 attracts and conveys the film cassette 8 made in the film processing assembly section 300, and supplies it to the inspection device 420. The magnet conveyor 60 is covered with a light shielding tunnel 62 so that light shielding properties of its path can be maintained. The light shielding tunnel 62 is mounted on an outside portion 810 of the film processing assembly section 300, and the mounting portion 62a has a light shielding structure.

It is preferable for light shielding that the space between the internal wall of the light shielding tunnel 62 and the film cassette 8 is narrow to such a degree that the space does not interfere with the conveyance of the film cassette 8. It is preferable that there is substantially no gap between the film cassette 8 and the internal wall of the tunnel 62, and that the gap is smaller than 3 mm, and more preferably that it is smaller than 2 mm. Thereby, the film cassette 8 itself also can shield light.

The magnet conveyor 60 and the light shielding tunnel 62 are not bent, but linearly formed so that the film cassette 8 does not fall and can be stably conveyed. Therefore, the path formed by the light shielding tunnel 62 is shielded by light shielding curtains 63 provided in a few portions. The light shielding curtain 63 is formed of a member past which the film cassette 8 can pass, and prevents the light from entering into the tunnel 62 when there is no film cassette in the light shielding tunnel 62. For the light shielding curtain 63, for example, black cloth, black velvet, and black non woven fabric can be used.

It is preferable for light shielding that a room, in which the film processing assembly section 300, the film splicing section 100, the one-side calked cartridge processing device 220, the spool supplying device 240, the cartridge cap supplying section 260 and the inspection device 420 are provided, is a half-bright room.

Since the one-side calked cartridge processing device 220, the spool supplying device 240, the cartridge cap supplying section 260, and inspection device 420, for which the bright room condition is preferable for operability, are connected with the film processing assembly section 300, for which the dark room condition is preferable for photosensitive film fog, and continuous processing can be performed, the operators can easily operate the devices in the bright room, so that productivity of the film cassettes can be increased.

Further, structures by which assembling parts are inserted into the inside of the dark room, and by which the film cassettes 8 are taken out from the inside of the dark room, are more simple as compared with inserting and taking-out operations using the parts or product box inside the dark room.

Further, since the inserting operation, in which a large number of parts are inserted into the parts box, or in which a large number of film cassettes are inserted into the product box, is reduced in the invention, problems in which parts and products are damaged by contact or deformed, are reduced, so that superior quality can be obtained. Further, the space in which the parts or product box is set is not necessary, so that the film cassette manufacturing apparatus can be made small.

It is preferable that the manufacturing apparatus according to the present invention is mounted in a building which can withstand a load of more than 500 kgf/m$^2$, and more preferably, more than 1 tonf/m$^2$. The circumferential conditions of the apparatus are preferably controlled as follows: humidity is preferably 40 to 70 RH %, and more preferably 50 to 60 RH %; temperature is preferably 10° to 30° C., and more preferably 15° to 25° C.; and they are controlled to be constant or preferably varied within ±5 RH %, and ±3° C.

Further, it is preferable that the mounting position is not so bright, and preferably not more than 20 lux, more preferably not more than 10 lux.

As described above, parts are successively conveyed along a predetermined path to the film processing assembly section from the parts supplying section by the parts conveyance means, and a predetermined path of the parts conveyance means is covered by the light shielding tunnel having the length which is necessary for maintaining light shielding properties, and therefore, inserting and taking-out operations of parts using the parts box which is inserted inside the dark room is not necessary, so that parts can be inserted inside the dark room, the structure of the apparatus can be made simple, and the apparatus can be made small.

The film magazines in which the photosensitive film is accommodated, are successively conveyed along a predetermined path from the film processing assembly section to the container accommodation section, and a predetermined path of the film cassette conveyance means is covered with the light shielding tunnel having the length, which is necessary for maintaining light shielding properties. Accordingly, inserting and taking-out operations of products using the product box, which is inserted inside the dark room, are not necessary, so that the film magazine can be taken out of the dark room, the structure of the apparatus can be made simple, and the apparatus can be made small.

Parts located in the light shielding tunnel are detected by the parts detection means, and the parts conveyance means is operated for light shielding by the detection signal of the parts detection means so that the number of parts in the light shielding tunnel is larger than a predetermined number. Accordingly, since parts can be used for light shielding, a special light shielding means is not necessary, the structure of the apparatus can be simple, and light shielding properties can be greatly improved.

What is claimed is:

1. A method of manufacturing a photosensitive film magazine in a dark room, comprising the steps of:

feeding a web-shaped photosensitive film to an assembling section through a conveyance passage;

detecting a presence of a defective portion on the film;

identifying a kind of defect of the defective portion;

cutting the defective portion out of the film in a cutting section wherein the length of a cut-out defective portion is changed in accordance with the identified kind of defect;

discharging the cut-out defective portion without feeding the cut-out defective portion to the assembling section; and assembling the film with magazine parts supplied from a parts section when the presence of a defective portion is not detected so that the photosensitive film magazine is manufactured.

2. The method of claim 1, wherein the length of a defective portion which is cut out in the cutting step, is predetermined in accordance with the kind of defect.

3. The method of claim 1, wherein a kind of defect includes a notch which is provided on the film in accordance with defect information of a master roll of the film.

4. The method of claim 1, wherein a kind of defect includes a defect caused in a printing step by which a latent image is printed on the film.

5. The method of claim 1, wherein a kind of defect includes a defect caused in a perforating step by which the film is provided with a perforation.

6. The method of claim 1, wherein a kind of defect includes a defect in a conveyance position of the film.

7. The method of claim 1, wherein a kind of defect includes a defect caused by light leaking into the dark room.

8. The method of claim 7, wherein the length of the defective portion is predetermined in accordance with a position of the dark room through which light leaks into the dark room.

9. The method of claim 1, wherein a kind of defect includes a defect caused when a conveyor in the conveyance passage is stopped for a long period of time.

10. The method of claim 1, wherein a kind of defect includes a spliced portion by which a trailing end of a preceding film is joined with a leading end of a succeeding film.

11. The method of claim 1, wherein:

a defective film signal is generated when the defective portion is detected on the conveyance passage; and the defective film signal is shifted in synchronization with a conveying of the film so that arrival of the defective portion at the cutting section is determined by the shifted defective film signal.

* * * * *